US012468018B2

(12) United States Patent
Kubota et al.

(10) Patent No.: US 12,468,018 B2
(45) Date of Patent: Nov. 11, 2025

(54) LIGHT DETECTOR AND DISTANCE MEASURING DEVICE

(71) Applicant: KABUSHIKI KAISHA TOSHIBA, Tokyo (JP)

(72) Inventors: Hiroshi Kubota, Yokohama Kanagawa (JP); Nobu Matsumoto, Ebina Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 934 days.

(21) Appl. No.: 17/678,986

(22) Filed: Feb. 23, 2022

(65) Prior Publication Data

US 2022/0397650 A1  Dec. 15, 2022

(30) Foreign Application Priority Data

Jun. 9, 2021  (JP) .................................. 2021-096535

(51) Int. Cl.
  *G01S 7/48* (2006.01)
  *G01S 7/4863* (2020.01)

(52) U.S. Cl.
  CPC .................................. *G01S 7/4863* (2013.01)

(58) Field of Classification Search
  USPC ....................................................... 356/4.01
  See application file for complete search history.

(56) References Cited

U.S. PATENT DOCUMENTS

| 10,473,785 | B2 | 11/2019 | Kubota et al. | |
|---|---|---|---|---|
| 10,739,456 | B2 | 8/2020 | Kubota et al. | |
| 11,333,747 | B2 * | 5/2022 | Kubota | G01S 7/487 |
| 11,520,021 | B2 * | 12/2022 | Kubota | G01S 17/10 |
| 11,525,913 | B2 * | 12/2022 | Shimizu | G01S 17/10 |
| 11,635,497 | B2 * | 4/2023 | Kubota | G01S 7/4863 |
| | | | | 250/214.1 |
| 11,693,100 | B2 * | 7/2023 | Kubota | G01S 17/42 |
| | | | | 356/4.01 |
| 11,693,114 | B2 * | 7/2023 | Kubota | G01S 17/42 |
| | | | | 356/3 |
| 11,703,575 | B2 * | 7/2023 | Kubota | G01S 17/42 |
| | | | | 356/5.01 |

(Continued)

FOREIGN PATENT DOCUMENTS

| JP | 2020-148644 A | 9/2020 |
|---|---|---|
| JP | 2020-153746 A | 9/2020 |

(Continued)

*Primary Examiner* — James R Hulka
(74) *Attorney, Agent, or Firm* — Finnegan, Henderson Farabow, Garrett & Dunner, LLP

(57) ABSTRACT

A light detector according to one embodiment includes pixels, selection circuits, and an output circuit. The pixels each includes an avalanche photodiode. The selection circuits are respectively coupled to the pixels. The selection circuits are configured to output a signal output from a pixel selected from the pixels to a first node. The output circuit is coupled to the first node. The output circuit is configured to apply a first operating voltage to the avalanche photodiode included in the selected pixel via a selection circuit of the selection circuits that is coupled to the selected pixel, output an current based on the signal output from the selected pixel to a second node, and change the first operating voltage.

17 Claims, 45 Drawing Sheets

(56) References Cited

U.S. PATENT DOCUMENTS

| | | | |
|---|---|---|---|
| 11,726,184 B2* | 8/2023 | Ferreira | G01S 17/894 |
| | | | 356/4.01 |
| 11,960,004 B2* | 4/2024 | Kubota | G01S 17/42 |
| 12,159,954 B2* | 12/2024 | Kokubun | H10F 39/8037 |
| 12,259,499 B2* | 3/2025 | Kubota | G01S 7/493 |
| 2017/0363740 A1* | 12/2017 | Kubota | G01S 7/484 |
| 2018/0081040 A1 | 3/2018 | Kubota et al. | |
| 2019/0086542 A1* | 3/2019 | Kubota | G01S 7/4863 |
| 2020/0284883 A1* | 9/2020 | Ferreira | G01S 7/4815 |
| 2020/0292675 A1 | 9/2020 | Kubota et al. | |
| 2020/0300985 A1 | 9/2020 | Kubota et al. | |
| 2020/0386889 A1 | 12/2020 | Shimizu et al. | |
| 2021/0088635 A1 | 3/2021 | Kubota et al. | |
| 2021/0293957 A1 | 9/2021 | Kubota et al. | |
| 2021/0302551 A1 | 9/2021 | Kubota et al. | |
| 2022/0075037 A1 | 3/2022 | Kubota et al. | |
| 2022/0082668 A1 | 3/2022 | Kubota et al. | |
| 2022/0082671 A1 | 3/2022 | Kubota et al. | |
| 2022/0082694 A1 | 3/2022 | Kubota et al. | |
| 2022/0091261 A1 | 3/2022 | Kubota et al. | |
| 2022/0310866 A1 | 9/2022 | Kokubun et al. | |

FOREIGN PATENT DOCUMENTS

| | | |
|---|---|---|
| JP | 2020-201249 A | 12/2020 |
| JP | 2021-47131 | 3/2021 |
| JP | 2021-148477 A | 9/2021 |
| JP | 2021-152487 A | 9/2021 |
| JP | 2022-44340 A | 3/2022 |
| JP | 2022-47025 A | 3/2022 |
| JP | 2022-49838 A | 3/2022 |
| JP | 2022-50239 A | 3/2022 |
| JP | 2022-51249 A | 3/2022 |
| JP | 2022-147766 A | 10/2022 |
| WO | WO 2018/181978 A1 | 10/2018 |

* cited by examiner

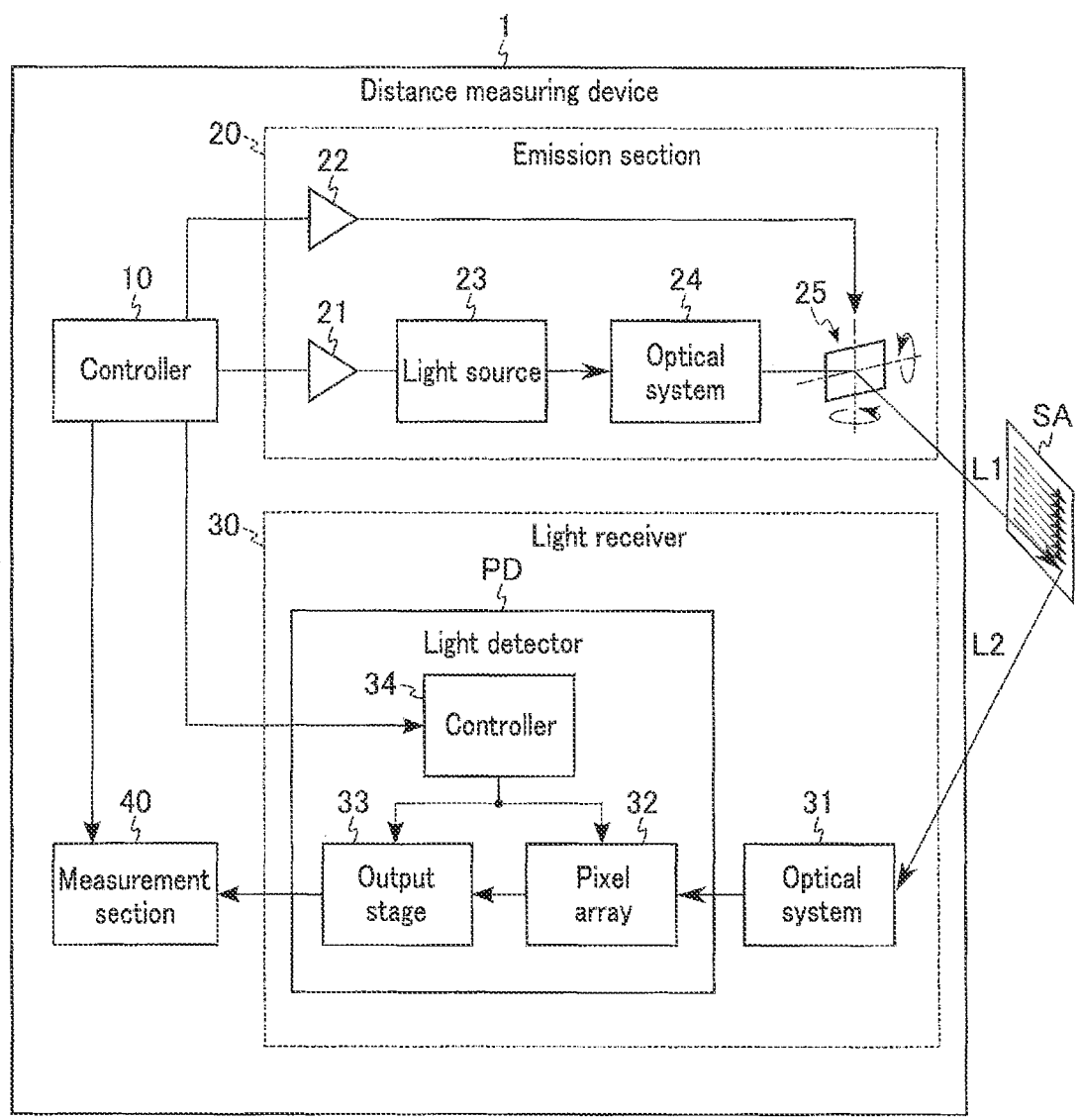
F I G. 3

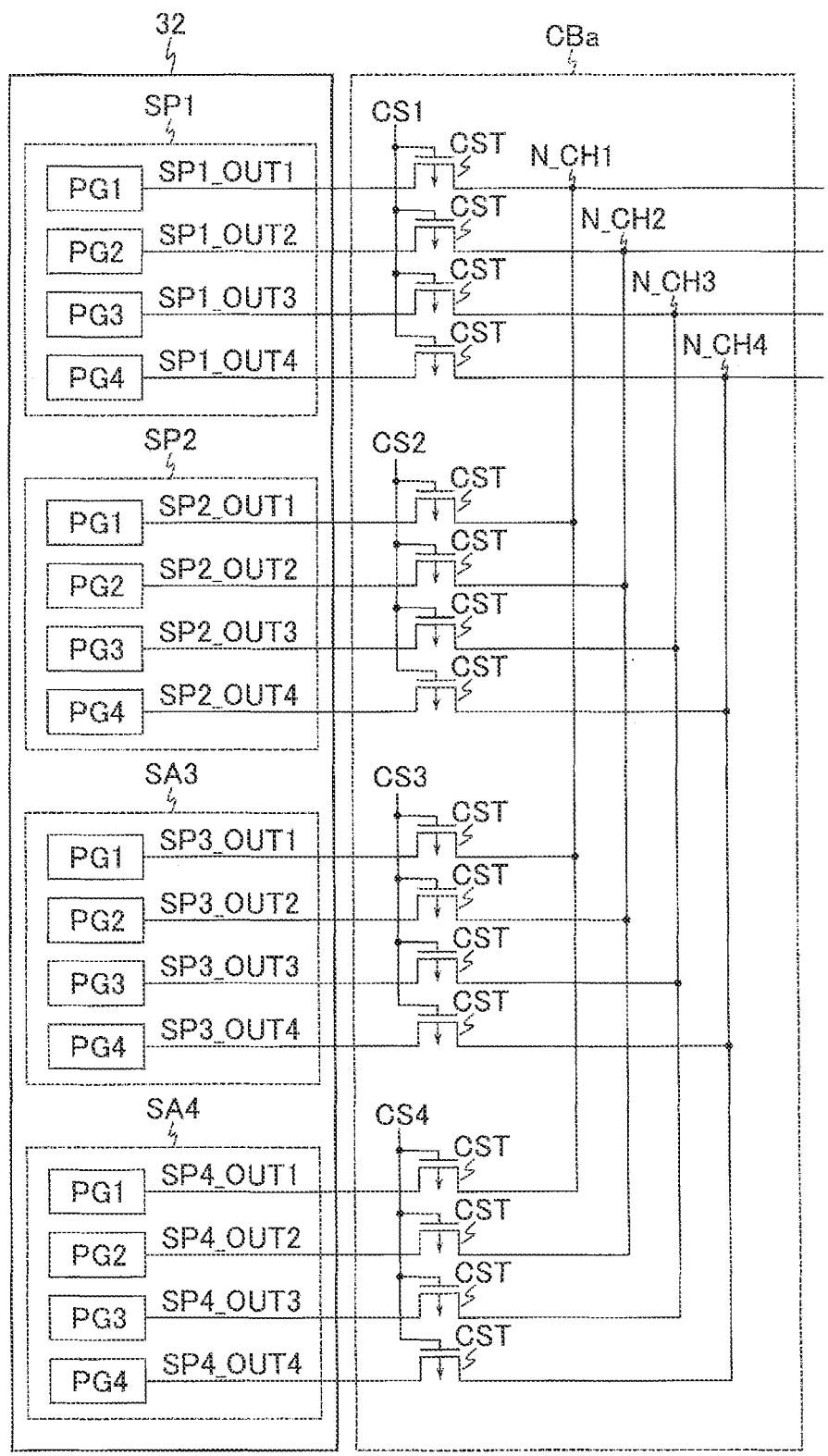
F I G. 9

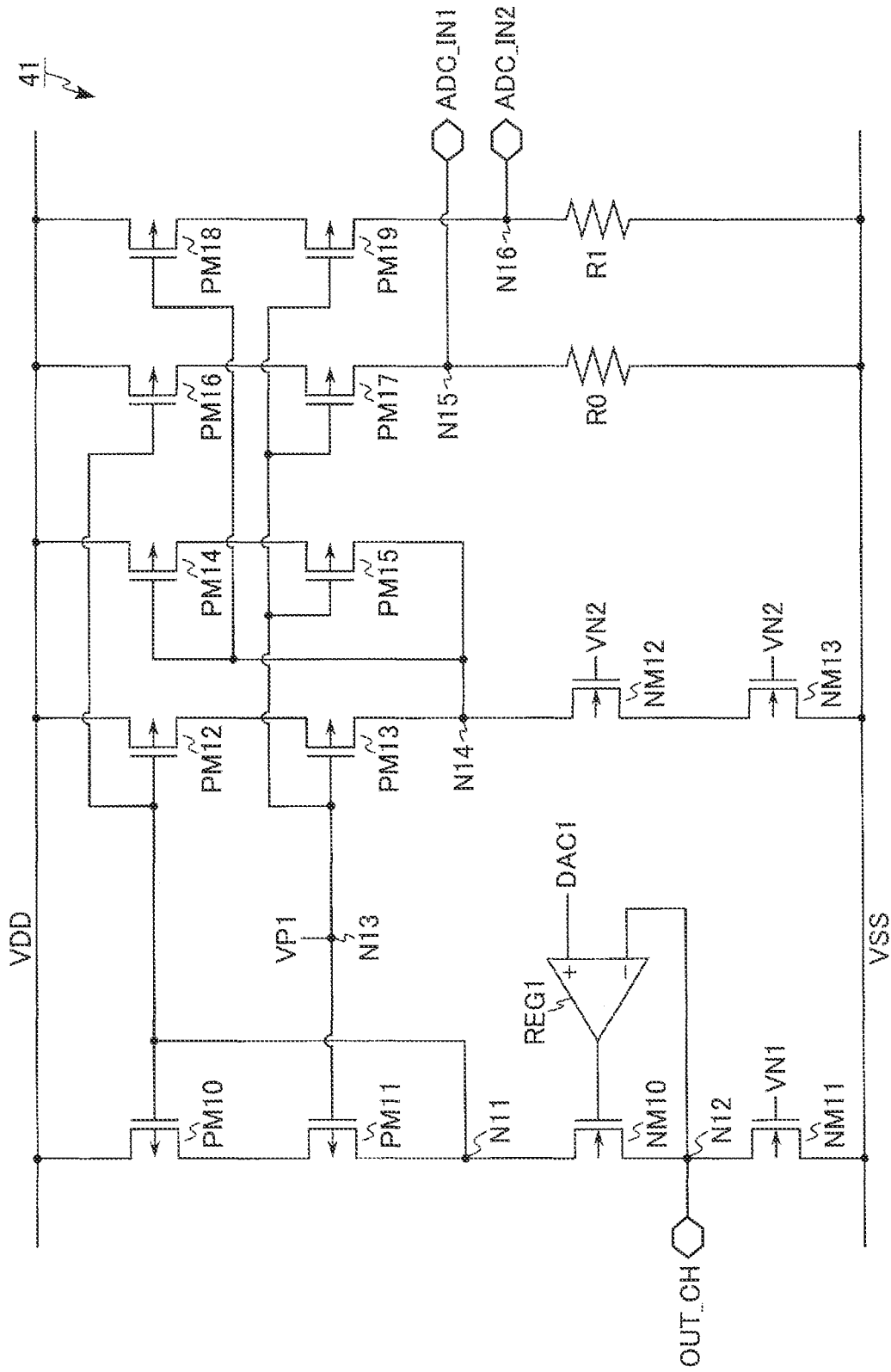
F I G. 11

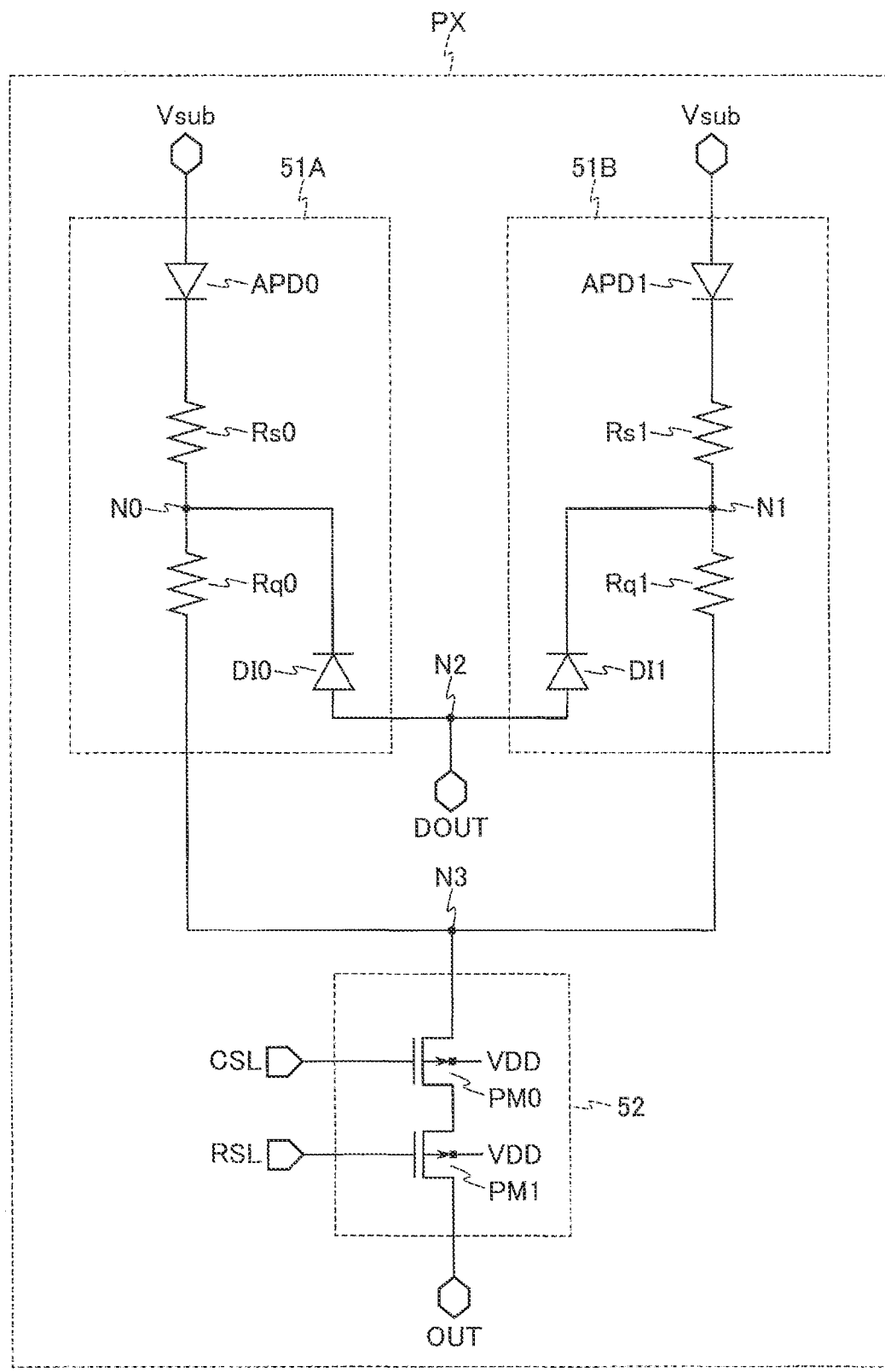
F I G. 15

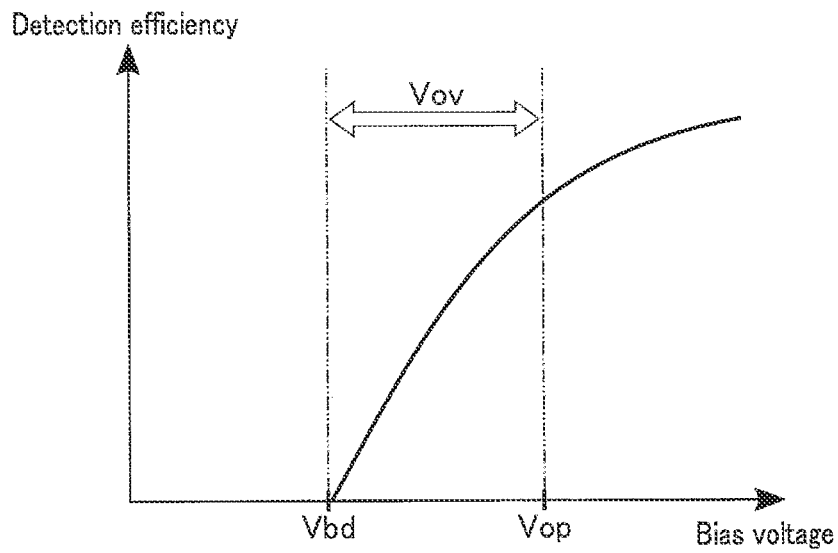
F I G. 16
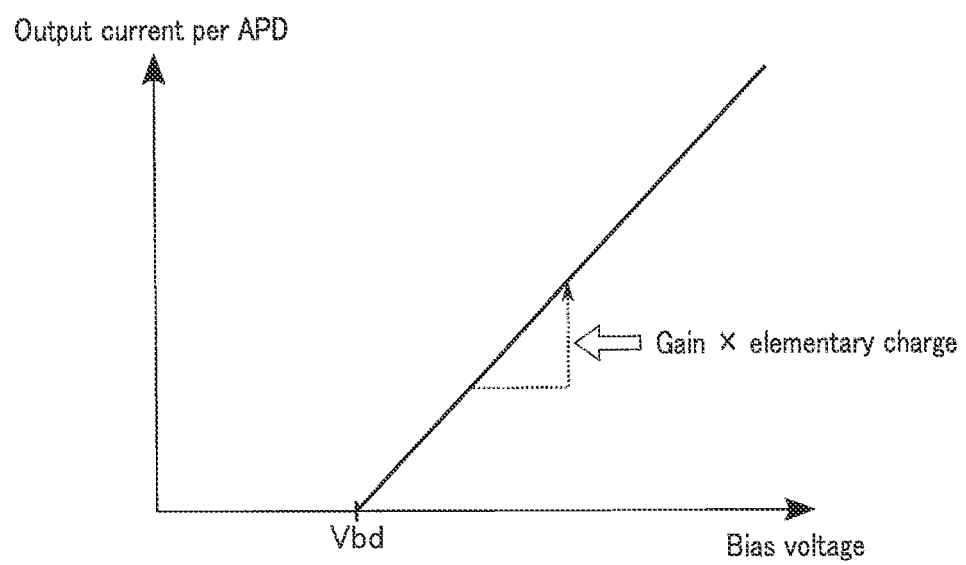
F I G. 17

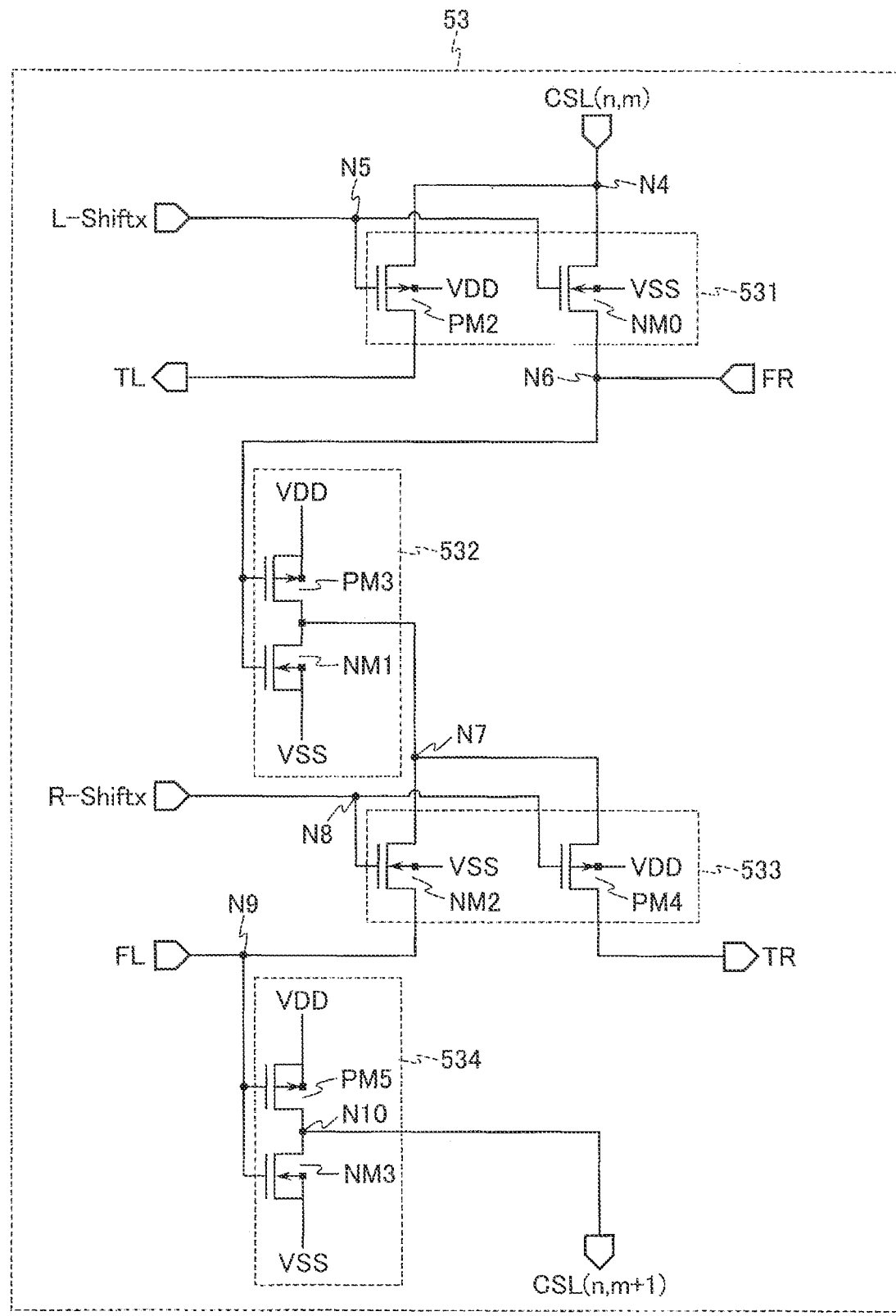
F I G. 18

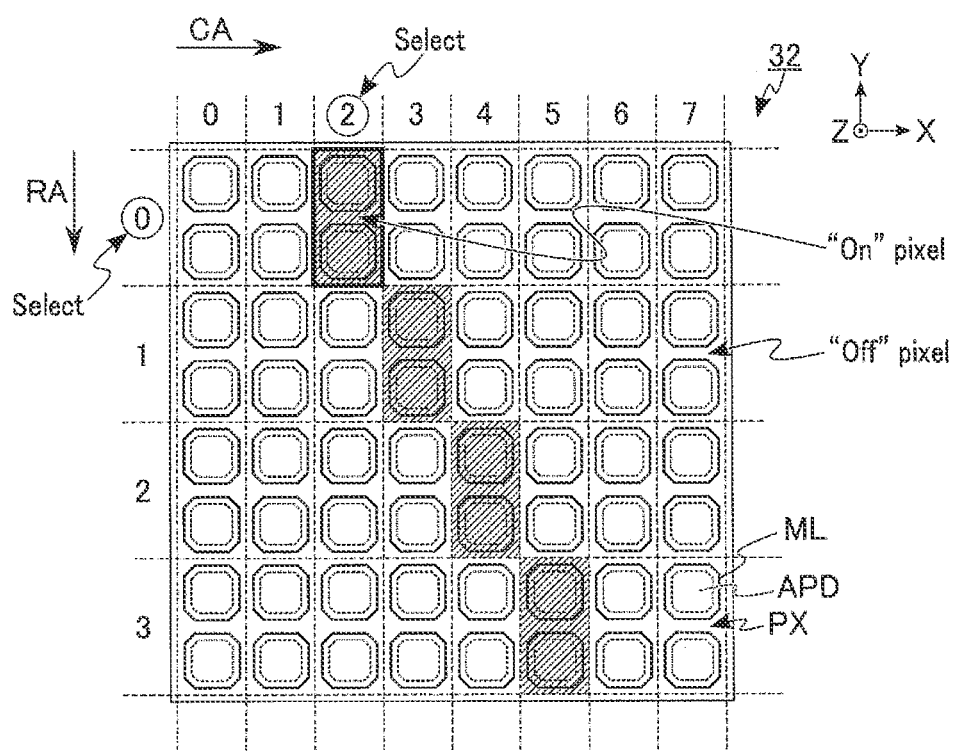
F I G. 19

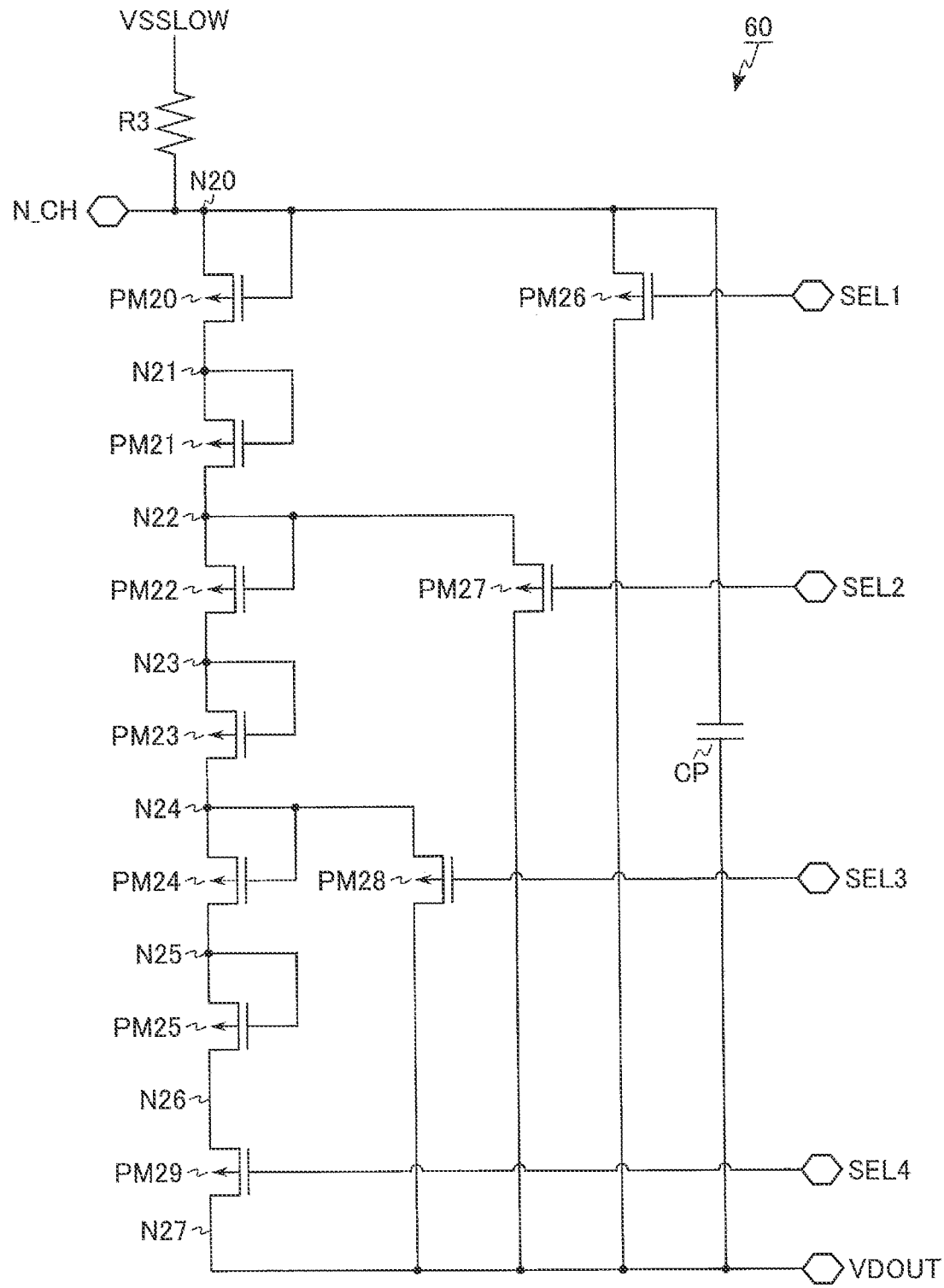
F I G. 21

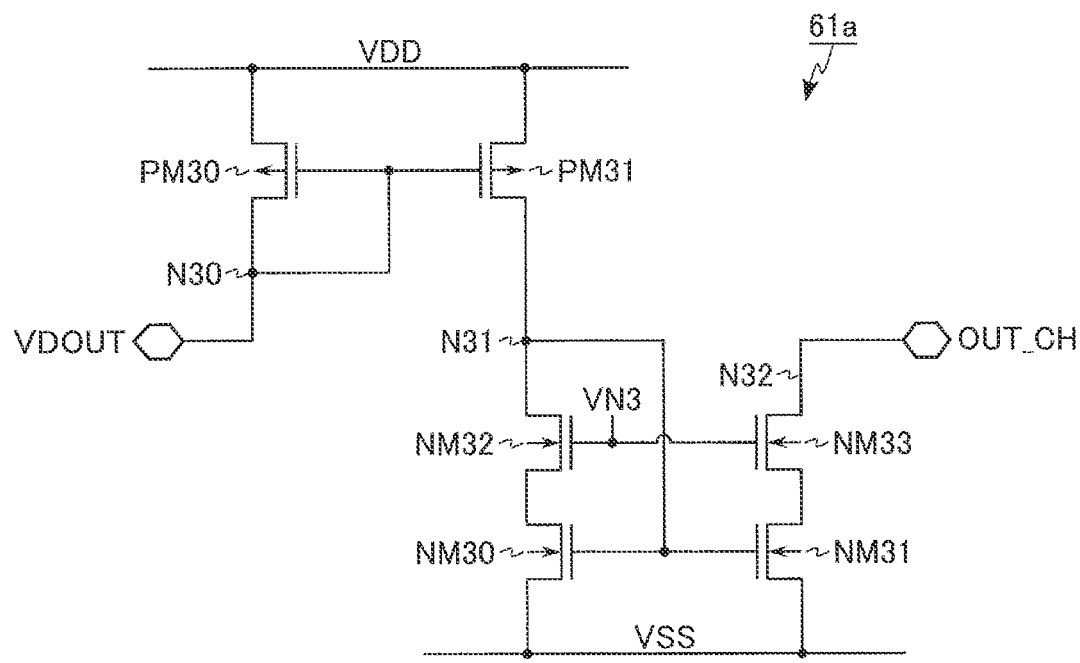
F I G. 27
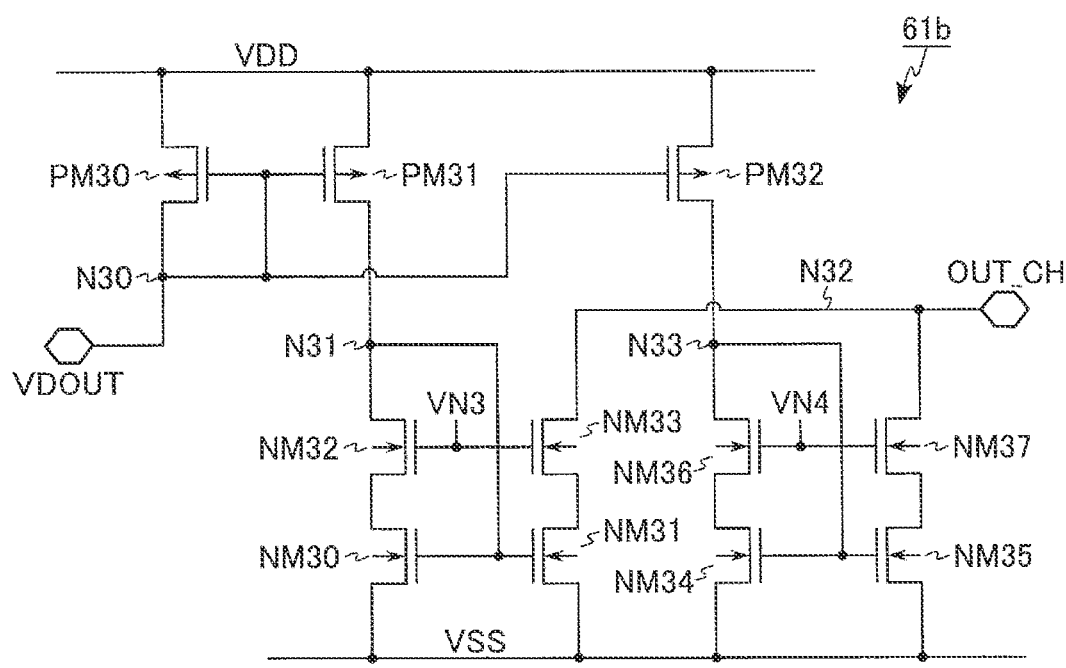
F I G. 28

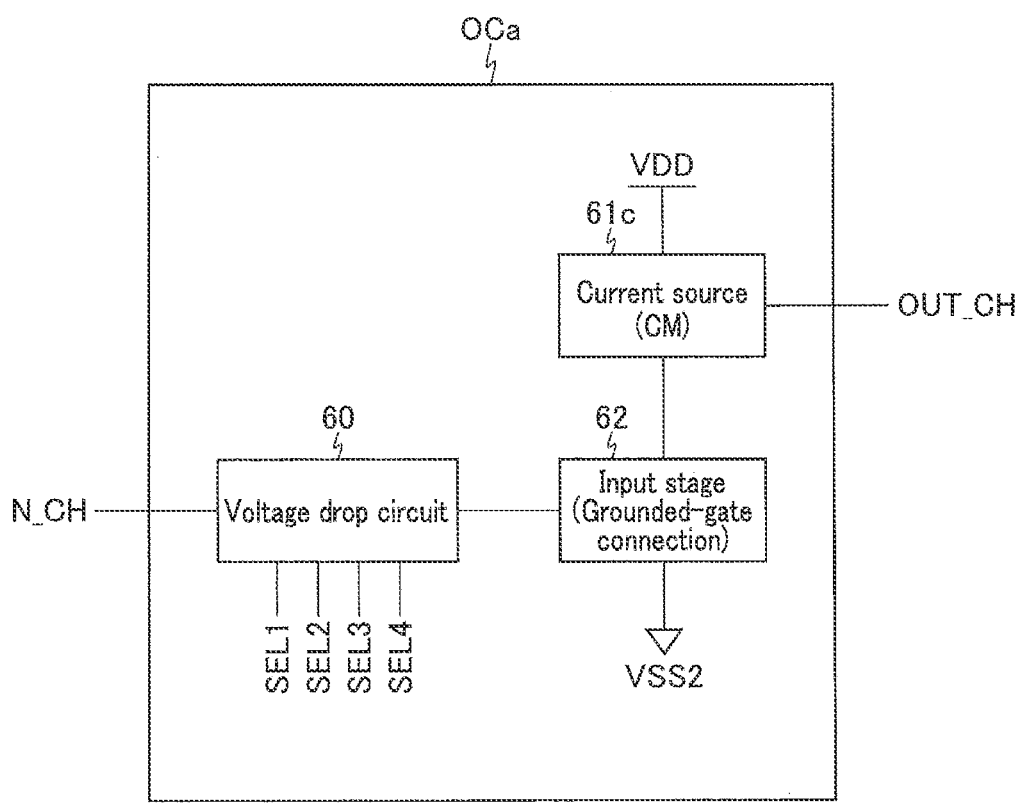
F I G. 29

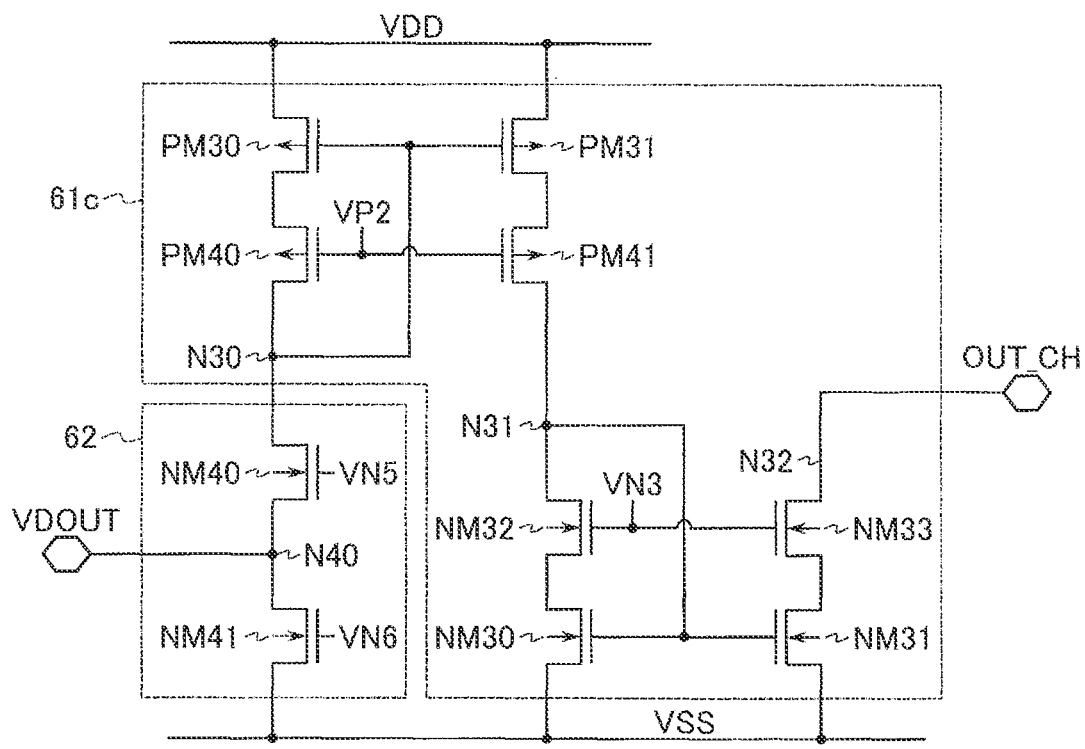
F I G. 30

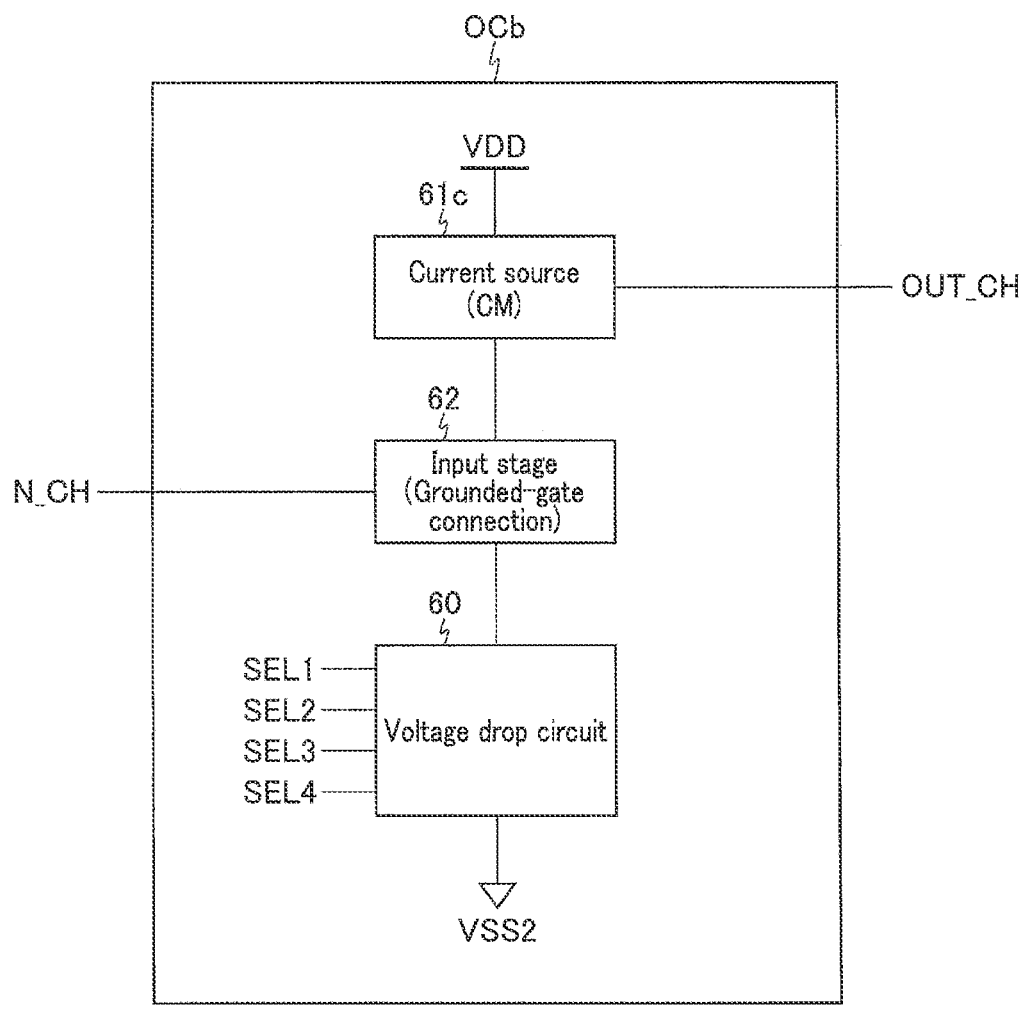
F I G. 31

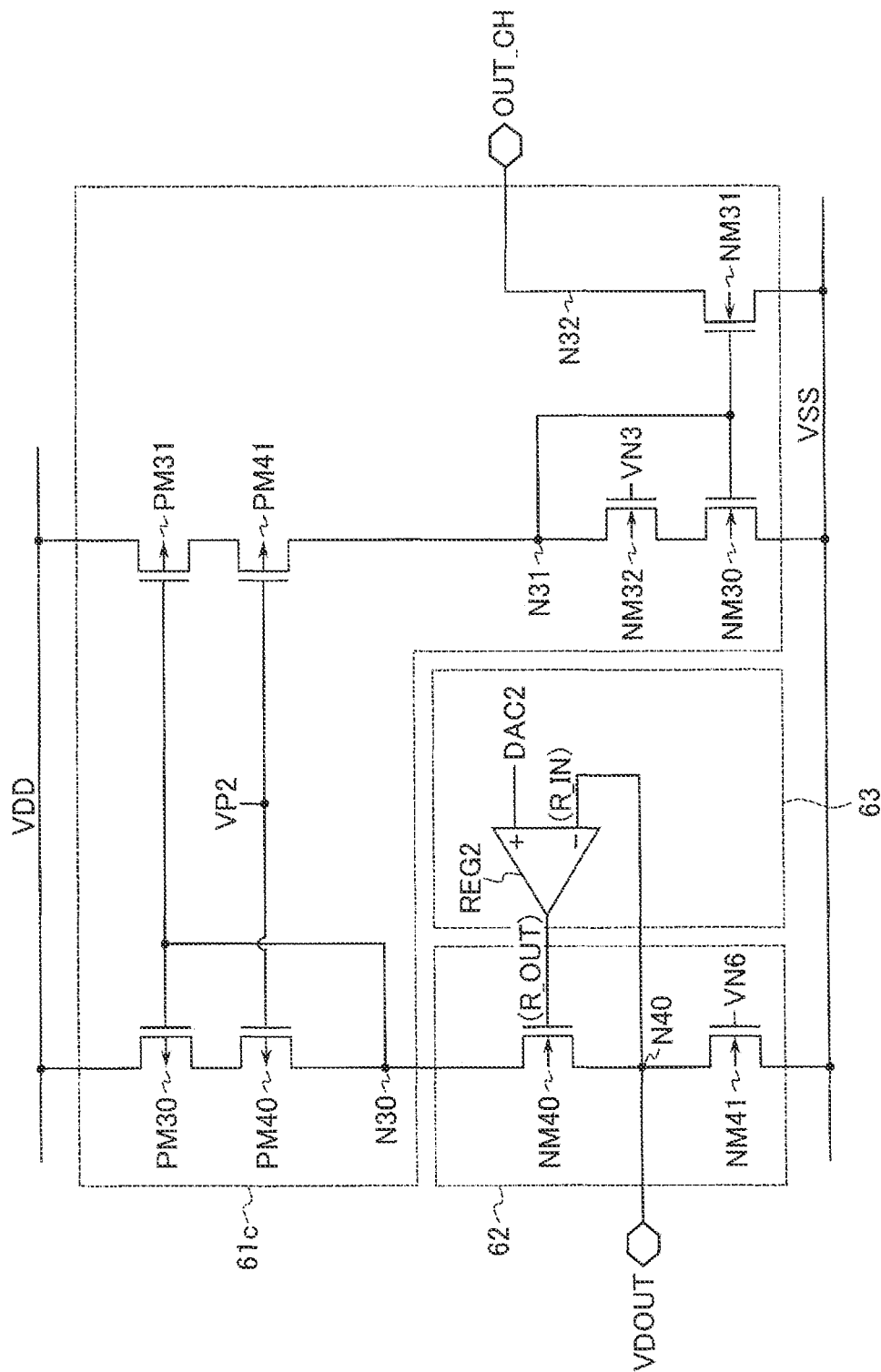
F I G. 33

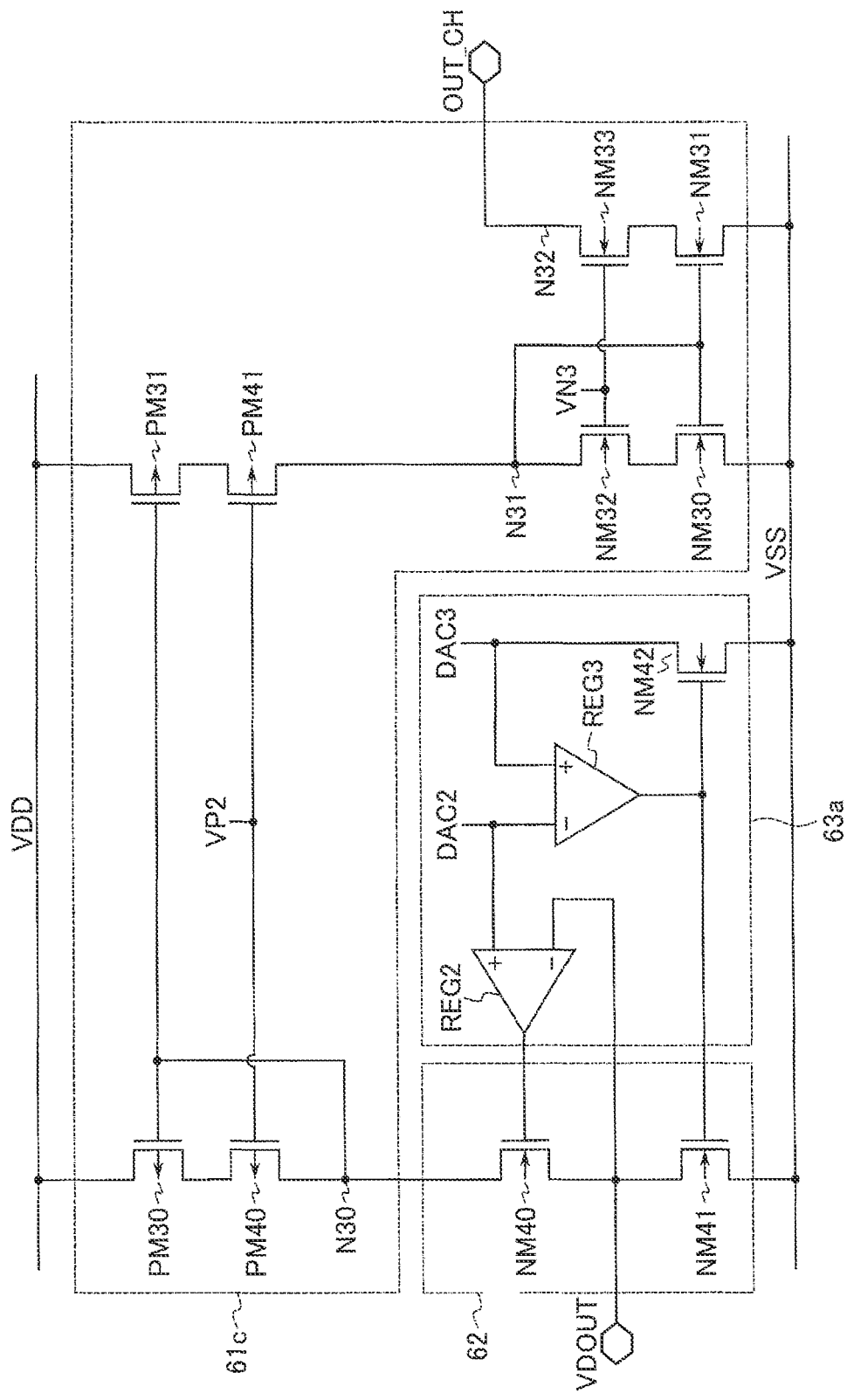
F I G. 36

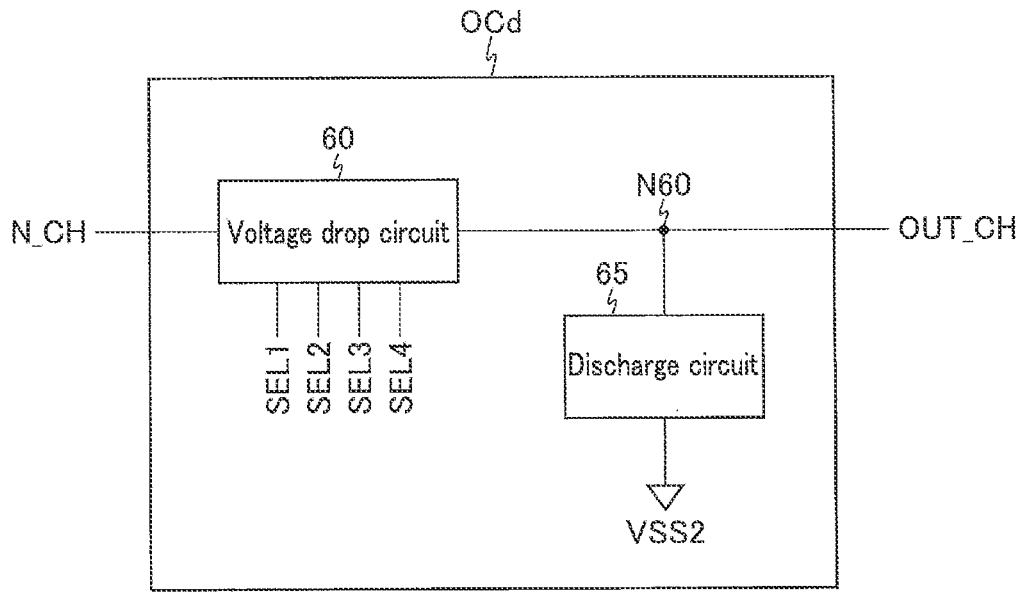
F I G. 37
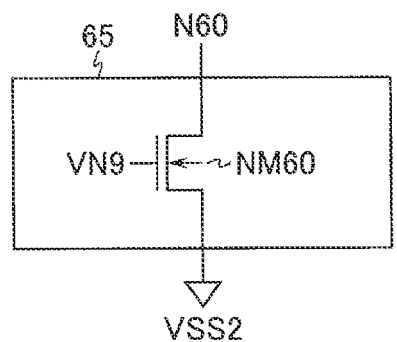
F I G. 38
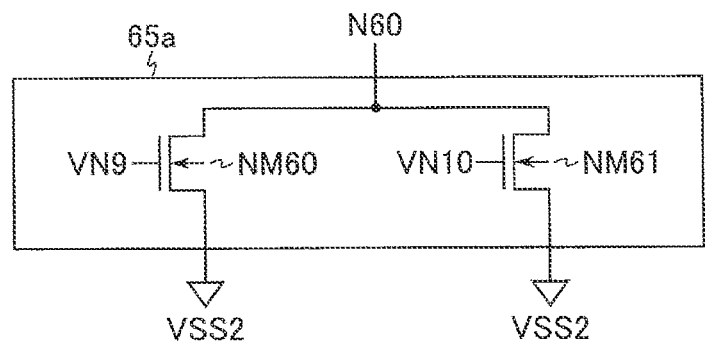
F I G. 39

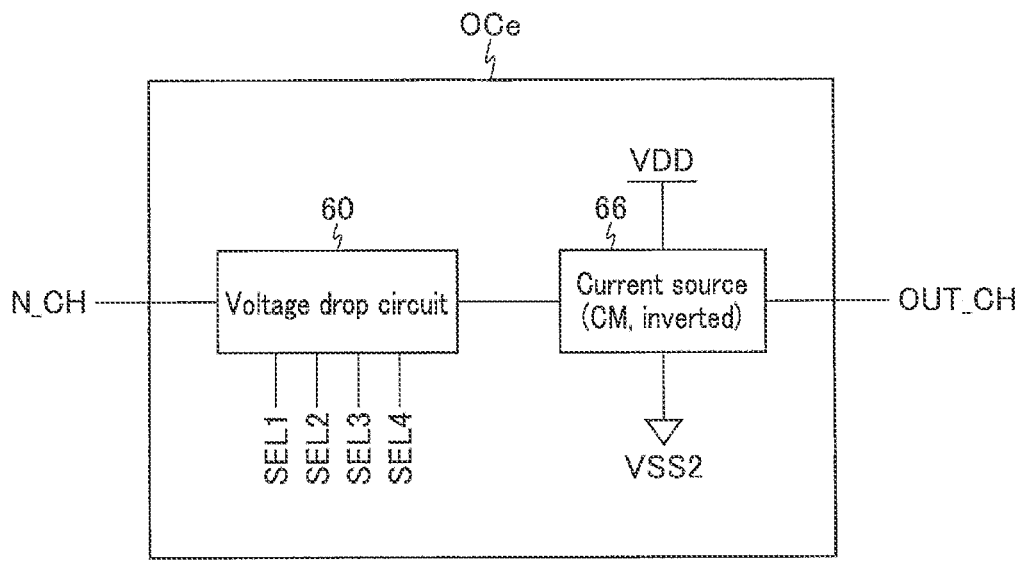
F I G. 40
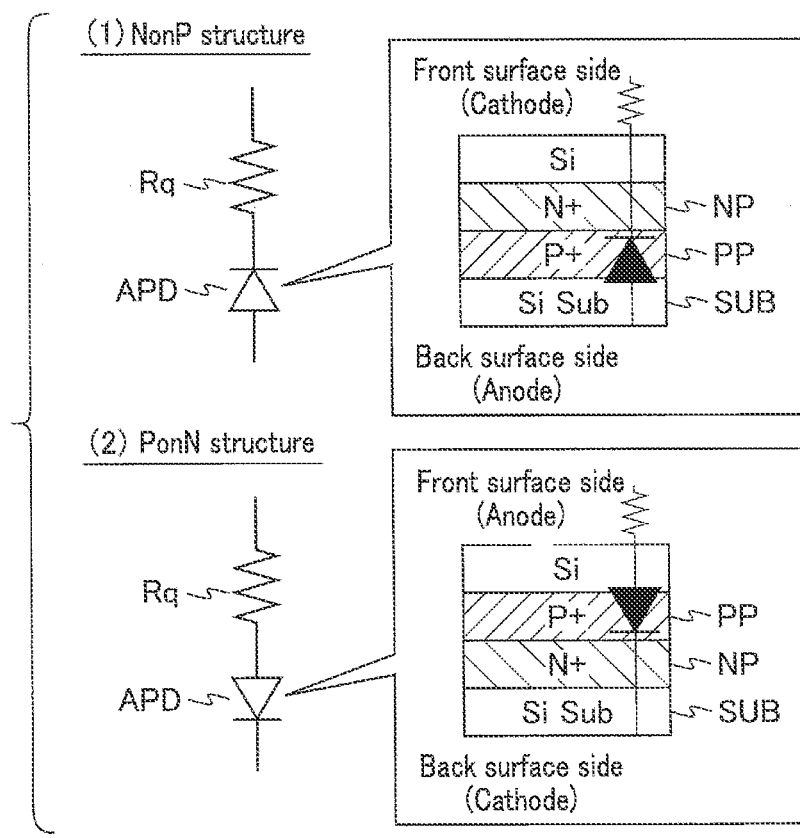
F I G. 41

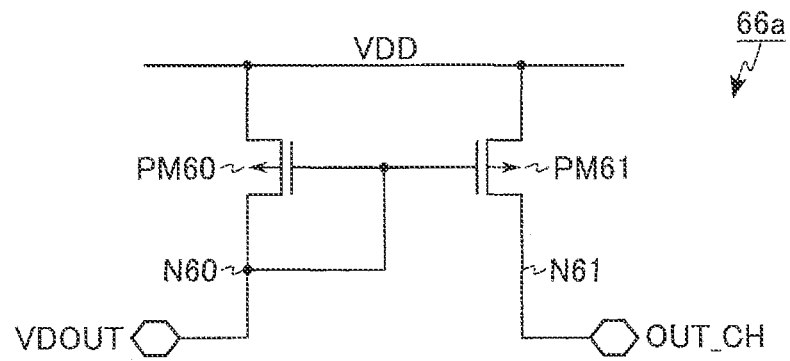
F I G. 42
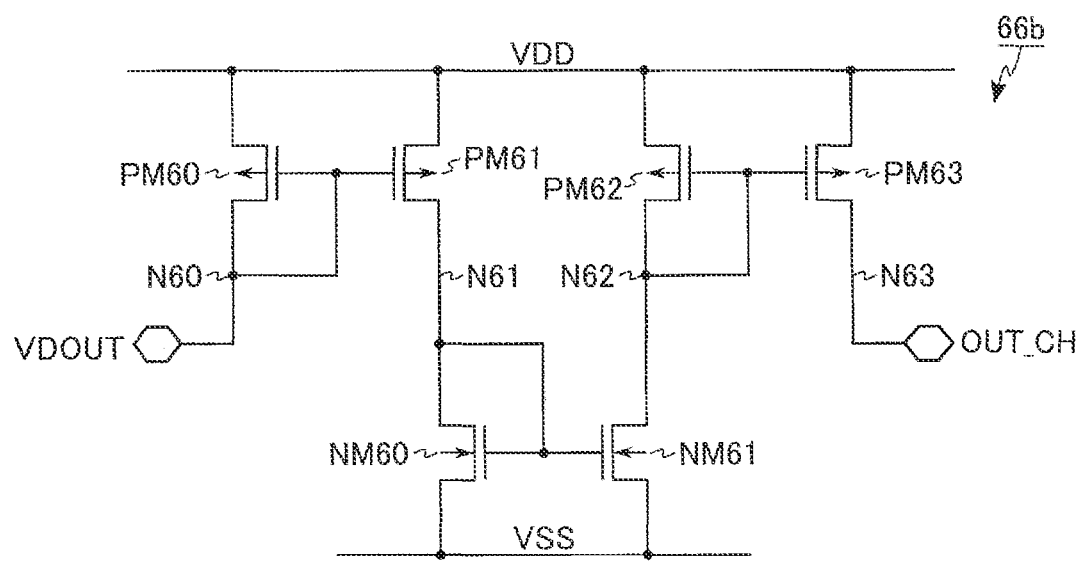
F I G. 43

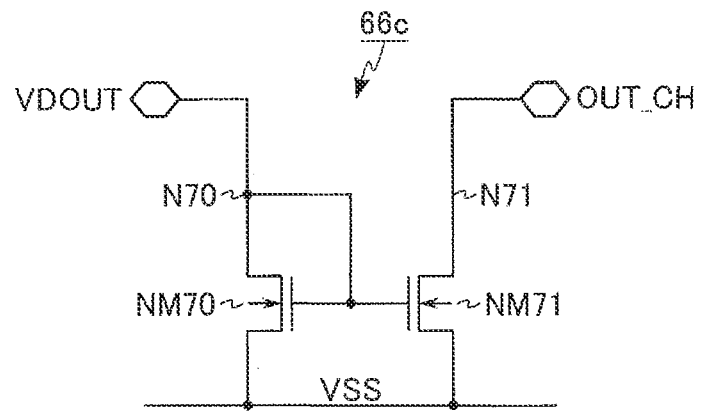
F I G. 44
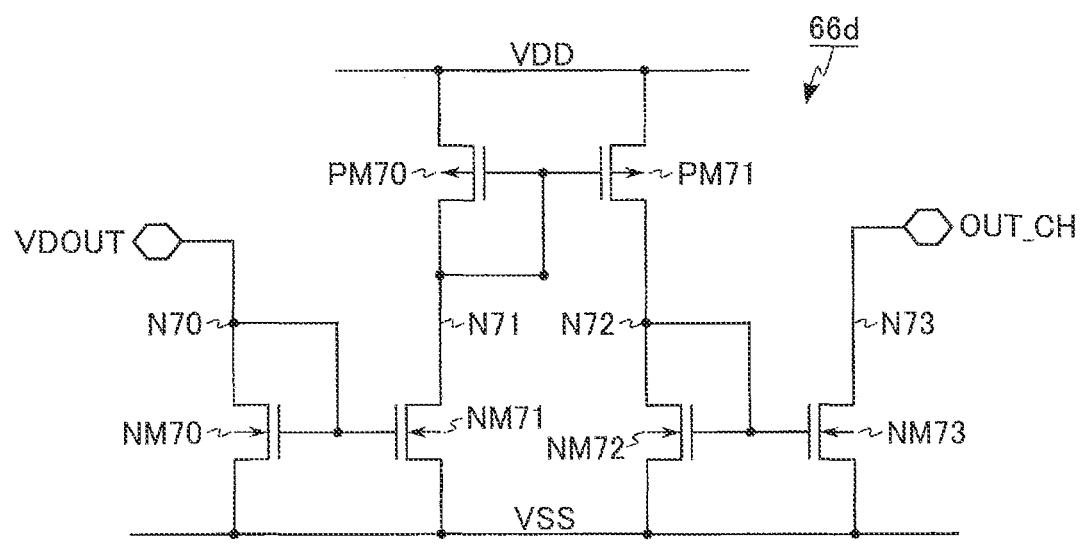
F I G. 45

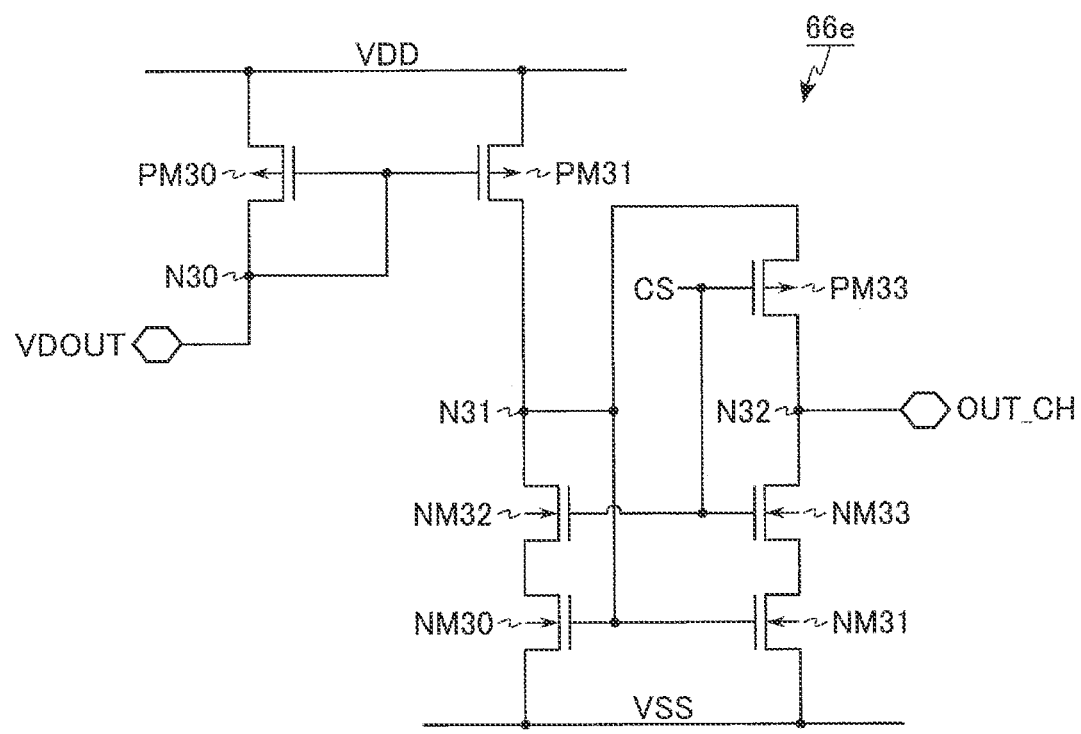
F I G. 46

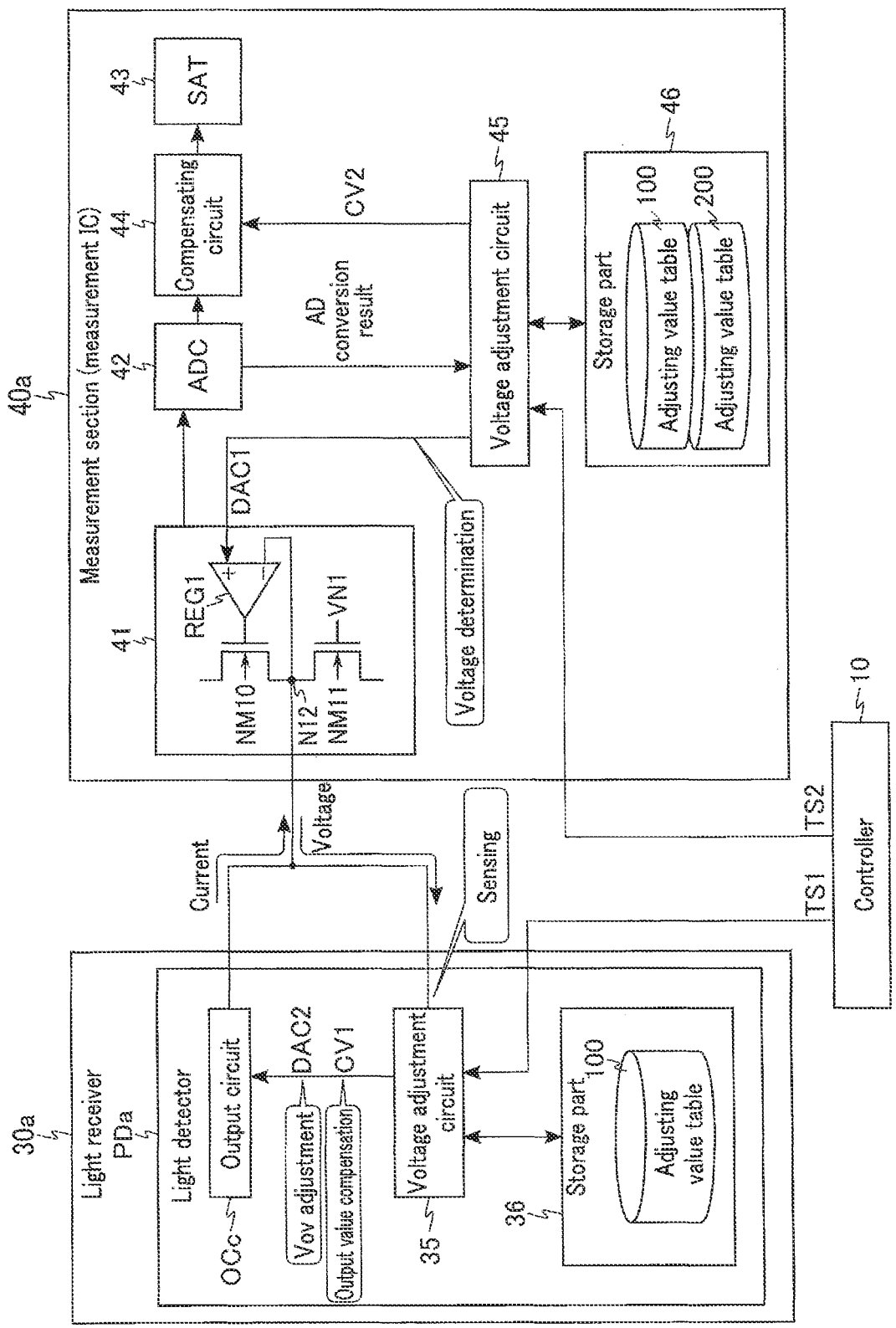
F I G. 47

| Intensity of ambient light | Terminal voltage | Voltage drop | Compensation coefficient CV |
|---|---|---|---|
| 0~14 | 400mV | 0 stages | x1 |
| 15~24 | 500mV | 1 stage | x1.3 |
| 25~46 | 600mV | 2 stages | x2 |
| 47~63(MAX) | 700mV | 3 stages | x8 |

F I G. 50

| Before compensation | 5 | 12 | 20 | 28 | 36 | 42 | 50 | 58 |
|---|---|---|---|---|---|---|---|---|
| After compensation | 5 | 12.7 | 22.9 | 35.2 | 50.5 | 65.3 | 92.9 | 144.7 |

F I G. 51

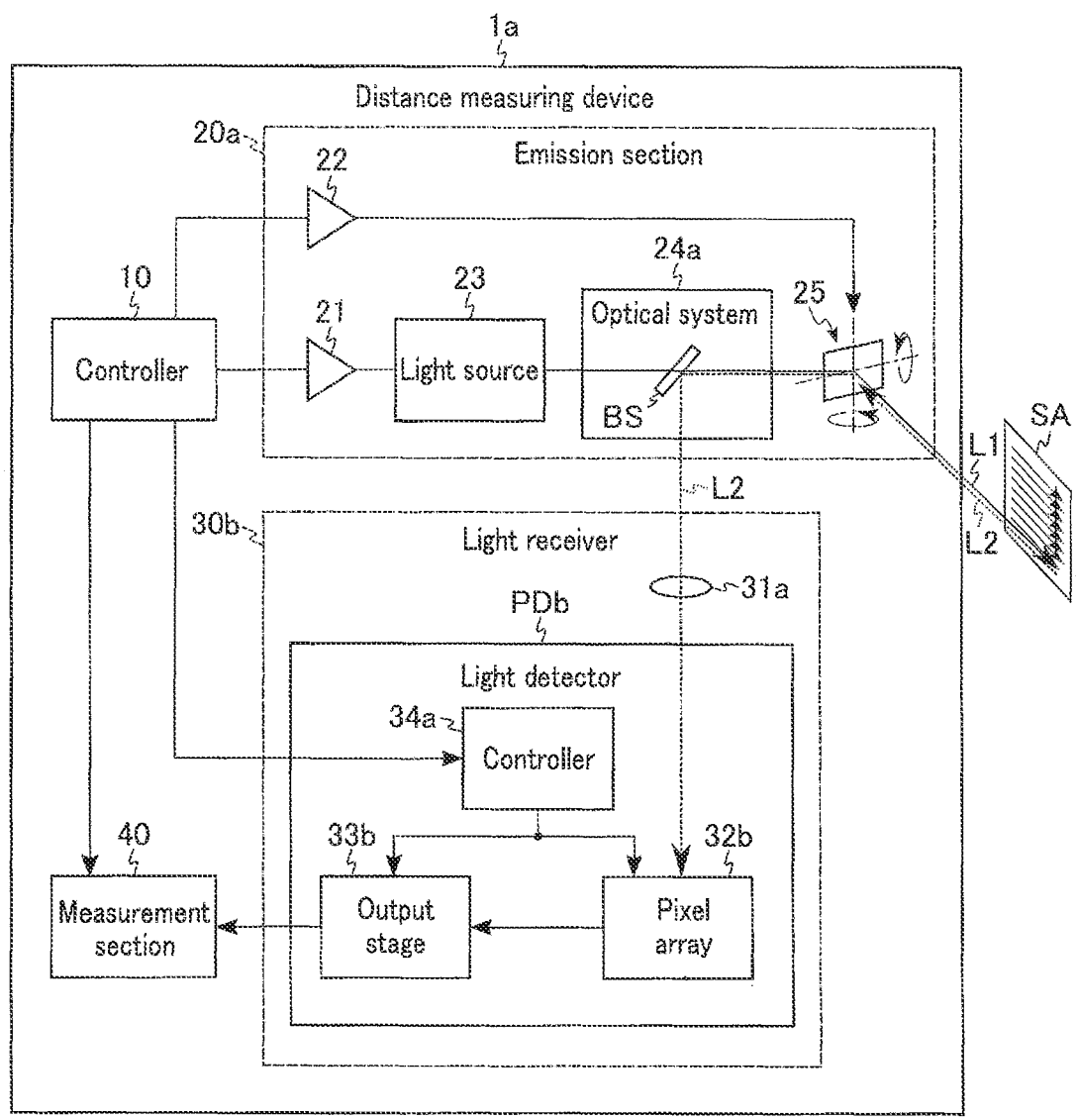
F I G. 55

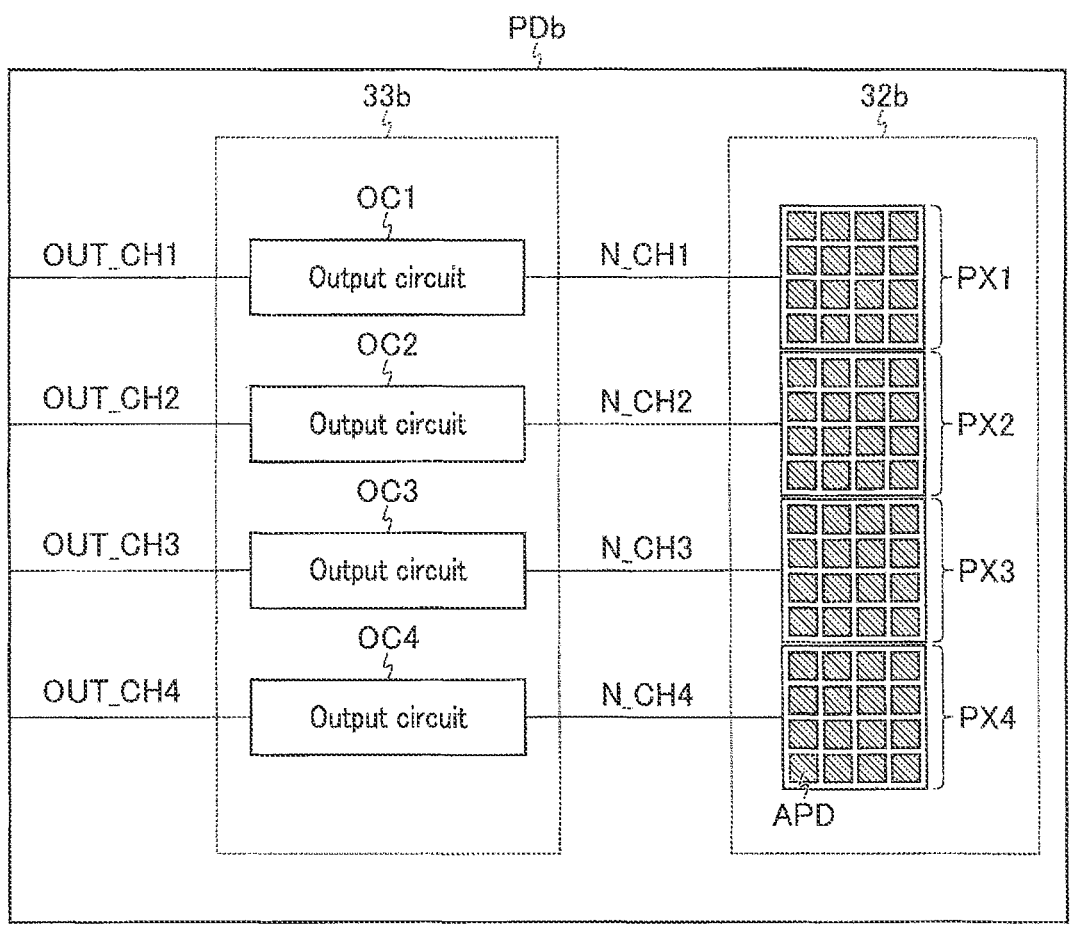
F I G. 56

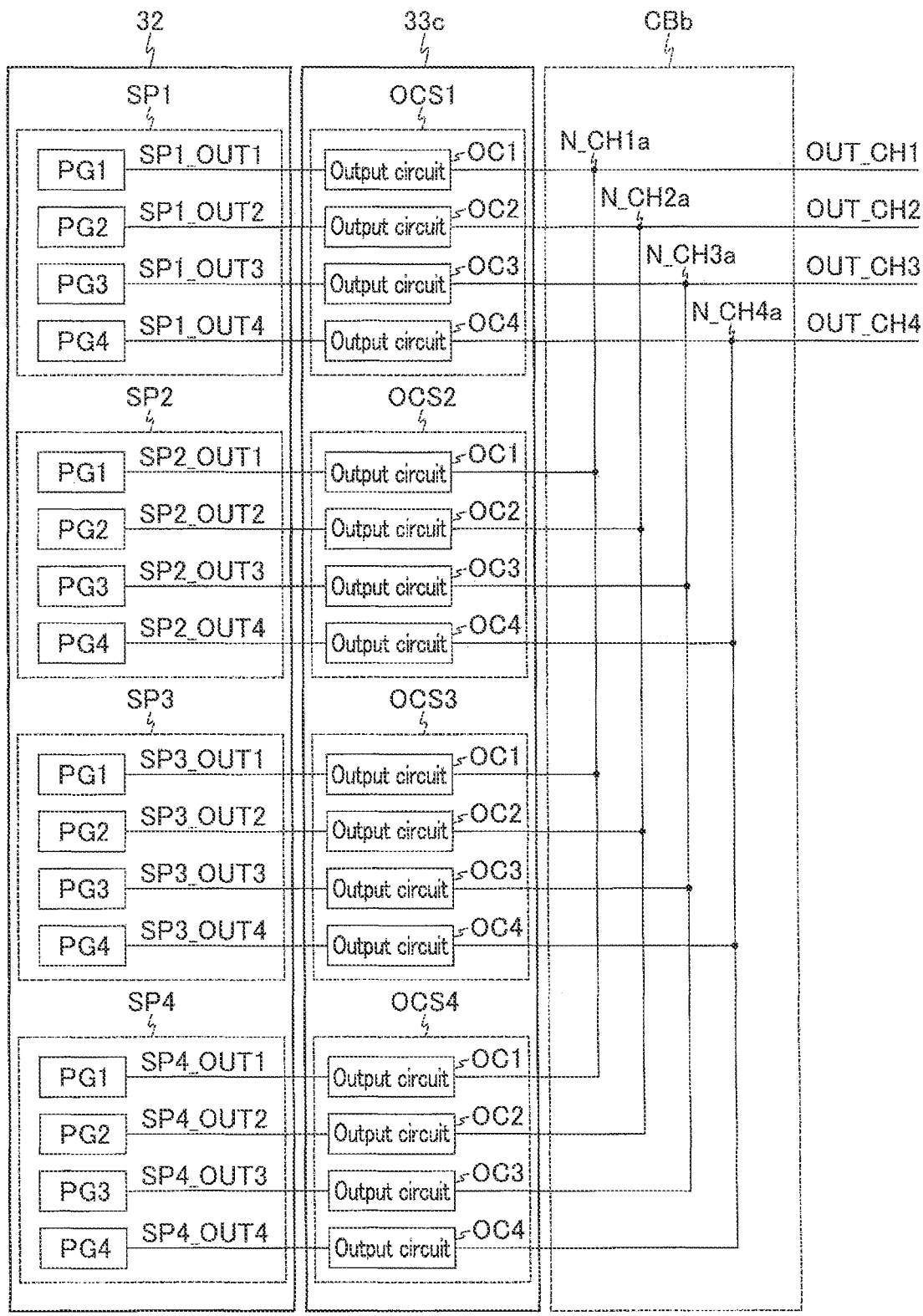
F I G. 57

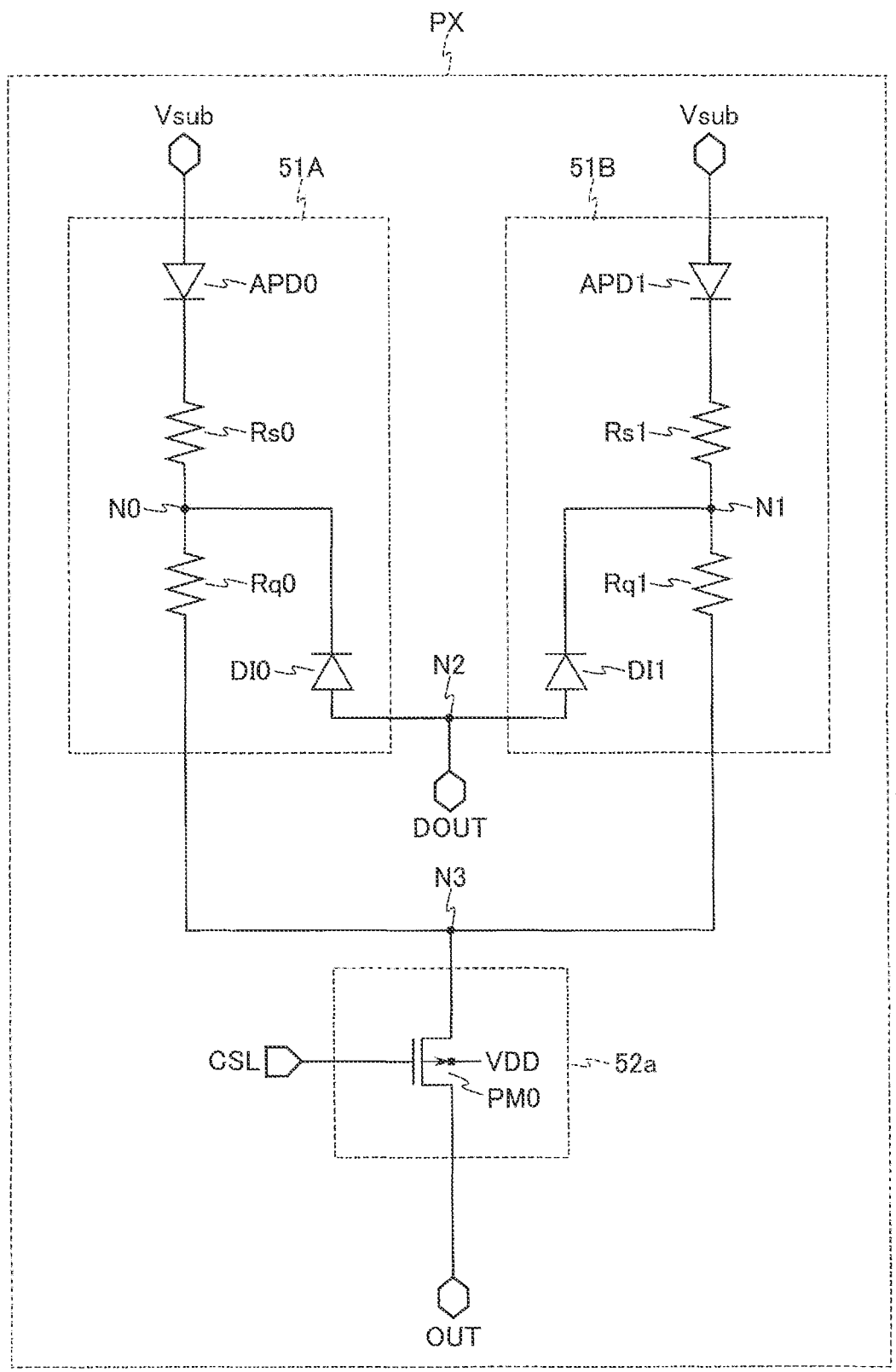
F I G. 58

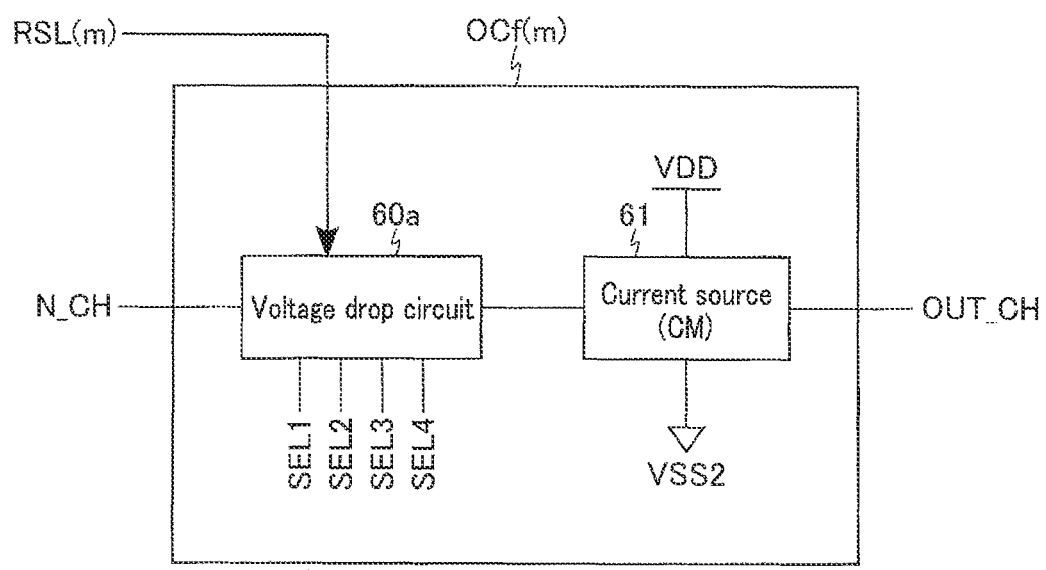
F I G. 59

LIGHT DETECTOR AND DISTANCE MEASURING DEVICE

CROSS-REFERENCE TO RELATED APPLICATIONS

This application is based upon and claims the benefit of priority from Japanese Patent Application No. 2021-096535, filed Jun. 9, 2021, the entire contents of which are incorporated herein by reference.

FIELD

Embodiments described herein relate generally to a light detector and a distance measuring device.

BACKGROUND

A distance measuring device called "LiDAR (Light Detection and Ranging)" is known. A LiDAR irradiates a target object with laser light, and detects the intensity of reflected light reflected from the target object by a sensor (light detector). Then, the LiDAR measures a distance from itself to the target object based on a light intensity signal output from the sensor. There are a number of sensors used in the LiDAR, but a two-dimensional sensor (2D sensor) comprising a plurality of silicon photomultipliers arrayed two-dimensionally is known to be a promising sensor for the future.

BRIEF DESCRIPTION OF THE DRAWINGS

FIG. 3 depicts a schematic diagram showing an example of configurations of an emission section and a light receiver included in the distance measuring device according to the first embodiment.

FIG. 9 depicts a block diagram showing another example of a configuration of a channel bonded part of the light detector included in the distance measuring device according to the first embodiment.

FIG. 11 depicts a circuit diagram showing an example of a circuit configuration of a signal processing circuit included in the measurement section included in the distance measuring device according to the first embodiment.

FIG. 15 depicts a circuit diagram showing an example of circuit configurations of APD units and a selection circuit included in a pixel included in the pixel array in the distance measuring device according to the first embodiment.

FIG. 16 depicts a waveform diagram showing a relationship between a light detection efficiency of an avalanche photodiode and a bias voltage applied to the avalanche photodiode.

FIG. 17 depicts a waveform diagram showing a relationship between an output current per avalanche photodiode and the bias voltage applied to the avalanche photodiode.

FIG. 18 depicts a circuit diagram showing an example of a circuit configuration of a shift circuit included in the pixel included in the pixel array in the distance measuring device according to the first embodiment.

FIG. 19 depicts a plan view showing an example of setting of an active area of the pixel array in the distance measuring device according to the first embodiment.

FIG. 21 depicts a circuit diagram showing an example of a circuit configuration of a voltage drop circuit included in the output circuit in the distance measuring device according to the first embodiment.

FIG. 27 depicts a circuit diagram showing a circuit configuration of a current source in a first modification of the first embodiment.

FIG. 28 depicts a circuit diagram showing a circuit configuration of a current source in a second modification of the first embodiment.

FIG. 29 depicts a block diagram showing an example of a configuration of an output circuit included in an output stage in a distance measuring device according to a second embodiment.

FIG. 30 depicts a circuit diagram showing an example of circuit configurations of a current source and an input stage included in the output circuit in the distance measuring device according to the second embodiment.

FIG. 31 depicts a block diagram showing an example of a configuration of an output circuit included in an output stage in a distance measuring device according to a third embodiment.

FIG. 33 depicts a circuit diagram showing an example of circuit configurations of a current source, an input stage, and a voltage adjustment circuit included in the output circuit in the distance measuring device according to the fourth embodiment.

FIG. 36 depicts a circuit diagram showing an example of circuit configurations of a current source, an input stage, and a voltage adjustment circuit included in an output circuit in a modification of the fourth embodiment.

FIG. 37 depicts a block diagram showing an example of a configuration of an output circuit included in an output stage in a distance measuring device according to a fifth embodiment.

FIG. 38 depicts a circuit diagram showing an example of a circuit configuration of a discharge circuit included in an output circuit in the distance measuring device according to the fifth embodiment.

FIG. 39 depicts a circuit diagram showing a modification of a circuit configuration of a discharge circuit included in an output circuit in the modification of the fifth embodiment.

FIG. 40 depicts a block diagram showing an example of a configuration of an output circuit included in an output stage in a distance measuring device according to a sixth embodiment.

FIG. 41 depicts a block diagram showing an example of a structure of a light detector included in the distance measuring device according to the sixth embodiment.

FIG. 42 depicts a circuit diagram showing a circuit configuration of a current source of a first configuration example included in the output circuit in the distance measuring device according to the sixth embodiment.

FIG. 43 depicts a circuit diagram showing a circuit configuration of a current source of a second configuration example included in the output circuit in the distance measuring device according to the sixth embodiment.

FIG. 44 depicts a circuit diagram showing a circuit configuration of a current source of a third configuration example included in the output circuit in the distance measuring device according to the sixth embodiment.

FIG. 45 depicts a circuit diagram showing a circuit configuration of a current source of a fourth configuration example included in the output circuit in the distance measuring device according to the sixth embodiment.

FIG. 46 depicts a circuit diagram showing a circuit configuration of a current source of a fifth configuration example included in the output circuit in the distance measuring device according to the sixth embodiment.

FIG. 47 depicts a schematic diagram showing an example of a configuration of a distance measuring device according to a seventh embodiment.

FIG. 50 depicts a schematic diagram showing an example of an adjusting value table stored in a storage part included in the light detector included in the distance measuring device according to the seventh embodiment.

FIG. 51 depicts a schematic diagram showing an example of an adjusting value table stored in a storage part included in a measurement section included in the distance measuring device according to the seventh embodiment.

FIG. 55 depicts a schematic diagram showing an example of configurations of an emission section and a light receiver included in a distance measuring device according to a modification of the seventh embodiment.

FIG. 56 depicts a plan view showing an example of a configuration of a light detector included in the distance measuring device according to the modification of the seventh embodiment.

FIG. 57 depicts a block diagram showing an example of a coupling relationship between a pixel array and an output stage in a light detector included in a distance measuring device according to an eighth embodiment.

FIG. 58 depicts a circuit diagram showing an example of circuit configurations of an APD unit and a selection circuit included in a pixel included in a pixel array in the distance measuring device according to the eighth embodiment.

FIG. 59 depicts a block diagram showing an example of a configuration of an output circuit included in an output stage in the distance measuring device according to the eighth embodiment.

DETAILED DESCRIPTION

Figure 1:
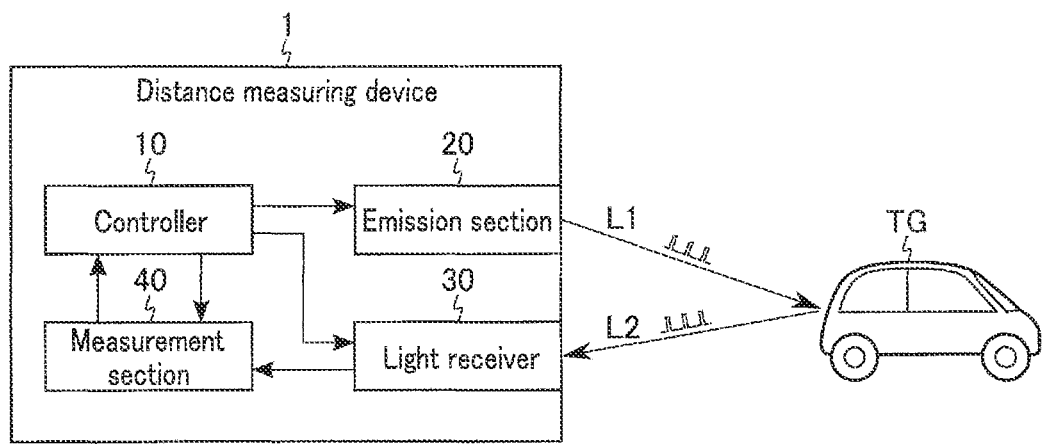
FIG. 1 depicts a schematic diagram showing an example of an overall configuration of a distance measuring device according to a first embodiment.

In general, according to one embodiment, a light detector includes a plurality of first pixels, a plurality of first selection circuits, and a first output circuit. The plurality of first pixels each includes an avalanche photodiode. The plurality of first selection circuits are respectively coupled to the first pixels. The first selection circuits are configured to output a signal output from a first pixel selected from the first pixels to a first node. The first output circuit is coupled to the first node. The first output circuit is configured to apply a first operating voltage to the avalanche photodiode included in the selected first pixel via a first selection circuit of the first selection circuits that is coupled to the selected first pixel, output an electric current based on the signal output from the selected first pixel to a second node, and change the first operating voltage.

Hereinafter, embodiments will be described with reference to the drawings. Each embodiment exemplifies a device and a method for embodying a technical idea of the invention. The drawings are schematic or conceptual, and the dimensions and ratios, etc. in the drawings are not always the same as those of the actual products. In the drawings to be referred to below, an "X direction", a "Y direction", and a "Z direction" correspond to directions intersecting one another. The technical idea of the present invention is not specified by the shapes, structures, arrangements, etc. of the structural elements.

In the following descriptions, structural elements having approximately the same function and configuration will be denoted by the same reference sign. The numbers after the letters that make up the reference signs are used to distinguish between elements referenced by reference signs containing the same characters and that have a similar configuration. When there is no need to distinguish components denoted by reference signs containing the same letters from each other, such components may be referred to by a reference sign containing the letters only.

[1] First Embodiment

A distance measuring device 1 according to a first embodiment is, for example, a type of LiDAR (Light Detection and Ranging) capable of measuring a distance between the distance measuring device 1 and a target object TG. The distance measuring device 1 according to the first embodiment will be described below.

[1-1] Configuration of Distance Measuring Device 1

[1-1-1] Overall Configuration of Distance Measuring Device 1

FIG. 1 depicts a schematic diagram showing an example of an overall configuration of the distance measuring device 1 according to the first embodiment. As shown in FIG. 1, in this example, a vehicle is located in front of the distance measuring device 1 as an example of a ranging target object TG. The distance measuring device 1 according to the first embodiment includes a controller 10, an emission section 20, a light receiver 30, and a measurement section 40.

The controller 10 controls an overall operation of the distance measuring device 1. The controller 10 includes, for example, a CPU (Central Processing Unit), a ROM (Read Only Memory), a RAM (Random Access Memory), and an oscillator, all of which are not shown. The ROM stores a program used for an operation of the distance measuring device 1, etc. The CPU controls the emission section 20, light receiver 30, and measurement section 40 according to the program stored in the ROM. The RAM is used as a working area of the CPU. The oscillator is used for generating an intermittent pulse signal. The controller 10 is also capable of executing various data processing and arithmetic processing.

The emission section 20 intermittently generates and emits laser light. The generated and emitted laser light is applied to the target object TG, and is used for measuring a distance between the distance measuring device 1 and the target object TG. In the present specification, the laser light emitted from the emission section 20 is referred to as "outgoing light L1". The outgoing light L1 reflected by the target object TG is referred to as "reflected light L2". The emission section 20 may be referred to as a light emitter.

The light receiver 30 detects light incident on the distance measuring device 1, and transfers a light reception result to the measurement section 40. In other words, the light receiver 30 converts the light incident on the distance measuring device 1 into an electric signal, and transfers the converted electric signal to the measurement section 40. The light receiver 30 is used for detecting the reflected light L2 intermittently incident on the distance measuring device 1.

The measurement section 40 measures a time at which the light receiver 30 detects the reflected light L2 based on the light reception result transferred from the light receiver 30. Then, the measurement section 40 measures the distance between the distance measuring device 1 and the target object TG based on a time at which the outgoing light L1 is emitted from the emission section 20 and the time at which the light receiver 30 detects the reflected light L2. The time at which the outgoing light L1 is emitted from the emission section 20 is, for example, reported from the controller 10. Further, the measurement section 40 may input a part of a result of processing an electric signal that is input from the light receiver 30 to the controller 10.

In the distance measuring device 1, the controller 10 is described as one block independent from the emission section 20 and the light receiver 30. The controller 10 is responsible for overall control of the distance measuring device 1, and gives an instruction to the controller 10 of each of the light receiver 30 and the measurement section 40. In actuality, as will be described later, some of the functions of the controller 10 may be implemented in the light receiver 30 and the measurement section 40. Thereby, the distance measuring device 1 can perform fine manipulations in a timely manner. Controls that are not particularly clearly described in the following descriptions are assumed to be executed by the controller 10 for the sake of simplicity.

Figure 2:
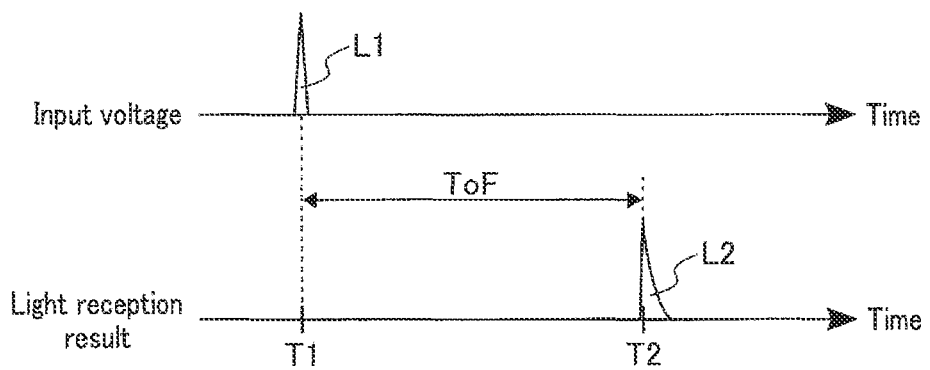
FIG. 2 depicts a schematic diagram that outlines a ranging method of the distance measuring device according to the first embodiment.

FIG. 2 depicts a schematic diagram that outlines a ranging method of the distance measuring device 1 according to the first embodiment. The waveform of an input voltage indicates a temporal change in voltage to be supplied to a light source included in the emission section 20. The waveform of a light reception result indicates a temporal change in strength of an electric signal based on light detected by the light receiver 30. As shown in FIG. 2, when a pulse signal is supplied to the light source of the emission section 20, the outgoing light L1 is generated and emitted based on a rise of the pulse signal. Then, the outgoing light L1 is applied to the target object TG, and the light receiver 30 detects the reflected light L2 reflected from the target object TG.

The measurement section 40 calculates a time of flight (ToF) of the outgoing light L1 based on a difference between an emission time T1 at which the outgoing light L1 is emitted from the emission section 20 and a light-receiving time T2 at which the light receiver 30 detects the reflected light L2. Then, the measurement section 40 measures (ranges) the distance between the distance measuring device 1 and the target object TG based on the time of flight of the outgoing light L1 and the velocity of the laser light. Such a ranging method of the distance measuring device 1 may be called a "ToF method". The measurement section 40 outputs a ranging result for each set of the outgoing light L1 and the reflected light L2 that the distance measuring device 1 emits and receives.

It suffices that the measurement section 40 decides the emission time T1 based at least on a time relating to emission of the outgoing light L1, and decides the light-receiving time T2 based on a time relating to light reception of the reflected light L2. For example, the measurement section 40 may decide the emission time T1 and the light-receiving time T2 based on a rise time of a signal or based on a peak time of a signal. The controller 10 may be provided for each of the emission section 20, the light receiver 30, and the measurement section 40. Processing of the measurement section 40 may be performed by the controller 10. The distance measuring device 1 may include an image processor that generates an image based on a ranging result of the measurement section 40. Such an image is referred to by a control program of a vehicle, etc. equipped with the distance measuring device 1.

[1-1-2] Configuration of Emission Section 20

FIG. 3 depicts a schematic diagram showing an example of a configuration of the emission section 20 and the light receiver 30 included in the distance measuring device 1 according to the first embodiment. As shown in FIG. 3, the emission section 20 includes, for example, drivers 21 and 22, a light source 23, an optical system 24, and a mirror 25.

The driver 21 generates a drive current according to a pulse signal input from the oscillator of the controller 10. Then, the driver 21 supplies the generated drive current to the light source 23. That is, the driver 21 functions as a current supply source of the light source 23.

The driver 22 generates a drive current according to control performed by the controller 10. Then, the driver 22 supplies the generated drive current to the mirror 25. That is, the driver 22 functions as a power supply circuit of the mirror 25.

The light source 23 is a laser light source, such as a laser diode. The light source 23 intermittently emits laser light (outgoing light L1) based on the intermittent drive current (pulse signal) supplied from the driver 21. The laser light emitted by the light source 23 is incident on the optical system 24.

The optical system 24 can include a plurality of lenses and optical elements. The optical system 24 is arranged on an optical path of the outgoing light L1 emitted by the light source 23. For example, the optical system 24 collimates the incident outgoing light L1, and guides the collimated outgoing light L1 to the mirror 25. The optical system 24 may include a beam shaper, a beam splitter, etc.

The mirror 25 is driven based on the drive current supplied from the driver 22, and reflects the outgoing light L1 incident on the mirror 25. For example, a reflecting surface of the mirror 25 is formed to be rotatable or swingable around two axes intersecting each other. The outgoing light L1 reflected by the mirror 25 is applied to the target object TG outside the distance measuring device 1.

In the distance measuring device 1 according to the first embodiment, the controller 10 changes an emitting direction of the outgoing light L1 by controlling the mirror 25 so as to scan an area to be ranged. The emission section 20 may have a configuration capable of performing scanning using laser light, or may have other configurations. For example, the emission section 20 may further include an optical system arranged on an optical path of laser light reflected by the mirror 25.

In the present specification, an area that is ranged by the distance measuring device 1 is referred to as a "scanning area SA". The distance measuring device 1 performs a measurement operation of a plurality of points within the scanning area SA to measure distances from various target objects TG. In addition, a set of ranging results of a plurality of points corresponding to single scanning is referred to as a "frame". The distance measuring device 1 performs scanning continuously so that it can sequentially acquire a distance from a target object TG in front of itself.

Figure 4:
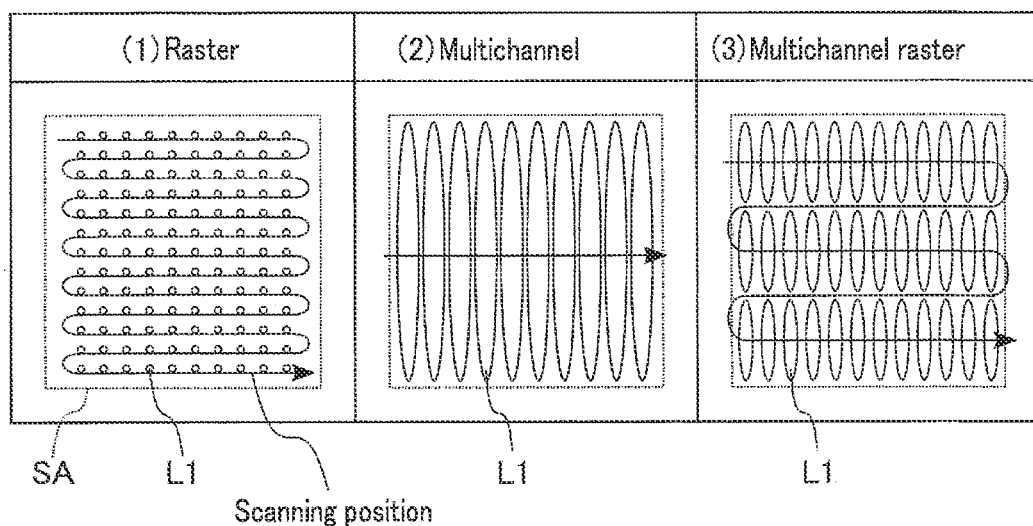
FIG. 4 depicts a table showing an example of a scanning method of the emission section included in the distance measuring device according to the first embodiment.

FIG. 4 depicts a table showing an example of a scanning method of the emission section 20 included in the distance measuring device 1 according to the first embodiment. The table shown in FIG. 4 indicates three types of combinations of a name and a specific example of a scanning method. In FIG. 4, a reference sign "L1" indicates the shape and the emission timing of the outgoing light L1 in the associated scanning method. The arrow "scanning position" schematically indicates a path in which a plurality of beams of outgoing light L1 are emitted in sequence, within the scanning area SA. "Leftward direction" and "rightward direction" refer to the leftward direction and the rightward direction on the drawing sheet, respectively.

In the scanning method shown in FIG. 4 (1), for example, the outgoing light L1 having a dot-shaped irradiation surface is used. Then, the distance measuring device 1 performs scanning in the rightward and leftward directions repeatedly. For example, the distance measuring device 1 scans in the rightward direction and then turns back to scan in the leftward direction, and after scanning in the rightward direction again, turns back again to scan in the leftward direction. Such a scanning method is referred to as "raster scanning". As a means for realizing the raster scanning, it is conceivable to use, for example, a biaxial mirror as the mirror 25. Note that the distance measuring device 1 turns back to scan in the leftward direction in this example, but turning back may be omitted to perform only rightward scanning.

In the scanning method shown in FIG. 4 (2), the outgoing light L1 having an irradiation surface elongated in the longitudinal direction is used. In this case, the emission section 20 includes, for example, a collimator lens and a cylindrical lens. Then, the distance measuring device 1 irradiates a plurality of pixels PX in a longitudinal line at the same time, and scans in the rightward direction. Such a scanning method is referred to as "multichannel scanning". As a means for realizing the multichannel scanning, it is conceivable to use a polygon mirror, a revolving mirror, or a single-axis MEMS mirror, as the mirror 25. The multichannel scanning may be realized by rotating the distance measuring device 1 itself without using the mirror 25. The multichannel scanning can irradiate a plurality of pixels PX at the same time in a single laser emission. Thus, use of the multichannel scanning enables higher resolution and/or a higher frame rate than the raster scanning.

In the scanning method shown in FIG. 4 (3), the outgoing light L1 having an irradiation surface elongated in the longitudinal direction is used. In this case, the emission section 20 includes, for example, an anisotropic aspherical collimator lens. Then, the distance measuring device 1 irradiates a plurality of pixels in a longitudinal line at the same time and scans in the rightward direction, and then repeatedly performs scanning shifted in the perpendicular direction. Such a scanning method is referred to as "multichannel raster scanning". As a means for realizing the multichannel raster scanning, it is conceivable to use a polygon mirror having different tilt angles, a revolving mirror, a biaxial mirror, etc., as the mirror 25. Such multichannel raster scanning can also irradiate a plurality of pixels PX at the same time in a single laser emission in the same manner as the multichannel scanning, and thus can enable higher resolution and/or a higher frame rate than the raster scanning. Thus, in order for the distance measuring device 1 to obtain a certain level of high resolution and high frame rate, it is preferable that the multichannel raster scanning be used.

The above-described scanning methods are only examples. The scanning methods shown in FIGS. 4 (1) to (3) correspond to mechanical methods. The distance measuring device 1 may use an optical phased array (OPA) method as another scanning method. The number of straight-line paths and the scanning direction in single scanning may be set to other settings. The operations and effects provided by the distance measuring device 1 according to the first embodiment do not depend on the scanning method of the outgoing light L1. Thus, the distance measuring device 1 according to the first embodiment may perform scanning by using any one of the mechanical methods and the OPA method. In the following, a case where the distance measuring device 1 uses the multichannel raster scanning will be described.

[1-1-3] Configuration of Light Receiver 30

A configuration of the light receiver 30 included in the distance measuring device 1 according to the first embodiment will be described with reference to FIG. 3 again. As shown in FIG. 3, the light receiver 30 includes, for example, an optical system 31 and a light detector PD. The light detector PD includes, for example, a pixel array 32, an output stage 33, and a controller 34. Each configuration of the light detector PD can be formed on the same substrate (chip).

The optical system 31 can include at least one lens. The optical system 31 collects the reflected light L2 incident on the distance measuring device 1 in the pixel array 32.

The pixel array 32 converts light incident on that pixel array 32 via the optical system 31 into an electric signal. The pixel array 32 includes, for example, a photomultiplier element using a semiconductor. As the photomultiplier element, for example, a single-photon avalanche diode (SPAD), which is a type of avalanche photodiode, is used. The electric signal (light reception result) converted by the pixel array 32 is output to the output stage 33.

The output stage 33 performs processing for outputting the electric signal transferred from the pixel 32, e.g., adjusts the output level (performs processing for intensifying and reducing the electric current), and outputs the signal to the measurement section 40.

The controller 34 controls an overall operation of the light detector PD based on the control of the controller 10.

In the distance measuring device 1 according to the first embodiment, an optical axis of light incident on the light detector PD of the light receiver 30 is different from that of the light source 23 of the emission section 20. That is, the distance measuring device 1 includes a non-coaxial optical system between the emission section 20 and the light receiver 30. The light receiver 30 may have other configurations, as long as it can detect the reflected light L2 incident on the distance measuring device 1. For example, a coaxial optical system or a separation optical system may be used for the distance measuring device 1.

(Configuration of Light Detector PD)

Figure 5:
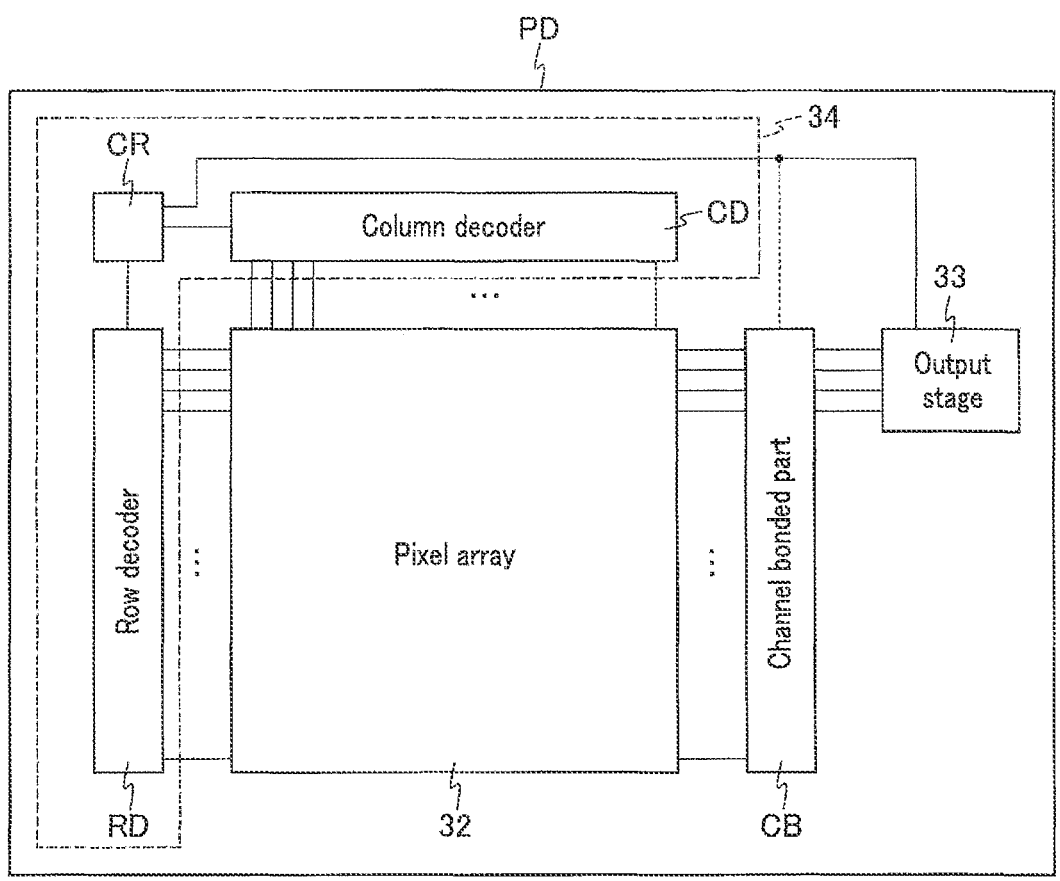
FIG. 5 depicts a plan view showing an example of a planar layout of a light detector included in the distance measuring device according to the first embodiment.

FIG. 5 depicts a plan view showing an example of a planar layout of the light detector PD included in the distance measuring device 1 according to the first embodiment. As shown in FIG. 5, in the light detector PD, the pixel array 32 includes, for example, a rectangular light-receiving surface. The controller 34 includes a column decoder CD, a row decoder RD, and a control register CR. The light detector PD includes a channel bonded part CB.

The column decoder CD is provided along a column direction of the pixel array 32. The column decoder CD and the pixel array 32 are coupled by a plurality of column selection lines. The column decoder CD can select any one of a plurality of pixels PX arranged in the column direction by selecting any one of the column selection lines.

The row decoder RD is provided along a row direction of the pixel array 32. The row decoder RD and the pixel array 32 are coupled by a plurality of row selection lines. The row decoder RD can select any one of a plurality of pixels PX arranged in the row direction by selecting any one of the row selection lines.

The control register CR controls the column decoder CD, the row decoder RD, and the output stage 33 based on an instruction from the controller 10. The control register CR may further control the channel bonded part CB.

The channel bonded part CB is, for example, provided along the row direction of the pixel array 32. Then, the channel bonded part CB selectively couples the pixel array 32 and the output stage 33. Details of the channel bonded part CB will be described later.

(Configuration of Pixel Array 32)

Figure 6:
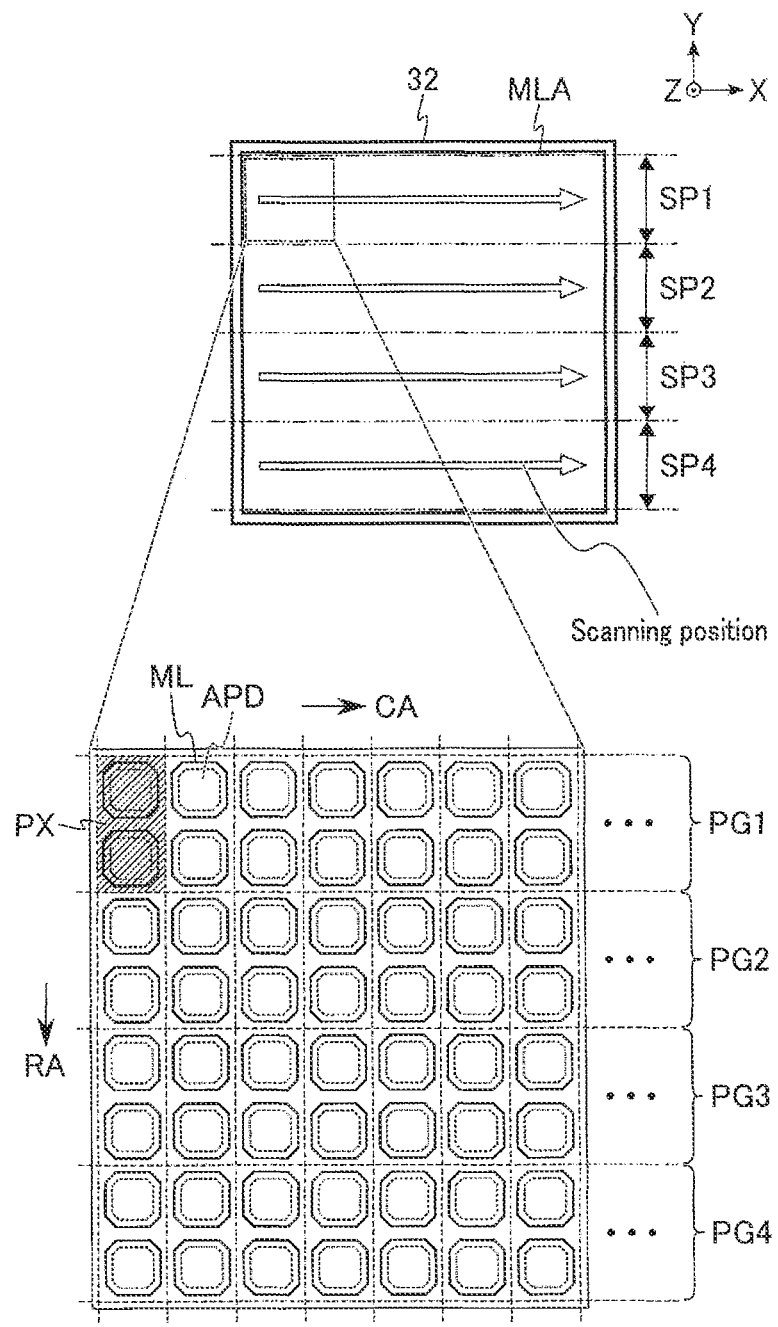
FIG. 6 depicts a plan view showing an example of a planar layout of a pixel array in the distance measuring device according to the first embodiment.

FIG. 6 depicts a plan view showing an example of a planar layout of the pixel array 32 in the distance measuring device 1 according to the first embodiment, showing the entire light-receiving surface of the pixel array 32 and an enlarged part of the light-receiving surface of the pixel array 32. A dashed grid added to the enlarged part illustrates a region of each pixel PX. As shown in FIG. 6, the pixel array 32 includes a plurality of avalanche photodiodes APD.

The light-receiving surface of the pixel array 32 can be divided into a plurality of regions in accordance with scanning positions. For example, the light-receiving surface of the pixel array 32 is provided with scanning parts SP1 to SP4 arranged in the Y direction (row direction). Each of the scanning parts SP1 to SP4 is, for example, a rectangular region, and includes a plurality of pixels PX arranged along the X direction (column direction). The scanning part SP can also include a plurality of pixels PX arranged in the Y direction. Furthermore, the light-receiving surface of the pixel array 32 can be divided into a plurality of regions for each scanning part SP. In the present example, each scanning part SP of the pixel array 32 includes pixel groups PG1 to PG4 arranged in the Y direction. Each of the pixel groups PG1 to PG4 is, for example, a rectangular region, and includes a plurality of pixels PX arranged along the X direction. The number of pixel groups PG and the number of scanning parts SP can be changed according to the design of the pixel array 32.

A case in which the pixel array 32 is divided into the scanning parts SP1 to SP4 and each scanning part SP is rectangular has been exemplified, but the present invention is not limited thereto. The scanning parts SP1 to SP4 may overlap one another, and may not be rectangular. Usually, a fixed number (e.g., a plurality) of pixels PX are selected, i.e., set to an active state, in each of the Y direction and the X direction in a single measurement. Positions in the Y direction of the fixed number of pixels PX set to the active state can be changed every time a measurement is performed. Furthermore, the controller 34 may provide a set of pixels PX to be set to an active state at a plurality of portions on the pixel array 32 at the same time.

The pixel PX is used as the smallest unit of the region in which the pixel array 32 can detect light. The number of avalanche photodiodes APD constituting the pixel PX may be at least one or more. In the light detector PD according to the first embodiment, two avalanche photodiodes APD adjacent to each other in the Y direction constitute one pixel PX. A pixel PX containing a plurality of avalanche photodiodes APD is also referred to as a silicon photomultiplier (SiPM). A dynamic range of light that can be detected by the pixel array 32 can vary depending on the number of avalanche photodiodes APD contained in one pixel PX. In addition, a direction of an output current of the avalanche photodiode APD can change depending on the polarity of the avalanche photodiode APD.

To each pixel PX, for example, a set of a column address CA and a row address RA is assigned. That is, each pixel PX can be specified by a set of a column address CA and a row address RA. The avalanche photodiode APD can be set to an active state or an inactive state by the controller 34. The avalanche photodiode APD in the active state detects light incident on that avalanche photodiode APD, and outputs an optical signal indicating a detection result to the output stage 33. The avalanche photodiode APD in the inactive state is usually in a power-saving state, and cannot detect light.

The controller 34 can set at least one of the pixels PX arranged in the X direction to an active state or an inactive state via the column decoder CD. Similarly, the controller 34 can set at least one of the pixels PX arranged in the Y direction to an active state or an inactive state via the row decoder RD. The control register CR can store fixed setting such as setting of an active area and setting of the output stage 33 in the light detector PD. The active area is an area used for detecting the reflected light L2 in the pixel array 32 and composed of at least one pixel PX. By using the fixed setting stored in the control register CR, the controller 10 may control the column decoder CD, the row decoder RD, and the output stage 33 via the control register CR. The fixed settings include, for example, the number of pixels PX selected at the same time.

In addition, the light receiver 30 further includes a microlens array MLA provided so as to overlap the pixel array 32. The microlens array MLA is included in the optical system 31. The microlens array MLA includes a plurality of microlenses ML. The microlenses ML are, for example, arranged in a matrix. The microlenses ML respectively overlap a plurality of avalanche photodiodes APD. Further, a microlens ML is formed so that light transmitted through itself is incident on the associated avalanche photodiode APD. Each microlens ML may be formed so that light is incident on a plurality of avalanche photodiodes APD.

(Configuration of Scanning Part SP)

Figure 7:
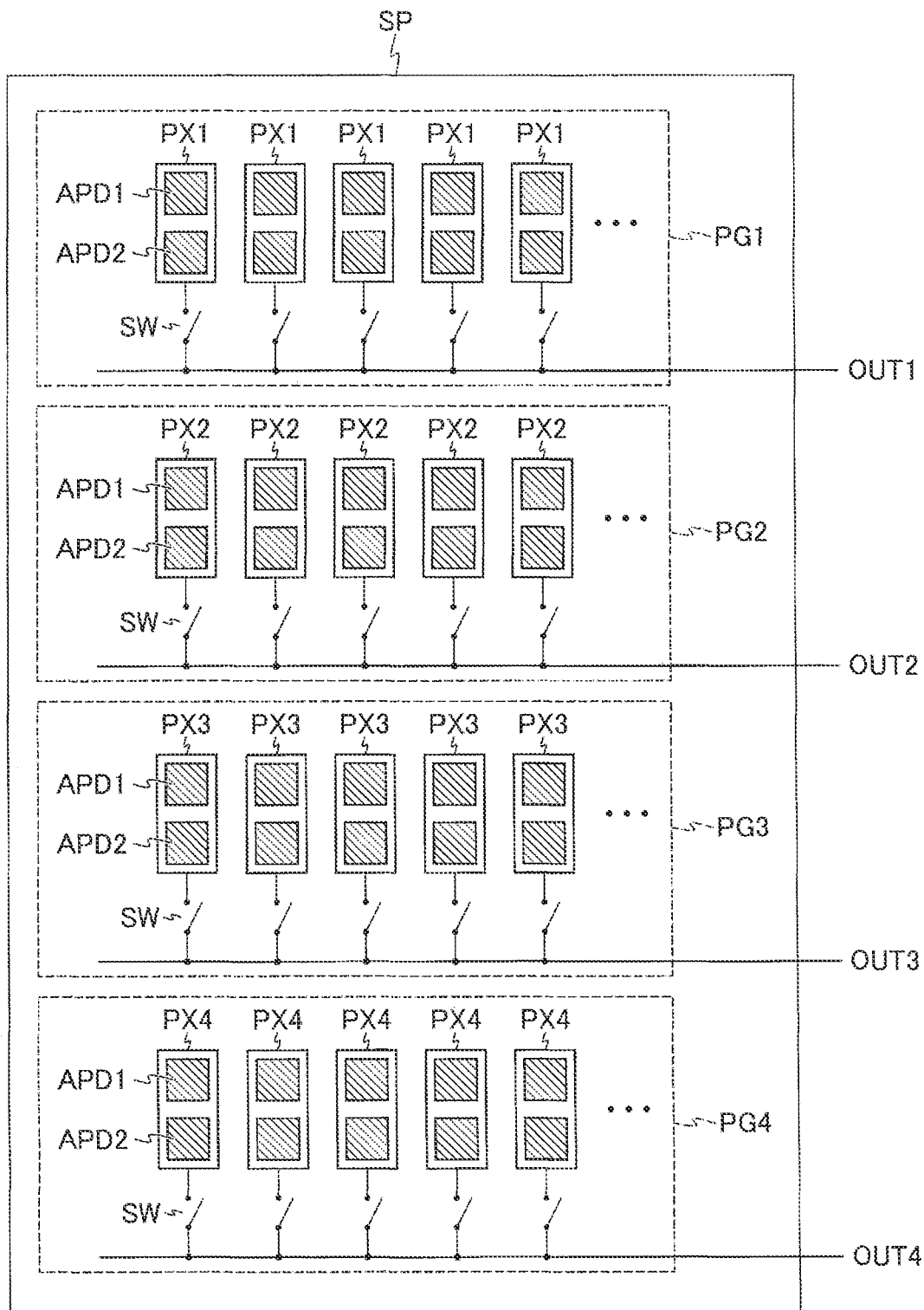
FIG. 7 depicts a block diagram showing an example of a configuration included in one scanning part of the pixel array in the distance measuring device according to the first embodiment.

FIG. 7 depicts a block diagram showing an example of a configuration included in one scanning part SP of the pixel array 32 in the distance measuring device 1 according to the first embodiment. As shown in FIG. 7, in each scanning part SP, the pixel array 32 includes, for example, a plurality of pixels PX1 to PX4, a plurality of switch parts SW, and a plurality of output nodes OUT1 to OUT4.

Each of the pixels PX1 to PX4 includes, for example, avalanche photodiodes APD1 and APD2. The pixels PX1 to PX4 are included in the pixel groups PG1 to PG4, respectively. Each of the pixels PX1 is coupled to the output node OUT1 via the switch part SW. Each of the pixels PX2 is coupled to the output node OUT2 via the switch part SW. Each of the pixels PX3 is coupled to the output node OUT3 via the switch part SW. Each of the pixels PX4 is coupled to the output node OUT4 via the switch part SW. Each of the output nodes OUT1 to OUT4 may be referred to as a "channel". That is, the pixel array 32 in the scanning part SP can include a plurality of channels. Pixels PX in the same row are coupled to the same channel. The channel is a path of a signal, and corresponds to an output of the light receiver 30 one-to-one.

Each switch part SW electrically couples (ON state) or decouples (OFF state) a pixel PX and an output node OUT associated with that pixel PX according to the control of the controller 34. Specifically, the controller 34 sets a switch part SW associated with a pixel PX to be set to an active state, i.e., a selected pixel PX, to an ON state, and sets a switch part SW associated with a pixel PX to be set to an inactive state, i.e., a non-selected pixel PX, to an OFF state. The controller 34 may set a plurality of pixels PX within one channel to an active state at the time of a single ranging (measurement). In this case, outputs of the pixels PX set to the active state are added by coupling of a shared output node OUT, and an output of a pixel PX set to an inactive state is not input to that output node OUT.

The output of the pixel PX in the inactive state can be input to the output node OUT at a leak level of the switch part SW. In terms of function, the coupling of the output node OUT corresponds to an adder. The outputs of the pixels PX set to the active state may be weighted and added according to the selected positions. The controller 10 basically selects a plurality of pixels PX successively arranged in the X direction. At the time of not measuring a distance, an output of a non-selected pixel PX may be input to the output node OUT. An output of a non-selected pixel PX at the time of not measuring a distance is, for example, used for confirming whether or not there is a shift in a light incident position.

(Coupling Relationship between Pixel Array 32 and Output Stage 33)

Figure 8:
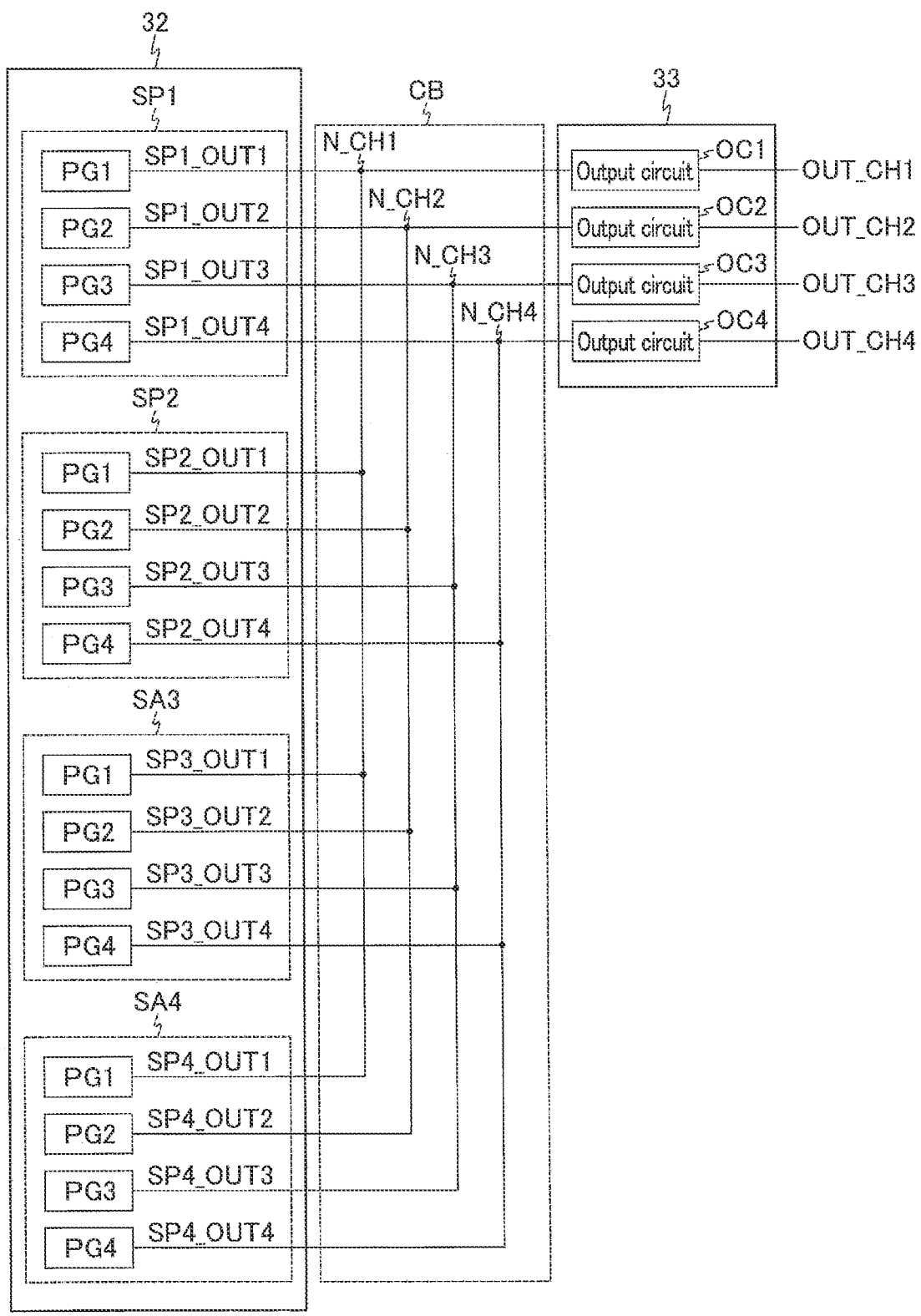
FIG. 8 depicts a block diagram showing an example of a coupling relationship between the pixel array and an output stage in the light detector included in the distance measuring device according to the first embodiment.

FIG. 8 depicts a block diagram showing an example of a coupling relationship between the pixel array 32 and the output stage 33 in the light detector PD included in the distance measuring device 1 according to the first embodiment. Hereinafter, four output nodes OUT1 to OUT4 respectively coupled to pixel groups PG1 to PG4 of the scanning part SP1 will be referred to as "SP1_OUT1" to "SP1_OUT4", respectively. Four output nodes OUT1 to OUT4 respectively coupled to pixel groups PG1 to PG4 of the scanning part SP2 will be referred to as "SP2_OUT1" to "SP2_OUT4", respectively. Four output nodes OUT1 to OUT4 respectively coupled to pixel groups PG1 to PG4 of the scanning part SP3 will be referred to as "SP3_OUT1" to "SP3_OUT4", respectively. Four output nodes OUT1 to OUT4 respectively coupled to pixel groups PG1 to PG4 of the scanning part SP4 will be referred to as "SP4_OUT1" to "SP4_OUT4", respectively. As shown in FIG. 8, the channel bonded part CB includes a plurality of nodes N_CH1 to N_CH4. The output stage 33 includes a plurality of output circuits OC1 to OC4 and output channels OUT_CH1 to OUT_CH4.

The node N_CH is provided for each channel of each scanning part SP, and is shared by the scanning parts SP as appropriate. Specifically, the node N_CH1 (a first node) is coupled to the output nodes SP1_OUT1, SP2_OUT1, SP3_OUT1, and SP4_OUT1. The node N_CH2 is coupled to the output nodes SP1_OUT2, SP2_OUT2, SP3_OUT2, and SP4_OUT2. The node N_CH3 is coupled to the output nodes SP1_OUT3, SP2_OUT3, SP3_OUT3, and SP4_OUT3. The node N_CH4 is coupled to the output nodes SP1_OUT4, SP2_OUT4, SP3_OUT4, and SP4_OUT4. That is, the node N_CH1 is coupled to the output node OUT1 of each of the scanning parts SP1 to SP4. The node N_CH2 is coupled to the output node OUT2 of each of the scanning parts SP1 to SP4. The node N_CH3 is coupled to the output node OUT3 of each of the scanning parts SP1 to SP4. The node N_CH4 is coupled to the output node OUT4 of each of the scanning parts SP1 to SP4.

In this way, pixels PX in different rows are coupled to each node N_CH. In other words, rows and channels are cyclically coupled many-to-one. In this case, a relationship between an output of a channel and a vertical position of a pixel PX changes according to a position of a selected scanning part SP. For example, a position of a pixel PX coupled to the node N_CH1 in the scanning part SP2 is below a position of a pixel PX coupled to the node N_CH2 in the scanning part SP1. As a countermeasure, when measuring the distance, the controller 10 selects any one of the plurality of scanning parts SP, and an output of an active pixel PX included in the selected scanning part SP is input to each node N_CH. Then, the measurement section 40 rearranges measurement results according to the order of channel output. The configuration is not limited thereto, and the channel outputs may be rearranged within the pixel array 32.

The output circuit OC1 adjusts an output level of a signal input to the node N_CH1 and outputs it to the output channel OUT_CH1 (a second node). The output circuit OC2 adjusts an output level of a signal input to the node N_CH2 and outputs it to the output channel OUT_CH2. The output circuit OC3 adjusts an output level of a signal input to the node N_CH3 and outputs it to the output channel OUT_CH3. The output circuit OC4 adjusts an output level of a signal input to the node N_CH4 and outputs it to the output channel OUT_CH4. To each output circuit OC, only an output of a selected pixel PX is input. An input to the output circuit OC may contain a leak component from a non-selected pixel PX. The number of the plurality of output channels coupled to the output stage 33 corresponds to the outputs of the light receiver 30 one-to-one. The number of output circuits OC included in the output stage 33 can be changed according to the design of the light receiver 30. For example, an output terminal may be coupled to each of the output channels OUT_CH. The output channel OUT_CH may be referred to as a node.

FIG. 8 illustrates a case where each of the nodes N_CH1 to N_CH4 included in the channel bonded part CB is a mere coupling part, but the present invention is not limited thereto. FIG. 9 depicts a block diagram showing another example of a configuration of the channel bonded part CB of the light detector PD included in the distance measuring device 1 according to the first embodiment. As shown in FIG. 9, a channel bonded part CBa may include a plurality of transistors CST. The transistors CST are, for example, P-type transistors.

Specifically, one transistor CST is coupled between the node N_CH1 and each of the output nodes SP1_OUT1 to SP1_OUT4. One transistor CST is coupled between the node N_CH2 and each of the output nodes SP2_OUT1 to SP2_OUT4. One transistor CST is coupled between the node N_CH3 and each of the output nodes SP3_OUT1 to SP3_OUT4. One transistor CST is coupled between the node N_CH4 and each of the output nodes SP4_OUT1 to SP4_OUT4.

A control signal CS1 is input to the gate of each transistor CST coupled to the scanning part SP1. A control signal CS2 is input to the gate of each transistor CST coupled to the scanning part SP2. A control signal CS3 is input to the gate of each transistor CST coupled to the scanning part SP3. A control signal CS4 is input to the gate of each transistor CST coupled to the scanning part SP4. The controller 34 can selectively couple the nodes N_CH1 to N_CH4 and one scanning part SP by setting any one of the control signals CS1 to CS4 to an "L" level. In other words, the transistor CST is provided for each row. Then, the controller 34 can selectively make conductive a connection between an associated output node OUT and a node N_CH by controlling a transistor CST coupled to the row to be selected to be in an ON state.

The channel bonded part CBa can suppress parasitic capacitances of a plurality of interconnects coupling the pixel array 32 and the output stage 33 by the transistors CST. As a result, the channel bonded part CBa can transmit a signal at a high speed between the pixel array 32 and the output stage 33. The transistors CST may be N-type transistors. The control signal CS may be controlled not for each scanning part SP but for each transistor CST.

[1-1-4] Configuration of Measurement Section 40

Figure 10:
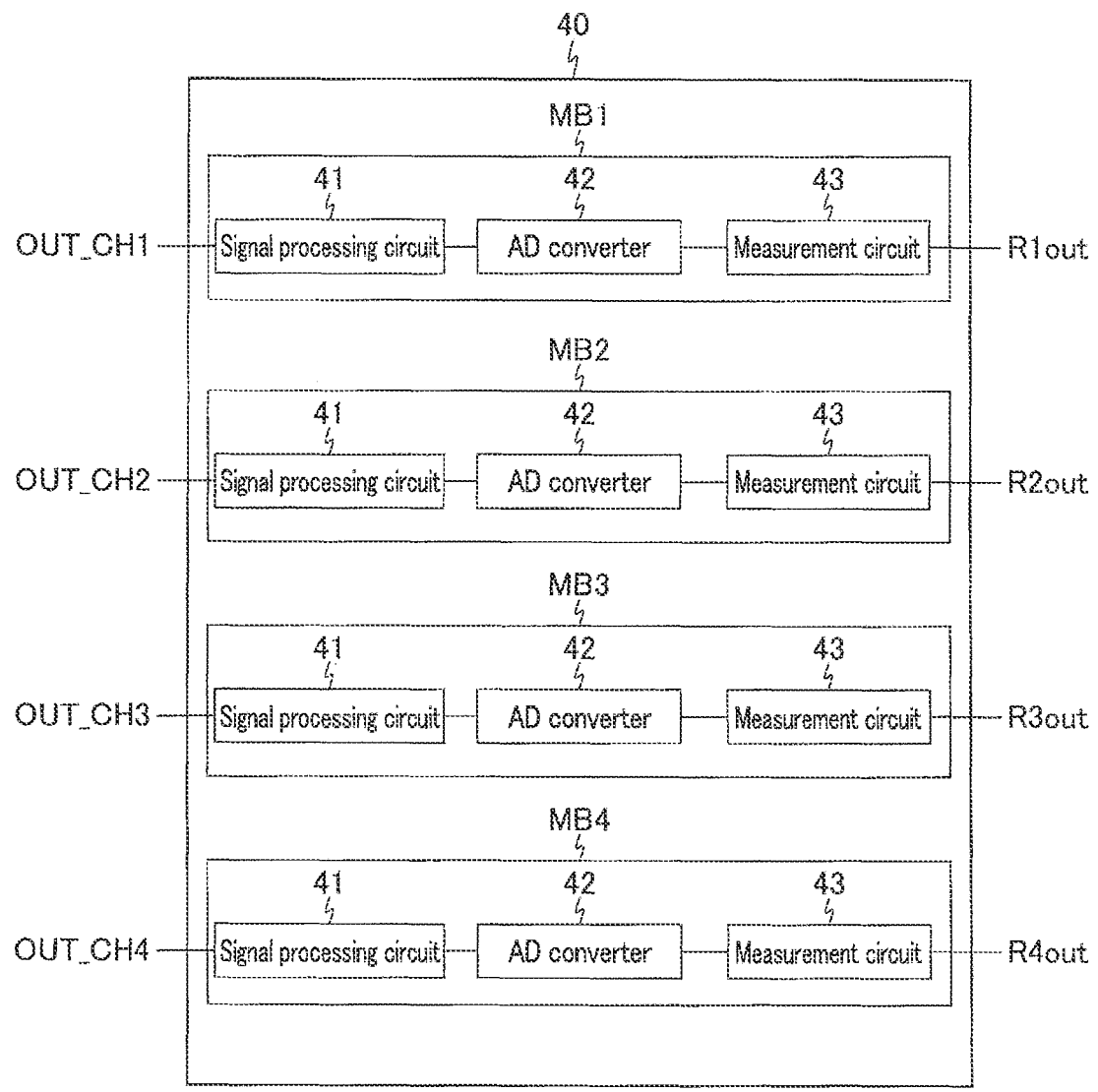
FIG. 10 depicts a block diagram showing an example of a configuration of a measurement section included in the distance measuring device according to the first embodiment.

FIG. 10 depicts a block diagram showing an example of a configuration of the measurement section 40 included in the distance measuring device 1 according to the first embodiment. As shown in FIG. 10, the measurement section 40 includes a plurality of measurement blocks MB. The measurement blocks MB1 to MB4 process signals input from the output channels OUT_CH1 to OUT_CH4, respectively. Each of the plurality of measurement blocks MB includes a signal processing circuit 41, an analog-to-digital (AD) converter 42, and a measurement circuit 43.

The signal processing circuit 41 performs processing such as amplification of a signal input to an associated output channel OUT_CH, and outputs the processed signal to the AD converter 42. Examples of an amplifier used in the signal processing circuit 41 include a transimpedance amplifier (TIA). The signal processing circuit 41 may have a function of adjusting an overdrive voltage Vov of an avalanche photodiode APD, which will be described later, a gain matching function, and a function of adjusting an amplification factor.

The AD converter 42 converts an analog signal input from the signal processing circuit 41 into a digital signal, and outputs the converted digital signal to the measurement circuit 43. The measurement section 40 may include a time-to-digital (TD) converter instead of the AD converter 42, or may include both an AD converter and a TD converter.

The measurement circuit 43 measures a distance between an object TG and the distance measuring device 1 based on the digital signal input from the AD converter 42, and outputs the measurement result to the outside. In the present example, the measurement blocks MB1 to MB4 process the signals input to the output channels OUT_CH1 to OUT_CH4, respectively, and output measurement results R1out to R4out, respectively.

(Circuit Configuration of Signal Processing Circuit 41)

FIG. 11 depicts a circuit diagram showing an example of a circuit configuration of the signal processing circuit 41 included in the measurement section 40 included in the distance measuring device 1 according to the first embodiment. As shown in FIG. 11, the signal processing circuit 41 includes, for example, N-type transistors NM10 to NM13, P-type transistors PM10 to PM19, a regulation amplifier REG1, resistors R0 and R1, nodes N11 to N16, a power supply node VDD, and a power supply node VSS. A voltage applied to the power supply node VDD is higher than a voltage applied to the power supply node VSS. With some exceptions, the back gates of the N-type transistors are coupled to the power supply node VSS, and the back gates of the P-type transistors are coupled to the power supply node VDD. In the following circuit configuration descriptions, descriptions of coupling to the back gates of the transistors are appropriately omitted for the sake of brevity. A voltage applied to a power supply node is indicated by a reference sign added to that power supply node.

The N-type transistors NM10 and NM11 function as an input stage of the signal processing circuit 41 to which a signal output from the output circuit OC is input. Specifically, the drain and source of the N-type transistor NM10 are coupled to the node N11, which is an input of current mirror circuits, and the node N12, which is a signal output from the output circuit OC, respectively. The drain and source of the N-type transistor NM11 are coupled to the node N12 and the power supply node VSS, respectively. A voltage VN1 is applied to the gate of the N-type transistor NM11. The voltage VN1 is a fixed intermediate potential between VDD and VSS, and is appropriately determined (calibrated) according to an operating environment. VN1 preferably has a relatively low value. The node N12 is coupled to the output channel OUT_CH.

The regulation amplifier REG1 can stabilize a voltage and an electric current input to the signal processing circuit 41. The regulation amplifier REG1 outputs a voltage based on a control value DAC1 and a voltage of the node N12. The output of the regulation amplifier REG1 is coupled to the gate of the N-type transistor NM10 included in the input stage of the signal processing circuit 41. The control value DAC1 is, for example, generated by the controller 10. The control value DAC1 may be generated by the controller included in the measurement section 40 (a measurement IC). In this case, a communication speed related to the control of the control value DAC1 can be controlled at a higher speed (e.g., on the order of nanoseconds) than when transferred from the controller 10 (e.g., on the order of microseconds).

The P-type transistors PM10 to PM13 are current mirror circuits that function as current sources for the signal processing circuit 41. The source and gate of the P-type transistor PM10 are coupled to the power supply node VDD and the node N11, respectively. The drain of the P-type transistor PM10 is coupled to the source of the P-type transistor PM11. The drain and gate of the P-type transistor PM11 are coupled to the nodes N11 and N13, respectively. The source and gate of the P-type transistor PM12 are coupled to the power supply node VDD and the node N11, respectively. The drain of the P-type transistor PM12 is coupled to the source of the P-type transistor PM13. The drain and gate of the P-type transistor PM13 are coupled to the nodes N14 and N13, respectively. A voltage VP1 is applied to the node N13. The voltage VP1 is a fixed intermediate potential between VDD and VSS, and is appropriately determined (calibrated) according to an operating environment. For example, VP1 preferably has a lower value than VN1. The node N14 corresponds to an output node of a current mirror circuit included in the signal processing circuit 41.

The N-type transistors NM12 and NM13 function as current regulators. The drain of the N-type transistor NM12 is coupled to the node N14. The source of the N-type transistor NM12 is coupled to the drain of the N-type transistor NM13. The source of the N-type transistor NM13 is coupled to the power supply node VSS. A voltage VN2 is input to the gate of each of the N-type transistors NM12 and NM13. The voltage VN2 is a fixed intermediate potential between VDD and VSS, and is appropriately determined (calibrated) according to an operating environment. A voltage based on a differential signal output from the signal processing circuit 41 may be fed back to the gate of each of the N-type transistors NM12 and NM13. In this case, each of the N-type transistors NM12 and NM13 can balance the differential signal.

The P-type transistors PM12 to PM15 and NM12 to NM13 function as single-phase-differential converters. The source and gate of the P-type transistor PM14 are coupled to the power supply node VDD and the node N14, respectively. The drain of the P-type transistor PM14 is coupled to the source of the P-type transistor PM15. The drain and gate of the P-type transistor PM15 are coupled to the nodes N14 and N13, respectively.

The P-type transistors PM16 to PM19 and the resistors R0 and R1 function as current-voltage converters for an output of the current source converted from a single-phase signal to a differential signal. The source and gate of the P-type transistor PM16 are coupled to the power supply node VDD and the node N11, respectively. The drain of the P-type transistor PM16 is coupled to the source of the P-type transistor PM17. The drain and gate of the P-type transistor PM17 are coupled to the nodes N15 and N13, respectively. The source and gate of the P-type transistor PM18 are coupled to the power supply node VDD and the node N14, respectively. The drain of the P-type transistor PM18 is coupled to the source of the P-type transistor PM19. The drain and gate of the P-type transistor PM19 are coupled to the nodes N16 and N13, respectively. The resistor R0 is coupled between the node N15 and the power supply node VSS. The resistor R1 is coupled between the node N16 and the power supply node VSS. The nodes N15 and N16 are coupled to output nodes ADC_IN1 and ADC_IN2 of the signal processing circuit 41, respectively. The output nodes ADC_IN1 and ADC_IN2 are coupled to the AD converter 42. In this case, the AD converter 42 generates a digital signal corresponding to voltages (differential signals) of the output nodes ADC_IN1 and ADC_IN2.

Figure 12:
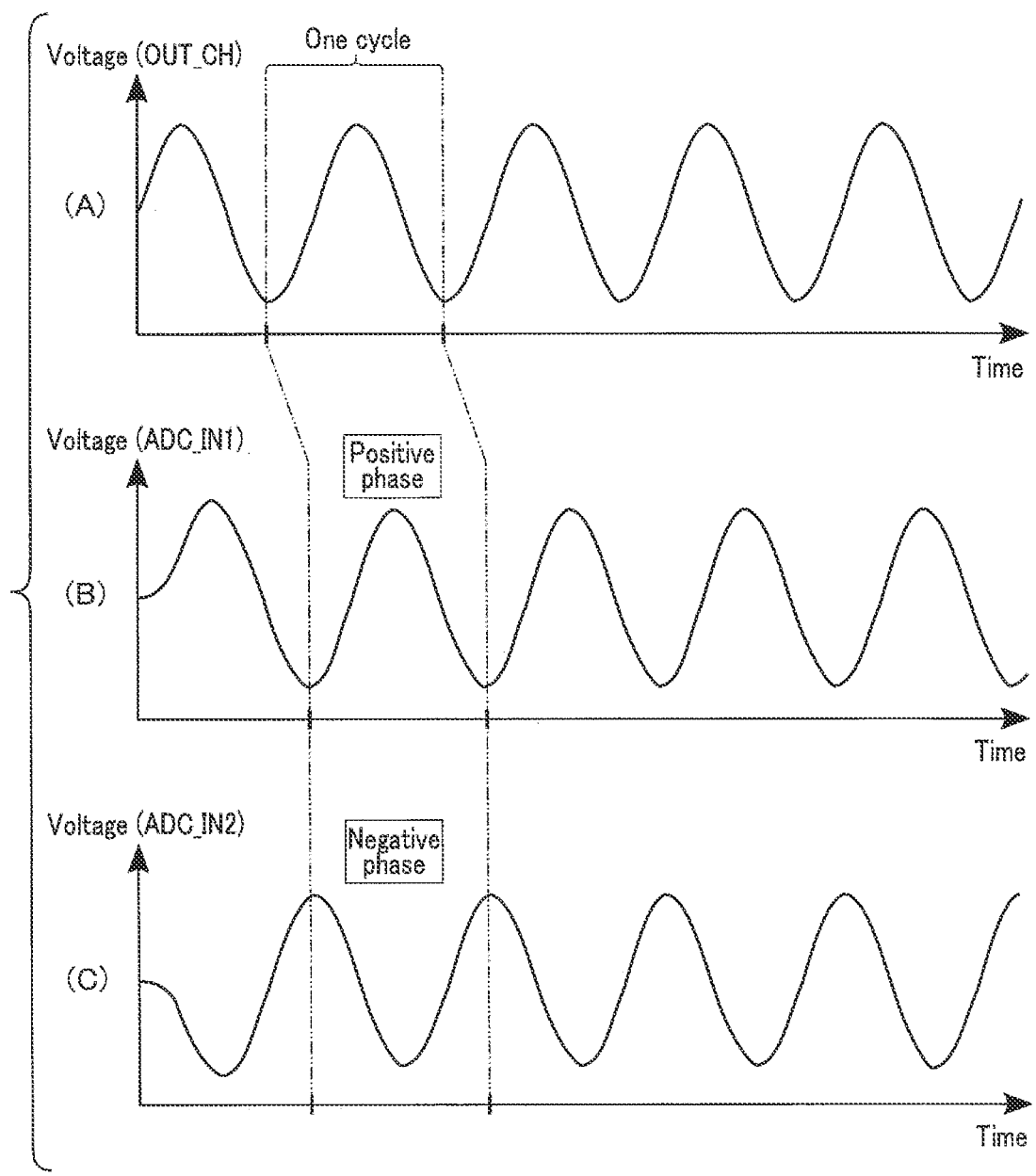
FIG. 12 depicts a waveform diagram showing an example of an input/output signal of the signal processing circuit included in the measurement section included in the distance measuring device according to the first embodiment.

FIG. 12 depicts a waveform diagram showing an example of an input/output signal of the signal processing circuit 41 included in the measurement section 40 included in the distance measuring device 1 according to the first embodiment. FIG. 12 (A) shows a time change of a voltage of a signal input to the signal processing circuit 41 (a voltage of the output channel OUT_CH). FIGS. 12 (B) and (C) show time changes of voltages of the output nodes ADC_IN1 and ADC_IN2, respectively. As shown in FIG. 12, the signal input to the signal processing circuit 41 is output as a differential signal. Specifically, focusing on the one-cycle waveform shown in FIG. 12 (A), a delay corresponding to the processing of the signal processing circuit 41 occurs in each of the waveform of the voltage of the output node ADC_IN1 shown in FIG. 12 (B) and the waveform of the voltage of the output node ADC_IN2 shown in FIG. 12 (C). The waveform of the voltage of the output node ADC_IN1 has a positive phase, and the waveform of the voltage of the output node ADC_IN2 has a negative phase.

Example of Processing of Measurement Section 40

Figure 13:
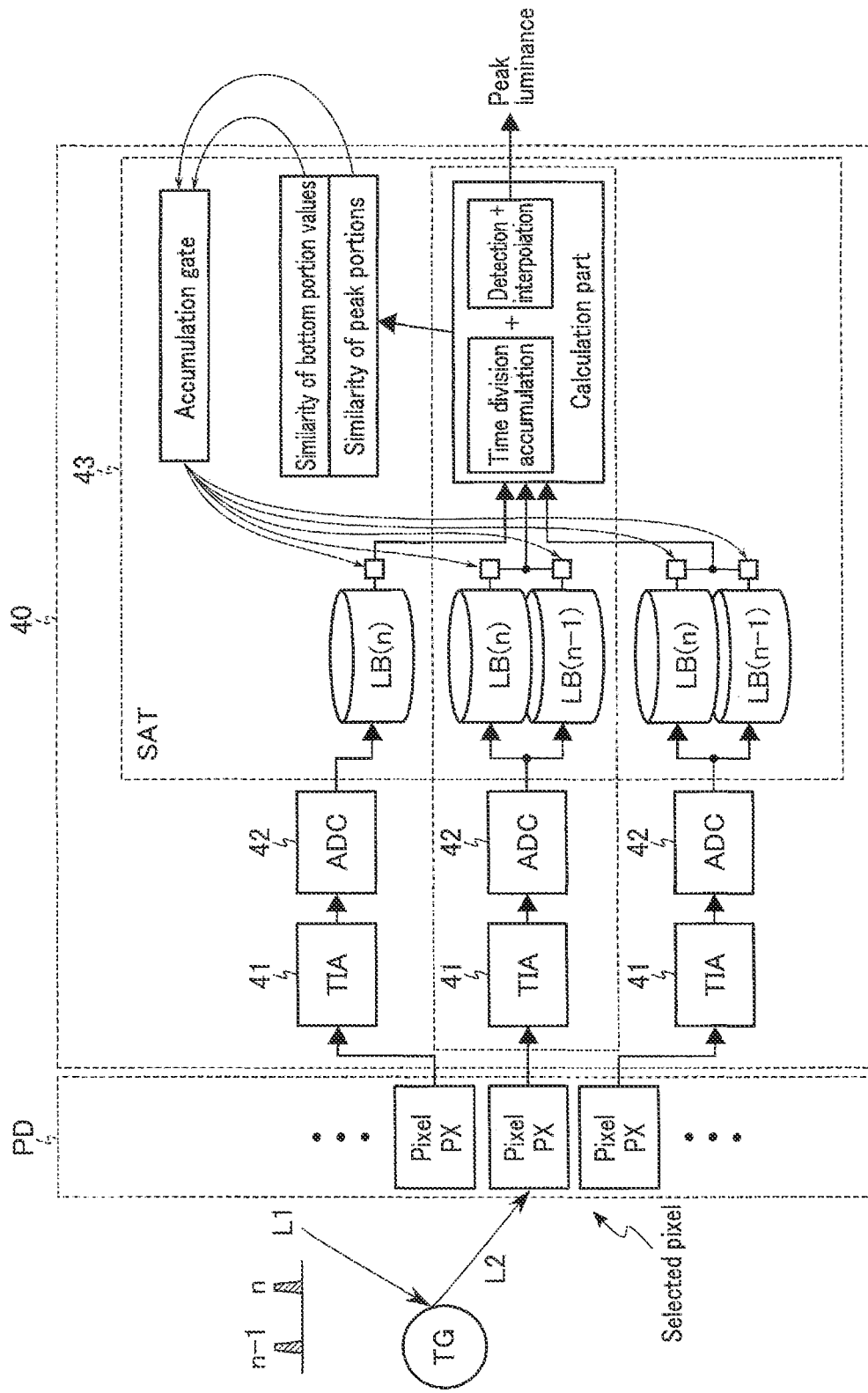
FIG. 13 depicts a schematic diagram showing an example of processing of the measurement section included in the distance measuring device according to the first embodiment.

FIG. 13 depicts a schematic diagram showing an example of processing of the measurement section 40 included in the distance measuring device 1 according to the first embodiment. As shown in FIG. 13, the measurement section 40 includes, for example, a transimpedance amplifier (TIA), an analog-to-digital converter (ADC), and an averaging circuit (SAT). The TIA corresponds to the signal processing circuit 41. The ADC corresponds to the AD converter 42. The SAT corresponds to the measurement circuit 43.

The number of each of the TIA and the ADC is equal to that of outputs of the light detector PD, i.e., outputs of selected pixels PX. Specifically, the output of the selected pixel PX is input to the SAT via the TIA and the ADC. The SAT outputs a result (distance value, peak luminance, etc.) of averaging (time division accumulation) a signal of the selected pixel PX and signals from surrounding pixels PX.

Unlike other averaging circuits, the SAT outputs a result for each pixel PX. Thus, the SAT can suppress a decrease in resolution.

Specifically, the SAT includes at least one luminance buffer LB for each output of the light detector PD. In the present example, the SAT includes a luminance buffer LB(n) holding a luminance value of the nth outgoing light L1 and a luminance buffer LB(n−1) holding a luminance value of the (n−1)th outgoing light L1 for each output of the light detector PD. Outputs of the luminance buffers LB(n) and LB(n−1) included in the SAT are input to a calculation part of the SAT.

The calculation part can execute time division accumulation processing using an accumulation gate, detection of a peak portion (peak), interpolation processing, etc. In the SAT, an ADC sampling result of the previous measurement (in the case of multichannel raster scanning, for example, a measurement result of pixels PX on the left side), that is, a time-series signal of luminance, is held by the luminance buffer LB(n−1). In addition, in the SAT, a similarity of adjacent pixels PX (for example, pixels PX located above, below, to the right, to the left, diagonally above, etc.) is determined, and similar time-series signals are extracted and accumulated. As a criterion for determining the similarity of the pixels PX, for example, both the similarity of bottom portion (floor) values and the similarity of peak portion (peak) values of respective time-series signals are used. The bottom portion (floor) value is obtained by, for example, integrating or averaging signals for a certain period of time. The certain period of time may be, for example, a measurement time or a time between measurements. The bottom portion (floor) value corresponds to the intensity of ambient light.

As a result, the SAT can determine the similarity/identity of a target object with high accuracy, exclude signals from different target objects, i.e., noise, and increase an S/N ratio (signal-to-noise ratio) of the signal. Further, the SAT can effectively increase a dynamic range of a pixel PX. The pixel PX described below can achieve a high resolution. On the other hand, the pixel PX tends to have a low dynamic range. Therefore, the distance measuring device 1 according to the first embodiment alleviates the dynamic range problem while maintaining the high resolution by using the SAT.

[1-2] Detailed Configuration of Pixel Array 32

Figure 14:
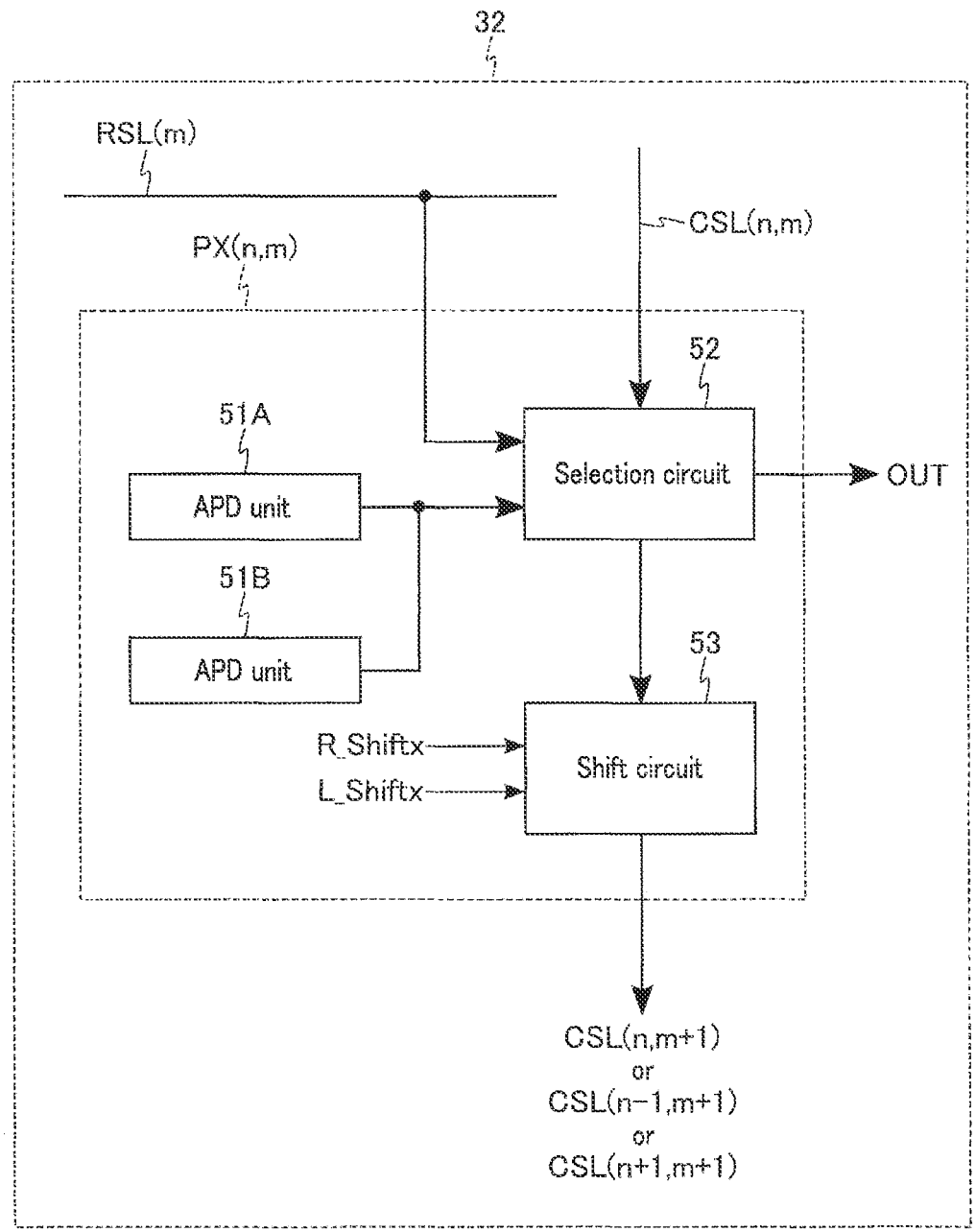
FIG. 14 depicts a block diagram showing an example of a configuration of the pixel array in the distance measuring device according to the first embodiment.

FIG. 14 depicts a block diagram showing an example of a configuration of the pixel array 32 in the distance measuring device 1 according to the first embodiment, showing a structural element associated with one pixel PX. As shown in FIG. 14, the pixel array 32 includes a column selection line CSL (n, m), a row selection line RSL (m), and a pixel PX (n, m). The "n" and "m" represent a column address CA and a row address RA, respectively. Each of the "n" and "m" is an integer of 1 or more. One pixel PX can be specified by a set of a column address CA and a row address RA.

The column selection line CSL (n, m) is an interconnect coupled to the pixel PX (n, m) and is for transferring a column selection signal to the pixel PX (n, m). In the pixel array 32, the column selection line CSL is provided, for example, for each pixel PX.

The row selection line RSL (m) is an interconnect coupled to a plurality of pixels PX sharing the same row address RA and is for transferring a row selection signal to those pixels PX. The pixel array 32 includes, for example, a plurality of row selection lines RSL corresponding to the number of pixels PX arranged in the Y direction.

Each pixel PX includes, for example, two APD units 51A and 51B, a selection circuit 52, and a shift circuit 53. Each of the APD units 51A and 51B is a circuit including an avalanche photodiode APD usable for detecting light. An output of each of the APD units 51A and 51B is input to the selection circuit 52.

The selection circuit 52 is coupled to the column selection line CSL (n, m) and the row selection line RSL (m). The selection circuit 52 sets the pixel PX (n, m) to an active state or an inactive state based on the input column selection signal and row selection signal. The pixel PX in the active state outputs a light reception result to the channel bonded part CB via the selection circuit 52 ("OUT"). The pixel PX in the inactive state does not output a light reception result to the channel bonded part CB. While the selection circuit 52 and the APD unit 51 are separated in this example, a part of the selection circuit may be included in the APD unit 51.

The shift circuit 53 transfers a column selection signal input to the pixel PX (n, m) to a column selection line CSL (n, m+1) coupled to a pixel PX (n, m+1), a column selection line CSL (n−1, m+1) coupled to a pixel PX (n−1, m+1), or a column selection line CSL (n+1, m+1) coupled to a pixel PX (n+1, m+1) based on control signals R_Shiftx and L_Shiftx.

Each of the control signals R_Shiftx and L_Shiftx is generated by the controller 10, and input to the shift circuit 53. The control signal R_Shiftx is a signal for shifting a part of the active area of the pixel array 32 to the right side (the positive side of the X coordinate). The control signal L_Shiftx is a signal for shifting a part of the active area of the pixel array 32 to the left side (the negative side of the X coordinate). In this example, the shift circuit is applied to the column selection line CSL, but a shift function by the shift circuit may be applied to the row selection line RSL. Further, since the pixel array 32 includes two shift circuits, the shift function by the shift circuit may be applied to both the column selection line CSL and the row selection line RSL.

[1-2-1] Configurations of APD units 51A and 51B and Selection Circuit 52

FIG. 15 depicts a circuit diagram showing an example of circuit configurations of the APD units 51A and 51B and the selection circuit 52 included in a pixel PX included in the pixel array 32 in the distance measuring device 1 according to the first embodiment. As shown in FIG. 15, the APD unit 51A includes, for example, an avalanche photodiode APD0, a protection resistor Rs0, a diode DI0, and a quench resistor Rq0. The APD unit 51B includes, for example, an avalanche photodiode APD1, a protection resistor Rs1, a diode DI1, and a quench resistor Rq1. The selection circuit 52 includes P-type transistors PM0 and PM1. In addition, the pixel PX includes nodes N0 to N3. A substrate voltage Vsub is applied to the anode of the avalanche photodiode APD0. The cathode of the avalanche photodiode APD0 is coupled to one end of the protection resistor Rs0. The other end of the protection resistor Rs0 is coupled to the node N0. The diode DI0 is a rectifier diode. The cathode of the diode DI0 is coupled to the node N0. The anode of the diode DI0 is coupled to the node N2. One end of the quench resistor Rq0 is coupled to the node N0. The other end of the quench resistor Rq0 is coupled to the node N3.

A substrate voltage Vsub is applied to the anode of the avalanche photodiode APD1. The cathode of the avalanche photodiode APD1 is coupled to one end of the protection resistor Rs1. The other end of the protection resistor Rs1 is coupled to the node N1. The diode DI' is a rectifier diode. The cathode of the diode DI' is coupled to the node N1. The anode of the diode DI' is coupled to the node N2. One end of the quench resistor Rq1 is coupled to the node N1. The other end of the quench resistor Rq1 is coupled to the node N3.

The node N2 is coupled to a constant voltage node DOUT. A voltage applied to the constant voltage node DOUT is usually set to be lower than each of a sum of a voltage (a breakdown voltage) at which an electronic avalanche stops at the avalanche photodiode APD0 and a threshold voltage Vth of the diode DI0 and a sum of a voltage at which an electronic avalanche stops at the avalanche photodiode APD1 and a threshold voltage Vth of the diode DI1.

The source of the P-type transistor PM0 is coupled to the node N3. The body of the P-type transistor PM0 is coupled to a power supply node VDD. A column selection line CSL is coupled to the gate of the P-type transistor PM0, and a column selection signal is input thereto. The source of the P-type transistor PM1 is coupled to the drain of the P-type transistor PM0. The body of the P-type transistor PM1 is coupled to a power supply node VDD. A row selection line RSL is coupled to the gate of the P-type transistor PM1, and a row selection signal is input thereto. The drain of the P-type transistor PM1 is coupled to an output node OUT of the pixel PX. That is, the pixel PX in an active state outputs an output signal corresponding to a light reception result of the avalanche photodiode APD from the drain of the P-type transistor PM1.

In the pixel PX in the active state, a reverse bias due to the substrate voltage Vsub and the voltage applied via the quench resistor Rq is applied to the avalanche photodiode APD. The avalanche photodiode APD to which the reverse bias is applied can operate as a SPAD capable of detecting light. Note that the coupling order of the P-type transistors PM0 and PM1 may be reversed. In this case, in the pixel PX in the active state, an output signal is output from the drain of the P-type transistor PM0. The quench resistor Rq0 and/or the protection resistor Rs1 may be an active element such as a transistor. Note that the pixel PX may further include an N-type transistor coupled to the node N3, and carriers accumulated in the node N3 in an inactive state may be discharged via that N-type transistor. In this case, for example, two N-type transistors are coupled to the node N3 in parallel, and the other ends of that two N-type transistors are coupled to a power supply node VSS with a low electric potential. Then, the column selection line CSL and the row selection line RSL are respectively coupled to the gates of that two N-type transistors. When inactive, the voltage of either the column selection line CSL or the row selection line RSL becomes an "H" level, and any one of the two N-type transistors coupled in parallel is turned on. As a result, carriers unnecessarily accumulated in the node N3 can be discharged to the power supply node VSS as compared with a case where the two N-type transistors are not coupled to the node N3.

(Characteristics of Avalanche Photodiode APD)

An example of characteristics of the avalanche photodiode APD will be described below.

FIG. 16 depicts a waveform diagram showing a relationship between a light detection efficiency PDE of the avalanche photodiode APD and a bias voltage applied to the avalanche photodiode APD. The "bias voltage" corresponds to a voltage difference between the anode and the cathode of the avalanche photodiode APD. As shown in FIG. 16, when the bias voltage becomes a breakdown voltage Vbd or more, the PDE starts to increase. Then, the bias voltage is set to an operating voltage Vop in a case of causing the avalanche photodiode APD to detect light. In the present specification, a voltage calculated by "Vop–Vbd" is referred to as an overdrive voltage Vov.

FIG. 17 depicts a waveform diagram showing a relationship between an output current per avalanche photodiode APD and the bias voltage applied to the avalanche photodiode APD. As shown in FIG. 17, when the bias voltage becomes the breakdown voltage Vbd or more, the output current per avalanche photodiode APD starts to increase. Then, in a case where the bias voltage is the breakdown voltage Vbd or more, an output current of 1 photon receiver changes according to "gain×elementary charge". More specifically, the output current of 1 photon receiver is calculated by "gain×elementary charge×number of SPAD×overdrive voltage".

The breakdown voltage Vbd and the gain may vary for each avalanche photodiode APD. Similarly, an optimal overdrive voltage Vov differs for each avalanche photodiode APD, and can also change depending on a ranging environment of the distance measuring device 1. Thus, the overdrive voltage Vov is preferably adjusted for each avalanche photodiode APD. Since the overdrive voltage Vov also changes according to a change in operating voltage Vop, the operating voltage Vop being adjusted is synonymous with the overdrive voltage Vov being adjusted. In the distance measuring device 1 according to the first embodiment, the output stage 33 has a function of adjusting the operating voltage Vop and adjusting the gain of the avalanche photodiode APD. Configurations related to the function will be described in detail later.

[1-2-2] Configuration of Shift Circuit 53

FIG. 18 depicts a circuit diagram showing an example of a circuit configuration of the shift circuit 53 included in a pixel PX included in the pixel array 32 in the distance measuring device 1 according to the first embodiment, focusing on the shift circuit 53 associated with the column selection line CSL (n, m). As shown in FIG. 18, the shift circuit 53 includes a first shifter 531, an inverter 532, a second shifter 533, and an inverter 534. Further, the shift circuit 53 includes input terminals FR (From Right) and FL (From Left), output terminals TR (To Right) and TL (To Left), and nodes N4 to N10.

The first shifter 531 includes a P-type transistor PM2 and an N-type transistor NM0. The source of the P-type transistor PM2 is coupled to the node N4. The drain of the P-type transistor PM2 is coupled to the output terminal TL. The output terminal TL of the shift circuit 53 of the pixel PX (n, m) is coupled to an input terminal FR of a shift circuit 53 of a pixel PX (n–1, m). The body of the P-type transistor PM2 is coupled to a power supply node VDD. The gate of the P-type transistor PM2 is coupled to the node N5. The drain of the N-type transistor NM0 is coupled to the node N4. The source of the N-type transistor NM0 is coupled to the node N6. The body of the N-type transistor NM0 is coupled to a power supply node VSS. The gate of the N-type transistor NM0 is coupled to the node N5.

A control signal L-Shiftx is input to the node N5. The control signal L-Shiftx is, for example, generated by a row decoder logic circuit of the controller 34 in the light detector PD. The first shifter 531 transfers a column selection signal input to the pixel PX (n, m) to the input terminal FR of the shift circuit 53 of the pixel PX (n–1, m) via the output terminal TL when the control signal L-Shiftx is at an "L" level. On the other hand, the first shifter 531 transfers a column selection signal input to the pixel PX (n, m) to the node N6 when the control signal L-Shiftx is at an "H" level. That is, the first shifter 531 has a function of transferring a column control signal to the pixel PX (n−1, m) based on the control of the control signal L-Shiftx by the controller 34 in the light detector PD.

The input terminal FR is coupled to the node N6. That is, a column selection signal output via an output terminal TL of a shift circuit 53 of a pixel PX (n+1, m) can be input to the node N6 of the shift circuit 53 of the pixel PX (n, m). Specifically, when the control signal L-Shiftx is at the "L" level, the column selection signal input to the pixel PX (n+1, m) is input to the node N6 of the shift circuit 53 of the pixel PX (n, m).

The inverter 532 includes a P-type transistor PM3 and an N-type transistor NM1. The gate of each of the P-type transistor PM3 and the N-type transistor NM1 is coupled to the node N6. The source and body of the P-type transistor PM3 are coupled to a power supply node VDD. The source and body of the N-type transistor NM1 are coupled to a power supply node VSS. The drain of each of the P-type transistor PM3 and the N-type transistor NM1 is coupled to the node N7. As a result, the inverter 532 forms a current path between the node N7 and the power supply node VDD when the voltage of the node N6 is at the "L" level, and raises the voltage of the node N7 to the "H" level. On the other hand, the inverter 532 forms a current path between the node N7 and the power supply node VSS when the voltage of the node N6 is at the "H" level, and lowers the voltage of the node N7 to the "L" level.

The second shifter 533 includes a P-type transistor PM4 and an N-type transistor NM2. The source of the P-type transistor PM4 is coupled to the node N7. The drain of the P-type transistor PM4 is coupled to the output terminal TR. The output terminal TR of the shift circuit 53 of the pixel PX (n, m) is coupled to an input terminal FL of the shift circuit 53 of the pixel PX (n+1, m). The body of the P-type transistor PM4 is coupled to a power supply node VDD. The gate of the P-type transistor PM4 is coupled to the node N8. The drain of the N-type transistor NM2 is coupled to the node N7. The source of the N-type transistor NM2 is coupled to the node N9. The body of the N-type transistor NM2 is coupled to a power supply node VSS. The gate of the N-type transistor NM2 is coupled to the node N8.

The control signal R-Shiftx is input to the node N8. The control signal R-Shiftx is, for example, generated by the row decoder logic circuit of the controller 34 in the light detector PD. The second shifter 533 transfers the column selection signal input to the pixel PX (n, m) to the input terminal FL of the shift circuit 53 of the pixel PX (n+1, m) via the output terminal TR when the control signal R-Shiftx is at the "L" level. On the other hand, the second shifter 533 transfers the column selection signal input to the pixel PX (n, m) to the node N9 when the control signal R-Shiftx is at the "H" level. That is, the second shifter 533 has a function of transferring the column control signal to the pixel PX (n+1, m) based on the control of the control signal R-Shiftx by the controller 34 in the light detector PD.

The input terminal FL is coupled to the node N9. That is, a column selection signal output via an output terminal TR of the shift circuit 53 of the pixel PX (n−1, m) can be input to the node N9 of the shift circuit 53 of the pixel PX (n, m). Specifically, when the control signal R-Shiftx is at the "L" level, a column selection signal input to the pixel PX (n−1, m) is input to the node N9 of the shift circuit 53 of the pixel PX (n, m).

The inverter 534 includes a P-type transistor PM5 and an N-type transistor NM3. The gate of each of the P-type transistor PM5 and the N-type transistor NM3 is coupled to the node N9. The source and body of the P-type transistor PM5 are coupled to a power supply node VDD. The source and body of the N-type transistor NM3 are coupled to a power supply node VSS. The drain of each of the P-type transistor PM5 and the N-type transistor NM3 is coupled to the node N10. As a result, the inverter 534 forms a current path between the node N10 and the power supply node VDD when the voltage of the node N9 is at the "L" level, and raises the voltage of the node N10 to the "H" level. On the other hand, the inverter 534 forms a current path between the node N10 and the power supply node VSS when the voltage of the node N9 is at the "H" level, and lowers the voltage of the node N10 to the "L" level.

The node N10 is coupled to a column selection line CSL (n, m+1). That is, the voltage of the node N10 corresponds to a column selection signal input to the pixel PX (n, m+1). The column selection signal input to the shift circuit 53 is transferred to the next shift circuit 53 via an even number of inverters. Therefore, a logic level of the column selection signal input to the shift circuit 53 and that of the column selection signal transferred to the pixel PX (n−1, m+1), PX (n, m+1), or PX (n+1, m+1) by that shift circuit 53 match.

The above-described circuit configuration of the shift circuit 53 is only an example. It suffices that the shift circuit 53 of each pixel PX has a function of transferring an input column selection signal to any one of a pixel PX adjacent in the Y direction (row direction) and two pixels PX sandwiching in the X direction (column direction) that pixel PX adjacent in the Y direction. The shift circuit 53 may be omitted when the light detector PD does not utilize the shift function of the active area. For example, each of the control signals L_Shiftx and R_Shiftx is generated by the controller 10, and is generated for each row in a peripheral circuit in the light detector PD. The shift circuit 53 may have other circuit configurations as long as the functions described above can be realized. As the input terminals FR and FL as well as the output terminals TR and TL, it suffices that a configuration having the same function is used, and they are not limited to the terminals.

(Setting of Active Area)

An example of setting of an active area for the pixel array 32 will be described below.

Reflected light L2 incident on the distance measuring device 1 according to the first embodiment is applied to a part of the pixel array 32 based on a scanning position of outgoing light L1 and a design of the optical system 31. In response, the controller 10 and the controller 34 in the light detector PD set each pixel PX to an active state or an inactive state based on an irradiation position of the reflected light L2. Hereinafter, a pixel PX in the active state is also referred to as an "On" pixel, and a pixel PX in the inactive state is also referred to as an "Off" pixel. That is, an area including an "On" pixel corresponds to an active area of the pixel array 32. The active area is set for each outgoing light L1 in the measurement operation of the distance measuring device 1.

In the setting of the active area, the controller 10 selects, for example, an X coordinate and a Y coordinate of a pixel PX associated with an inclination of the mirror 25 at a timing when the outgoing light L1 is emitted. Then, the controller 10 reports the selected X coordinate and Y coordinate to the controller 34 of the light detector PD. Thereafter, the controller 34 of the light detector PD sets the active area in the pixel array 32 by controlling the control register CR, the column decoder CD, and the row decoder RD based on the X coordinate and the Y coordinate reported (selected) by the controller 10. The controller 34 can determine a range of pixels PX to be set to the active area based on setting of the number of pixels PX to be selected. For example, when the number of selections is "3", the controller 34 selects three consecutive pixels immediately to the right and further to the right of the X coordinate of a pixel PX.

An X coordinate and a Y coordinate used in setting of an active area indicate, for example, coordinates of an upper-left pixel PX of the active area. When multichannel scanning is performed, an active area is formed by a plurality of "On" pixels arranged along a direction (e.g., the Y direction) intersecting the scanning direction. Note that the active area may have an expanse in the scanning direction (e.g., the X direction). It suffices that the position and shape of the active area are set based at least on a coordinate designated by the controller 10.

The pixel array 32 outputs a light reception result by a pixel PX in the active area AA, for example, for each pixel PX sharing a row address RA. Thereby, noise from a pixel PX outside the active area is canceled from a light reception result of the light detector PD, and an S/N ratio of the light reception result increases. In addition, application of a voltage to the pixel PX outside the active area is appropriately omitted so that power consumption of the light detector PD is suppressed.

Further, in the distance measuring device 1 according to the first embodiment, the light detector PD can change the shape of the active area with the shift circuit 53. In the following, in multichannel raster scanning, an active area setting example of a case in which the shift function of the shift circuit 53 is used will be described.

FIG. 19 depicts a plan view showing an example of setting of an active area of the pixel array 32 in the distance measuring device 1 according to the first embodiment, exemplifying the active area setting in the case where the shift function is used. In addition, FIG. 19 shows a portion corresponding to X coordinates "0" to "7" associated with the column address CA and Y coordinates "0" to "3" associated with the row address RA in the pixel array 32. The selected pixel PX is enclosed by a thick line. Hatching is added to an "On" pixel.

As shown in FIG. 19, when coordinates (2 (X coordinate), 0 (Y coordinate)) are selected, the pixel array 32 sets a plurality of pixels PX along the row direction (Y direction) to "On" pixels with a selected pixel PX as a reference, and in this example, shifts the active area to the right side (the positive side of the X coordinate). Specifically, based on a pixel PX at coordinates (2, 0) being selected, the pixel array 32 sets each of a pixel PX at coordinates (3, 1), a pixel PX at coordinates (4, 2), and a pixel PX at coordinates (5, 3) to an "On" pixel, and sets the other pixels PX to "Off" pixels. That is, an active area is formed by the pixels PX at the coordinates (2, 0), (3, 1), (4, 2), and (5, 3). Then, the pixels PX at the coordinates (2, 0), (3, 1), (4, 2), and (5, 3) individually output light reception results.

In the case where the active area is shifted to the right side (the positive side of the X coordinate), the controller 34, for example, sets the control signal L_Shiftx to the "H" level and the control signal R_Shiftx to the "L" level. Then, for example, the shift circuit 53 of the pixel PX (n, m) transfers an input column selection signal to the pixel PX (n+1, m+1). As a result, an active area in which the "On" pixels adjacent to each other on the lower side are shifted to the right side one pixel at a time is set with the selected pixel PX as a reference. An operation of a case of shifting an active area to the left side (the negative side of the X coordinate) is the same as that of the case of shifting the active area to the right side except that the shift direction is opposite.

Note that the controllers 10 and 34 can use the shift function as appropriate according to the scanning position. The number of pixels PX set to "On" pixels with a selected coordinate as a reference can be freely set in each of the X direction and the Y direction. The shift function of the active area by the shift circuit 53 can also be used in the same manner in a case where a plurality of pixels PX arranged in the X direction are set to the active state. In the active area, the number of "On" pixels formed along the Y direction usually matches or is set to be less than the number of channels.

[1-3] Detailed Configuration of Output Stage 33

Figure 20:
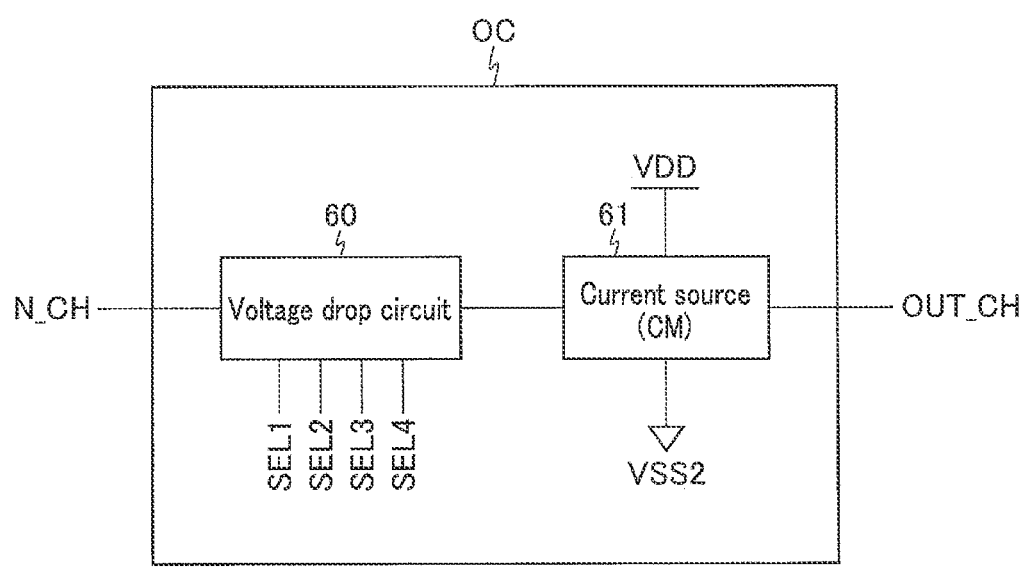
FIG. 20 depicts a block diagram showing an example of a configuration of an output circuit included in the output stage in the distance measuring device according to the first embodiment.

FIG. 20 depicts a block diagram showing an example of a configuration of an output circuit OC included in the output stage 33 in the distance measuring device 1 according to the first embodiment. As shown in FIG. 20, the output circuit OC includes, for example, a voltage drop circuit 60 and a current source 61.

The voltage drop circuit 60 inputs a signal based on a signal input to the node N_CH to the current source 61. The voltage drop circuit 60 has a function of lowering a voltage of the node N_CH according to selection signals SEL1 to SEL4. The voltage drop circuit 60 can adjust an operating voltage Vop applied to an avalanche photodiode APD by adjusting the voltage of the node N_CH. That is, the voltage drop circuit 60 can adjust an overdrive voltage Vov applied to the avalanche photodiode APD in the active state.

The current source 61 includes a current mirror circuit (CM). The number of stages of current mirror circuits included in the current source 61 is designed according to a direction of an electric current input to the node N_CH. The current source 61 is coupled to each of the power supply node VDD and a power supply node VSS2. A voltage applied to the power supply node VSS2 is, for example, a voltage between VDD and VSS. The power supply node VSS2 may be referred to as a low voltage node. For example, the current source 61 can amplify an input electric current to a little less than three times.

[1-3-1] Configuration of Voltage Drop Circuit 60

FIG. 21 depicts a circuit diagram showing an example of a circuit configuration of the voltage drop circuit 60 included in the output circuit OC in the distance measuring device 1 according to the first embodiment. As shown in FIG. 21, the voltage drop circuit 60 includes P-type transistors PM20 to PM29, a resistor R3, a capacitor CP, and nodes N20 to N27.

The node N_CH is coupled to the node N20. One end of the resistor R3 is coupled to the node N20. The other end of the resistor R3 is coupled to a power supply node VSSLOW. To the power supply node VSSLOW, for example, a voltage equal to or lower than that of VSS is applied. The resistor R3 is a high resistance element, and supplies a minute electric current from the node N20 toward the power supply node VSSLOW at all times. Thereby, the voltage drop circuit 60 can always lower the overdrive voltage Vov. The voltage drop circuit 60, with the resistor R3 being provided, can stabilize an electric potential of the node N_CH in the absence of an operation of an avalanche photodiode APD, and correctly reflect voltages set by the selection signals SEL1 to SEL4 to the node N_CH. A transistor may be used instead of the resistor R3.

The source and gate of the P-type transistor PM20 are coupled to the node N20. The drain of the P-type transistor PM20 is coupled to the node N21. The source and gate of the P-type transistor PM21 are coupled to the node N20. The drain of the P-type transistor PM21 is coupled to the node N22. The source and gate of the P-type transistor PM22 are coupled to the node N22. The drain of the P-type transistor PM22 is coupled to the node N23. The source and gate of the P-type transistor PM23 are coupled to the node N23. The drain of the P-type transistor PM23 is coupled to the node N24. The source and gate of the P-type transistor PM24 are coupled to the node N24. The drain of the P-type transistor PM24 is coupled to the node N25. The source and gate of the P-type transistor PM25 are coupled to the node N25. The drain of the P-type transistor PM25 is coupled to the node N26.

The source and drain of the P-type transistor PM26 are coupled to the nodes N20 and N27, respectively. The source and drain of the P-type transistor PM27 are coupled to the nodes N22 and N27, respectively. The source and drain of the P-type transistor PM28 are coupled to the nodes N24 and N27, respectively. The source and drain of the P-type transistor PM29 are coupled to the nodes N26 and N27, respectively. The selection signals SEL1, SEL2, SEL3, and SEL4 are input to the gates of the P-type transistors PM26, PM27, PM28, and PM29, respectively. Two electrodes of the capacitor CP are coupled to the nodes N20 and N27, respectively. The node N27 is coupled to an output node VDOUT of the voltage drop circuit 60.

The selection signals SEL1 to SEL4 are, for example, generated by the controller 10. The controller 10, when measuring a distance, selects any one of the selection signals SEL1 to SEL4 to turn on one of the P-type transistors PM26 to PM29, and turns off the other P-type transistors PM. In other words, the controller 10, when measuring a distance, sets a selected one of the selection signals SEL1 to SEL4 to an "L" level, and sets the other selection signals SEL to an "H" level. In the following descriptions, "a selection signal SEL being selected" corresponds to that selection signal SEL being set to the "L" level.

When the P-type transistor PM26 is set to an ON state, an electric current via the P-type transistor PM26 (i.e., one transistor) flows between the nodes N20 and N27. When the P-type transistor PM27 is set to an ON state, an electric current via the P-type transistors PM20, PM21, and PM27 (i.e., three transistors) flows between the nodes N20 and N27. When the P-type transistor PM28 is set to an ON state, an electric current via the P-type transistors PM20 to PM23 and PM28 (i.e., five transistors) flows between the nodes N20 and N27. When the P-type transistor PM29 is set to an ON state, an electric current via the P-type transistors PM20 to PM25 and PM29 (i.e., seven transistors) flows between the nodes N20 and N27.

In this way, the controller 10 can switch over the number (the number of stages) of transistors through which an electric current flowing between the nodes N20 and N27 passes by controlling any one of the selection signals SEL1 to SEL4 to the "L" level. As a result, the voltage drop circuit 60 can change a drop amount of the voltage of the node N27, i.e., the voltage of the output node VDOUT, by a voltage drop based on a threshold voltage of a P-type transistor PM. In the present example, the larger the number assigned to the end of a selection signal SEL, the larger the number of stages of transistors through which an electric current passes, that is, the larger the voltage drop amount is set to be.

Although not shown in the drawing, a power supply node VDD2 is coupled to the back gate of each of the P-type transistors PM26 to PM29. The back gate of each of the P-type transistors PM20 to PM25 is coupled to its own drain, respectively. The power supply node VDD2 is, for example, fixed. On the other hand, when the power supply node VDD2 is floating, an output current of each P-type transistor PM can be larger than that in a case where the voltage of the power supply node VDD2 is fixed. An area of the voltage drop circuit 60 can be suppressed by some P-type transistors PM used for the voltage drop being shared among a plurality of voltage drop paths.

In addition, a diode may be used, instead of the transistor, for adjusting the voltage drop amount of the output node VDOUT. The transistor to which a selection signal SEL is input may be an N-type transistor. In this case, the controller 10, when measuring a distance, sets any one of the selection signals SEL1 to SEL4 to the "H" level, and sets the other selection signals SEL to the "L" level. The number of stages of transistors to be used for the voltage drop is not limited to the above-described number. An adjustment amount of the voltage drop amount may not be constant. The type of selection signal SEL to be used can be appropriately changed according to the configuration of the voltage drop circuit 60.

The controller 10, for example, selects any one of the selection signals SEL1 to SEL4 according to a magnitude (i.e., a magnitude of an output of the output circuit OC) of an output of the light detector PD. For example, the measurement section 40 temporally accumulates signals based on the output of the light detector PD, and reports an accumulation result to the controller 10. The controller 10 then selects a selection signal SEL according to the accumulation result, i.e., the magnitude of the output of the light detector PD. For example, when the output of the light detector PD is large, the selection signal SEL is selected so that the output of the light detector PD becomes small, and when the output of the light detector PD is small, the selection signal SEL is selected so that the output of the light detector PD becomes large. The present invention is not limited thereto, and it suffices that the controller 10 selects a selection signal SEL at least according to a magnitude of an output of the light detector PD. In addition, the controller 10 applies selection of a selection signal SEL based on an output of the light detector PD to, for example, the next measurement of reflected light L2. That is, the distance measuring device 1 according to the first embodiment can control a bias voltage (i.e., an overdrive voltage Vov) for each reflected light L2 in a variable manner when measuring a distance.

Figure 22:
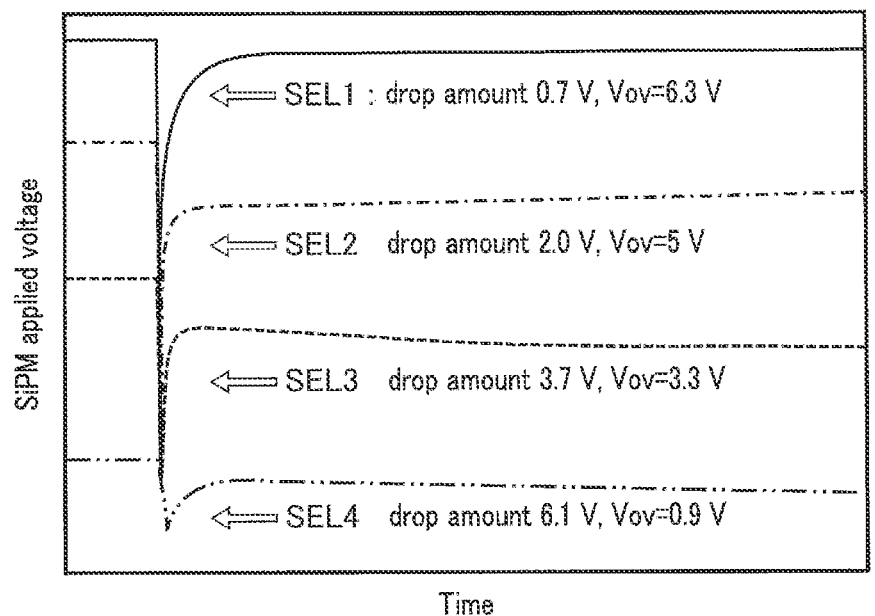
FIG. 22 depicts a waveform diagram showing an example of an output signal of the voltage drop circuit included in the output circuit in the distance measuring device according to the first embodiment.

FIG. 22 depicts a waveform diagram showing an example of an output signal of the voltage drop circuit 60 included in the output circuit OC in the distance measuring device 1 according to the first embodiment, showing a waveform in a case where an avalanche photodiode APD detects light in a state where any one of the selection signals SEL1 to SEL4 is selected. An SiPM applied voltage shown in the drawing indicates a voltage applied to an avalanche photodiode APD in an active state based on a voltage of the node N_CH. As shown in FIG. 22, the SiPM applied voltage and the overdrive voltage Vov change according to the selected selection signal SEL.

When the selection signal SEL1 is selected, a drop amount of the SiPM applied voltage becomes 0.7 V, and Vov=6.3 V. When the selection signal SEL2 is selected, a drop amount of the SiPM applied voltage becomes 2.0 V, and Vov=5 V. When the selection signal SEL3 is selected, a drop amount of the SiPM applied voltage becomes 3.7 V, and Vov=3.3 V. When the selection signal SEL4 is selected, a drop amount of the SiPM applied voltage becomes 6.1 V, and Vov=0.9 V. In this way, the controller 10 can adjust the overdrive voltage Vov by appropriately selecting (switching over) the selection signals SEL1 to SEL4. For example, the overdrive voltage Vov in the case where the selection signal SEL4 is selected is equal to or less than one-sixth the overdrive voltage Vov in the case where the selection signal SEL1 is selected.

Figure 23:
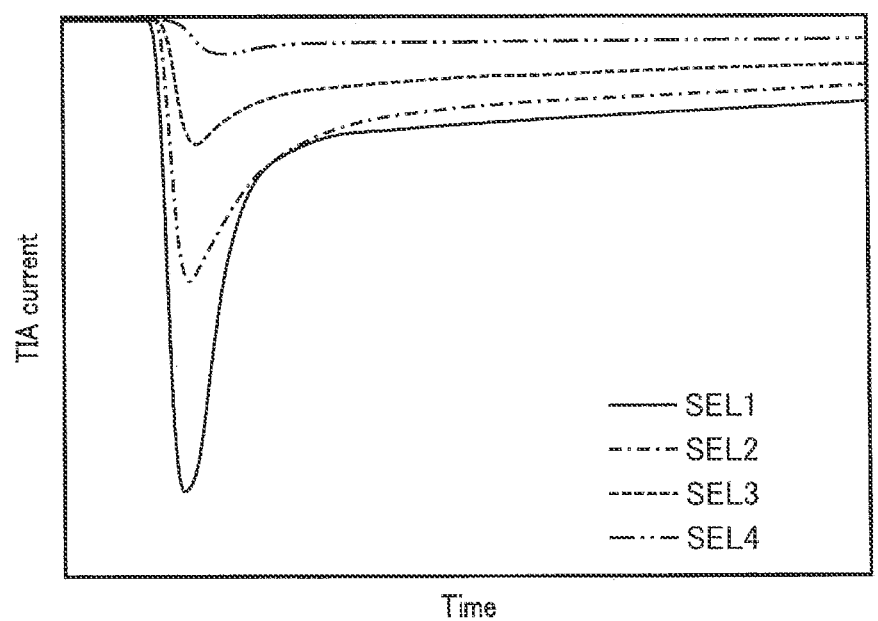
FIG. 23 depicts a waveform diagram showing an example of an output signal of a signal processor included in the measurement section included in the distance measuring device according to the first embodiment.

FIG. 23 depicts a waveform diagram showing an example of an output signal of the signal processing circuit 41 included in the measurement section 40 included in the distance measuring device 1 according to the first embodiment, showing a waveform in a case where an avalanche photodiode APD detects light in a state where any one of the selection signals SEL1 to SEL4 is selected. A TIA current shown in the drawing exemplifies an electric current input to the signal processing circuit 41. As shown in FIG. 23, a drop amount of a TIA current when light is detected changes according to the selected selection signal SEL. The drop amount of the TIA current is smaller in a case where the selection signal SEL2 is selected than in a case where the selection signal SEL1 is selected, is smaller in a case where the selection signal SEL3 is selected than in the case where the selection signal SEL2 is selected, and is smaller in a case where the selection signal SEL4 is selected than in the case where the selection signal SEL3 is selected. That is, the drop amount of the TIA current (i.e., the magnitude of an output current of an avalanche photodiode APD processed by the signal processing circuit 41) increases as the overdrive voltage Vov increases.

Figure 24:
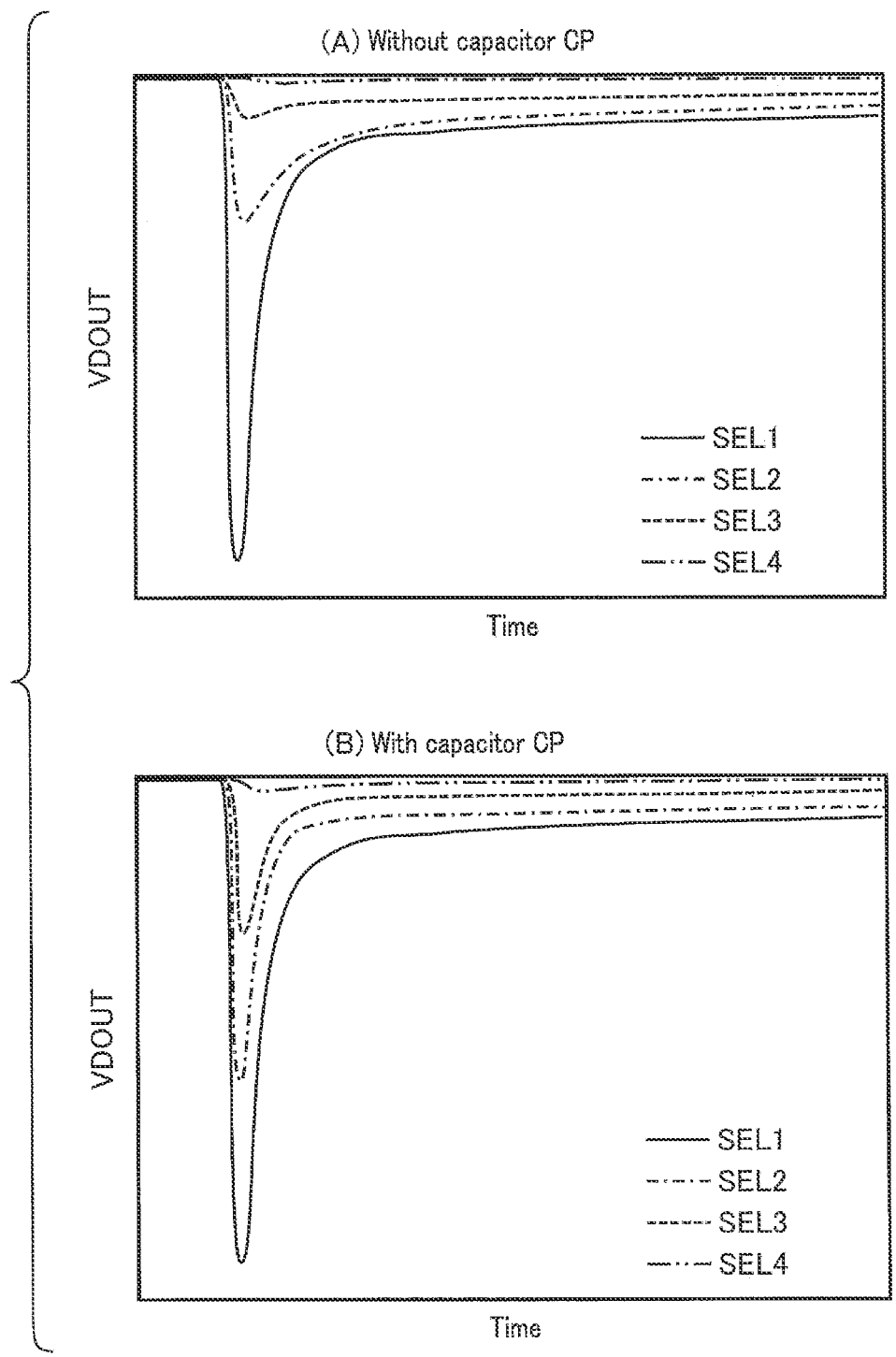
FIG. 24 depicts a waveform diagram showing an example of an output signal of the voltage drop circuit included in the output circuit in the distance measuring device according to the first embodiment.

FIG. 24 depicts a waveform diagram showing an example of an output signal of the voltage drop circuit 60 included in the output circuit OC in the distance measuring device 1 according to the first embodiment, showing a change in waveform depending on the presence/absence of the capacitor CP. FIG. 24 (A) indicates a current of the output node VDOUT in a case where the capacitor CP is omitted from the voltage drop circuit 60. FIG. 24 (B) indicates a current of the output node VDOUT in a case where the voltage drop circuit 60 includes the capacitor CP. As shown in FIGS. 24 (A) and (B), an attenuation amount of an output in a case where the number of stages of transistors is larger in the case without the capacitor CP than in the case with the capacitor CP, and a sharp pulsed current, which is a characteristic of SiPM, is less noticeable in the case without the capacitor CP. That is, the capacitor CP coupled to the four voltage drop paths in parallel can suppress an attenuation of an output of the voltage drop circuit 60 in the case where the number of stages of transistors is large, and can increase a response speed of the voltage drop circuit 60.

[1-3-2] Configuration of Current Source 61

Figure 25:
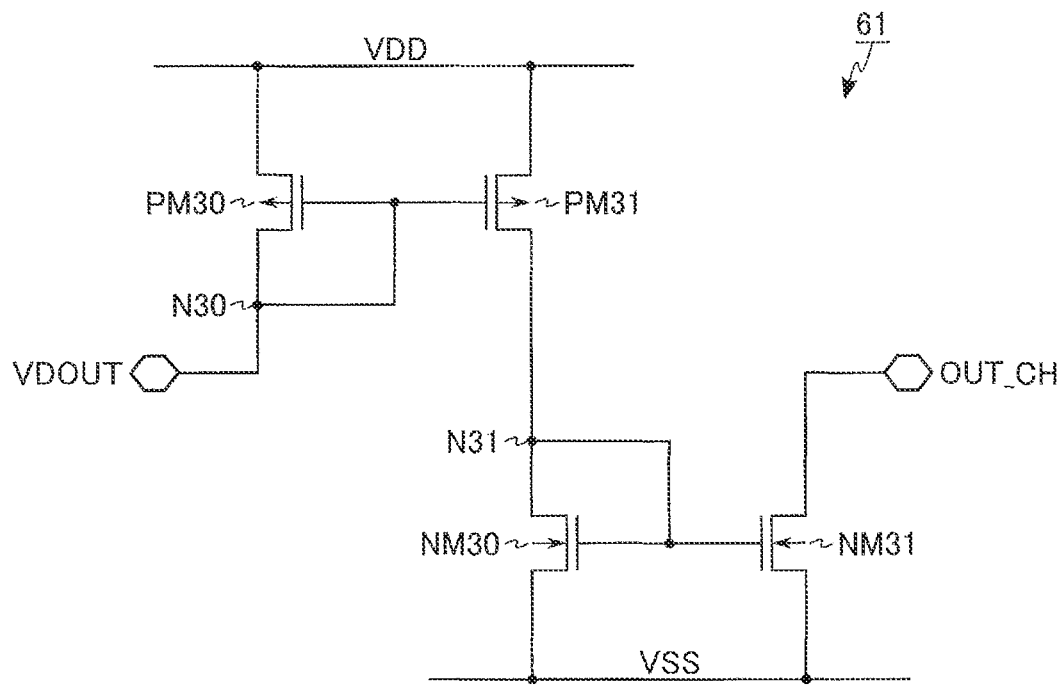
FIG. 25 depicts a circuit diagram showing an example of a circuit configuration of a current source included in the output circuit in the distance measuring device according to the first embodiment.

FIG. 25 depicts a circuit diagram showing an example of a circuit configuration of the current source 61 included in the output circuit OC in the distance measuring device 1 according to the first embodiment. As shown in FIG. 25, the current source 61 outputs an electric current amplified by two current mirror circuits (i.e., two stages of current mirror circuits) to the output channel OUT_CH. Specifically, the current source 61 includes, for example, P-type transistors PM30 and PM31, N-type transistors NM30 and NM31, and nodes N30 and N31.

The P-type transistors PM30 and Pm31 function as P-type current mirror circuits that amplify an electric current input to the output node VDOUT. Specifically, the source and drain of the P-type transistor PM30 are coupled to the power supply node VDD and the node N30, respectively. The source and drain of the P-type transistor PM31 are coupled to the power supply node VDD and the node N31, respectively. The gate of each of the P-type transistors PM30 and PM31 is coupled to the node N30. The node N30 is coupled to the output node VDOUT, i.e., an output of the voltage drop circuit 60. Then, a size (gate width) of the P-type transistor PM31 is designed to be larger than that of the P-type transistor PM30. For example, the gate width of the P-type transistor PM31 is designed to be double the gate width of the P-type transistor PM30.

The N-type transistors NM30 and NM31 function as N-type current mirror circuits that amplify an electric current input to the node N31. Specifically, the drain and source of the N-type transistor NM30 are coupled to the node N31 and a power supply node VSS, respectively. The drain and source of the N-type transistor NM31 are coupled to the output channel OUT_CH and the power supply node VSS, respectively. The gate of each of the N-type transistors NM30 and NM31 is coupled to the node N31. Then, a size (gate width) of the N-type transistor NM31 is designed to be larger than that of the N-type transistor NM30. For example, the gate width of the N-type transistor NM31 is designed to be double the gate width of the N-type transistor NM30.

[1-4] Advantageous Effect of First Embodiment

According to the above-described distance measuring device 1 of the first embodiment, characteristics of the light detector PD can be improved. Details of the advantageous effect of the first embodiment will be described below.

LiDAR (Light Detection and Ranging) as a type of a distance measuring system irradiates an object to be measured with a laser, senses the intensity of reflected light reflected from the object to be measured by a sensor, and converts an output from the sensor into a time-series digital signal. Then, a distance between the LiDAR and the object to be measured is calculated based on, for example, a time difference from the laser light emission to a peak of the sensed reflected light. Since measurement data of the LiDAR is expected to be used for controlling a vehicle, for example, it is required to be able to detect a long-distance object with high resolution and to have high accuracy.

To manufacture the LiDAR at a low cost, the configuration should preferably be as simple as possible. As a method for suppressing the cost, it is conceivable to suppress the cost of the optical system by a combination of a non-coaxial optical system and a 2D sensor. However, in the 2D sensor, for the sake of layout of a light-receiving area, the number of SPADs that can be used for one pixel PX tends to be designed to be smaller than that of a 1D sensor. In a case of a combination of a coaxial optical system and a 1D_SiPM, light incident on a distance measuring device is collected to the 1D_SiPM at all times regardless of the scanning direction. In contrast, in a case of a combination of a non-coaxial optical system and a 2D sensor, light is applied to a different area for each scanning direction (measurement). Assuming that the light is focused on different pixels for each measurement and the number of SPADs that can be used for one pixel PX is the same for the 2D sensor, the size of the 2D sensor needs to be the size of the 1D sensor multiplied by the number of measurements (per frame). Normally, this size is not realistic, so in the design of the 2D sensor, the number of SPADs that can be used for one pixel PX is reduced as much as possible to keep the size of the sensor to a realistic size. Therefore, the number of SPADs that can be used for one pixel PX of the 2D sensor is considerably smaller than, for example, about 1/10 that of the 1D sensor.

Figure 26:
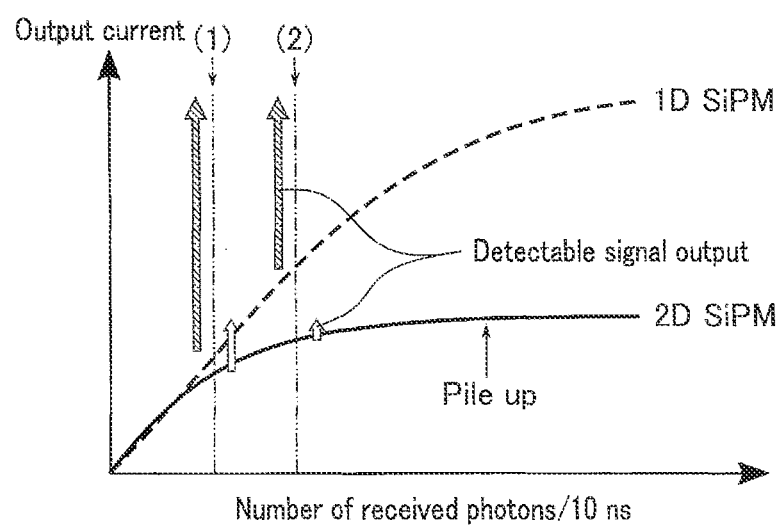
FIG. 26 depicts a waveform diagram for explaining differences in characteristics between 1D_SiPM and 2D_SiPM.

FIG. 26 depicts a waveform diagram explaining differences in characteristics between a 1D_SiPM and a 2D_SiPM. In FIG. 26, the abscissa axis corresponds to the number of received photons per unit time, and the ordinate axis corresponds to an output current of the SiPM. In addition, a simulation result is exemplified in which the number of SPADs included in the 1D_SiPM is larger than the number of SPADs included in the 2D_SiPM. Each of (1) and (2) shown in FIG. 26 indicates the magnitude of ambient light, and the magnitude of ambient light of (2) is larger than that of (1). As shown in FIG. 26, a dynamic range of the 2D_SiPM is narrower than that of the 1D_SiPM. In addition, a detectable signal output of the 1D_SiPM is larger than that of the 2D_SiPM in each ambient light state.

With the 1D_SiPM, it is possible to obtain a large detectable signal output regardless of whether the magnitude of ambient light is (1) or (2). On the other hand, an influence of ambient light is large in the 2D_SiPM. For example, in the 2D_SiPM, even if a dynamic range required in the case where the magnitude of ambient light is (1) is secured, a dynamic range may be insufficient in the case where the magnitude of ambient light is (2). When pile up (signal saturation) occurs due to a shortage of a dynamic range, detection of reflected light L2 becomes difficult. As a means for improving a dynamic range of a light detector, lowering a bias voltage is conceivable. However, when the bias voltage is uniformly lowered within the light detector, the overall light detection performance of the light detector would decrease.

Accordingly, the distance measuring device 1 according to the first embodiment includes the light detector PD capable of selectively setting a pixel PX to an active state from a plurality of pixels PX arranged in the pixel array 32. Then, the output stage 33 of the light detector PD includes a mechanism (the voltage drop circuit 60) capable of varying the overdrive voltage Vov. Furthermore, the distance measuring device 1 is formed to be able to change an overdrive voltage Vov to be used in the next measurement based on an output (a change in voltage of the output channel OUT_CH of the output stage 33) of the light detector PD. The distance measuring device 1 can largely change the overdrive voltage Vov instantly (e.g., less than 1 nm) by the voltage drop circuit 60. Such a change in overdrive voltage Vov cannot be achieved with an external power supply.

Accordingly, an optimal bias voltage may be set for each pixel PX and each measurement. For example, when the output of the light detector PD becomes large, the distance measuring device 1 controls the overdrive voltage Vov so that it becomes small. Since an output current of an avalanche photodiode APD then decreases, a shortage of a dynamic range (i.e., an occurrence of a pile up) is suppressed. On the other hand, when the output of the light detector PD becomes small, the distance measuring device 1 controls the output voltage Vov so that it becomes large. Since an output current of an avalanche photodiode APD then increases, sensitivity (light detection performance) of the light detector PD is improved.

In other words, conventionally, when ambient light is strong, an output current of the light detector PD is as shown in FIG. 26 (2), and detection of reflected light becomes difficult due to pile-up. On the other hand, in the light detector PD according to the first embodiment, the overdrive voltage Vov is lowered as an average value of the outputs of the light detector PD increases. As a result, the light detector PD according to the first embodiment can suppress occurrence of pile-up of an output of the light detector PD and maintain a state in which reflected light can be detected. The light detector PD according to the first embodiment can increase the overdrive voltage Vov, for example, decrease it by an order of magnitude, by using the voltage drop circuit 60. In addition, since a drop amount of the overdrive voltage Vov is determined by a threshold value of a transistor or a diode included in the voltage drop circuit 60, the light detector PD according to the first embodiment can achieve a stable operation.

As described above, the distance measuring device 1 according to the first embodiment can suppress a decrease in light detection performance and improve an effective dynamic range by appropriately adjusting the overdrive voltage Vov according to the state of ambient light. In other words, the distance measuring device 1 according to the first embodiment can achieve a high dynamic range (HDR) and improve characteristics of the light detector PD. Since the configuration (the voltage drop circuit 60) that changes the overdrive voltage Vov is provided in the output stage 33, the first embodiment can be achieved without a special circuit provided in a pixel PX. Thus, the distance measuring device 1 according to the first embodiment can be achieved at a low cost, has no decrease in sensitivity to light, and can improve characteristics of the light detector PD.

[1-5] Modifications of First Embodiment

The current source 61 described in the first embodiment may have other circuit configurations.

In the avalanche photodiode APD, the magnitude of an output current may largely vary depending on a large change in bias voltage described in the first embodiment and differences and variations in characteristics that an element originally has. A measurement IC that executes distance measurement processing based on a detection result of a light detector is expected to be used under low voltage and is manufactured using a fine process, and thus an adjustment width of an input current is often designed to be small. Thus, an output current of the light detector becoming small may lead to deterioration of an S/N ratio of reflected light L2 detected by the light detector. For example, a change in current due to a change in overdrive voltage Vov by about an order of magnitude and an influence of SiPM gain reduction due to pixel size reduction, etc., cannot be dealt with by the input current adjustment function of the measurement IC.

Accordingly, in the modifications of the first embodiment, the current source 61 has a configuration capable of varying an output current. In the following, a first modification and a second modification of the first embodiment will be described as modifications of the current source 61 included in the output circuit OC of the first embodiment.

First Modification of First Embodiment

FIG. 27 depicts a circuit diagram showing a circuit configuration of a current source 61a in the first modification of the first embodiment. As shown in FIG. 27, the current source 61a in the first modification of the first embodiment has a configuration in which N-type transistors NM32 and NM33 are added to the current source 61 of the first embodiment.

The N-type transistor NM32 is coupled between the node N31 and the N-type transistor NM30. Specifically, the drain and source of the N-type transistor NM32 are coupled to the node N31 and the drain of the N-type transistor NM30, respectively. The N-type transistor NM33 is coupled between the node N32 and the N-type transistor NM31. Specifically, the drain and source of the N-type transistor NM33 are coupled to the node N32 and the drain of the N-type transistor NM31, respectively. A voltage VN3 is input to the gate of each of the N-type transistors NM32 and NM33. The voltage VN3 is, for example, a voltage controlled by the controller 34, and can be adjusted according to an operating environment of the distance measuring device 1. To adjust the magnitude of the voltage VN3, a digital-to-analog converter (DAC) is used, for example.

In this way, the current source 61a in the first modification of the first embodiment can change the magnitude of an output current according to control of the gate voltage (VN3) of each of the N-type transistors NM32 and NM33. Specifically, the controller 34 can increase an output current of the output channel OUT_CH by adjusting the voltage VN3 to be high. For example, the controller 10 increases the output current by raising VN3 when an output current from the output circuit OC is small.

As described in the first embodiment, the overdrive voltage Vov can be appropriately changed. For example, when an overdrive voltage Vov is adjusted to be small for a certain pixel PX, a gain of a SPAD (avalanche photodiode APD) is reduced and its output current is also reduced. Then, since an avalanche probability and PDE are also reduced at the same time, the overall output current of the SiPM (pixel PX) is further reduced. In this case, the output current of that pixel PX becomes smaller than that of other pixels PX, and it becomes difficult to compare with other pixels PX.

Accordingly, in the current source 61a in the first modification of the first embodiment, the controller 34 controls the gate voltage (VN3) to increase and compensate for an output current of a pixel PX whose output current has been reduced so as to make it comparable to other pixels PX. The magnitude of an electric current has a proper range according to the measurement section 40 at a subsequent stage, and the controller 34 adjusts the magnitude of the voltage VN3 so that an output current of each pixel PX is in the proper range. As a result, the current source 61a can improve an S/N ratio of detected reflected light L2. In addition, the current source 61a can increase a gain also in a case where a small-sized SPAD is used in a 2D_SiPM, and thus the gain can be close to a gain of a 1D_SiPM.

Second Modification of First Embodiment

FIG. 28 depicts a circuit diagram showing a circuit configuration of a current source 61b in a second modification of the first embodiment. As shown in FIG. 28, the current source 61b in the second modification of the first embodiment has a configuration in which a P-type transistor PM32, N-type transistors NM34 to NM37, and a node N33 are added to the current source 61a of the first modification of the first embodiment.

The source and drain of the P-type transistor PM32 are coupled to the power supply node VDD and the node N33, respectively. The gate of the P-type transistor PM32 is coupled to the node N30. The drain and gate of the N-type transistor NM34 are coupled to the node N33. The source of the N-type transistor NM33 is coupled to the power supply node VSS. The drain, source, and gate of the N-type transistor NM35 are coupled to the node N32, the power supply node VSS, and the node N33, respectively. The N-type transistor NM36 is coupled between the node N33 and the N-type transistor NM34. Specifically, the drain and source of the N-type transistor NM36 are coupled to the node N33 and the drain of the N-type transistor NM34, respectively. The N-type transistor NM37 is coupled between the node N32 and the N-type transistor NM35. Specifically, the drain and source of the N-type transistor NM37 are coupled to the node N32 and the drain of the N-type transistor NM35, respectively. A voltage VN4 is input to the gate of each of the N-type transistors NM36 and NM37. The voltage VN4 is, for example, a voltage controlled by the controller 34, and can be adjusted according to an operating environment of the distance measuring device 1.

For example, when the voltage VN3 is set to an "H" level, an electric current of the N-type transistor NM31 contributes to the output channel OUT_CH, and when the voltage VN3 is set to an "L" level, an electric current of the N-type transistor NM31 does not contribute to the output channel OUT_CH. When the voltages VN3 and VN4 are both set to the "H" level, an electric current that is approximately double the current when only the voltage VN3 is set to the "H" level flows to the output channel OUT_CH. In other words, in the current source 61b, outputs of two current mirror circuits (output circuits) are coupled in parallel, and output currents of the current source 61b can be adjusted at two stages. For example, when four output circuits are coupled in parallel, the output current of the current source 61b can be adjusted at four stages. The number of output circuits included in the current source 61b is appropriately designed according to the number of stages of required output current adjustment.

As described above, the current source 61b in the second modification of the first embodiment can change the magnitude of the output current by selectively turning on the N-type transistors (NM32 and NM35) inserted into the current mirror circuits. In other words, the current source 61b includes a plurality of transistors at an output stage, and the magnitude of the output current can be changed by selecting the transistors in the output stage. In addition, the controller 34 can finely adjust the gate voltage of each of the N-type transistors NM32 and NM35 by a digital-to-analog converter, etc. Then, the current source 61b in the second modification of the first embodiment has a larger number of transistors used for adjustment of the output current than that in the first modification of the first embodiment, and thus can adjust the magnitude of the output current more finely than in the first modification of the first embodiment.

As a result, the current source 61b in the second modification of the first embodiment can adjust the magnitude of the output current of the current source 61b to a more appropriate magnitude than that by the current source 61a in the first modification of the first embodiment, and enable compensation of the output current with respect to a change in overdrive voltage Vov and improve an S/N ratio of detected reflected light L2 as described in the first modification of the first embodiment.

In the current source 61b, an intermediate potential may be used for each of the voltages VN3 and VN4. This intermediate potential corresponds to a voltage when the N-type transistors are turned on and which is lower than the above-described "H"-level voltage. By the intermediate potential being used for each of the voltages VN3 and VN4, also in a case where the number of parallel output circuits is not increased, it is possible to adjust the output current of the current source 61b at multiple stages. For adjustment of the intermediate potential of each of the voltages VN3 and VN4, a digital-to-analog converter is used, for example.

[2] Second Embodiment

A distance measuring device 1 according to a second embodiment has a configuration in which characteristics of the light detector PD are improved by an output stage 33 having a different configuration from that in the first embodiment. In the following, differences between the distance measuring device 1 according to the second embodiment and the distance measuring device 1 according to the first embodiment will be described.

[2-1] Configuration of Output Stage 33

FIG. 29 depicts a block diagram showing an example of a configuration of an output circuit OCa included in the output stage 33 in the distance measuring device 1 according to the second embodiment. As shown in FIG. 29, the output circuit OCa includes the voltage drop circuit 60, a current source 61c, and the input stage 62.

In the output circuit OCa, an output of the voltage drop circuit 60 is input to the input stage 62. The input stage 62 is coupled between the current source 61c and the power supply node VSS2. The input stage 62 is a gate ground circuit using an N-type MOS transistor (Gate ground). Such an input stage 62 may be formed with low impedance. The current source 61c amplifies a signal input from the input stage 62, and outputs the signal to the output channel OUT_CH.

(Configurations of Current Source 61c and Input Stage 62)

FIG. 30 depicts a circuit diagram showing an example of circuit configurations of the current source 61c and the input stage 62 included in the output circuit OCa in the distance measuring device 1 according to the second embodiment. As shown in FIG. 30, the current source 61c has a configuration in which P-type transistors PM40 and PM41 are added to the current source 61a of the first modification of the first embodiment. The input stage 62 includes N-type transistors NM40 and NM41, and a node N40.

The P-type transistor PM40 is coupled between the P-type transistor PM30 and the node N30. Specifically, the source and drain of the P-type transistor PM40 are coupled to the drain of the P-type transistor PM30 and the node N30, respectively. The P-type transistor PM41 is coupled between the P-type transistor PM31 and the node N31. Specifically, the source and drain of the P-type transistor PM41 are coupled to the drain of the P-type transistor PM31 and the node N31, respectively. A voltage VP2 is applied to the gate of each of the P-type transistors PM40 and PM41.

The drain and source of the N-type transistor NM40 are coupled to the nodes N30, which is an input of the current source, and N40, which is a signal output from the voltage drop circuit, respectively. A voltage VN5 is applied to the gate of the N-type transistor NM40. The voltage VN5 is a fixed intermediate potential between VDD and VSS, and is appropriately determined (calibrated) according to an operating environment. The voltage VN5 preferably has a relatively low value. For example, the voltage VN5 is lower than a middle value of VDD and VSS, and is slightly higher than VP2. The drain and source of the N-type transistor NM41 are coupled to the node N40 and the power supply node VSS, respectively. A voltage VN6 is applied to the gate of the N-type transistor NM41. The voltage VN6 is a fixed intermediate potential between VDD and VSS, and is appropriately determined (calibrated) according to an operating environment. The voltage VN6 preferably has a relatively low value. For example, the voltage VN6 is about the same as or slightly higher than VN5. The node N40 is coupled to the output node VDOUT. That is, the output of the voltage drop circuit 60 is input to the node N40. In other words, as shown in FIG. 30, the output of the voltage drop circuit 60 is coupled to the source of the N-type transistor NM40. The drain of the N-type transistor N40 is coupled to the current source 61c. The rest of the configuration of the distance measuring device 1 according to the second embodiment is the same as that of the first embodiment.

[2-2] Advantageous Effect of Second Embodiment

The distance measuring device 1 according to the second embodiment described above can adjust the overdrive voltage Vov, and improve the characteristics of the light detector PD, in the same manner as the first embodiment. Further, in the distance measuring device 1 according to the second embodiment, the output circuit OCa includes the input stage 62 to which an output signal from the voltage drop circuit 60 is input. The input stage 62 is used for gate ground and includes an N-type transistor having a high mutual conductance gm. Thus, an input impedance of the output circuit OCa of the second embodiment is lower than that of the output circuit OC of the first embodiment. As a result, the output circuit OCa of the second embodiment can suppress deterioration of a band of an output signal as compared with the output circuit OC of the first embodiment, and is suitable for high frequency amplification.

[3] Third Embodiment

A distance measuring device 1 according to a third embodiment has a configuration for improving characteristics of the light detector PD by an output stage 33 having a configuration different from that of the first and second embodiments. In the following, differences between the distance measuring device 1 according to the third embodiment and the distance measuring device 1 according to the first and second embodiments will be described.

[3-1] Configuration of Output Stage 33

FIG. 31 depicts a block diagram showing an example of a configuration of an output circuit OCb included in the output stage 33 in the distance measuring device 1 according to the third embodiment. As shown in FIG. 31, the output circuit OCb includes the voltage drop circuit 60, the current source 61c, and the input stage 62.

In the output circuit OCb, a signal input to the node N_CH of the pixel array 32 is input to the input stage 62. In the output circuit OCb, the voltage drop circuit 60 is coupled between the input stage 62 and the power supply node VSS2. Specifically, although not shown, an input node (the node N20) of the voltage drop circuit 60 is coupled to the source of the N-type transistor NM41 included in the input stage 62. The current source 61c amplifies a signal input from the input stage 62, and outputs the signal to the output channel OUT_CH. The rest of the configuration of the distance measuring device 1 according to the third embodiment is the same as that of the second embodiment.

[3-2] Advantageous Effect of Third Embodiment

As described above, the voltage drop circuit 60 in the distance measuring device 1 according to the third embodiment has a function of lowering the voltage of the output channel OUT_CH via the input stage 62. In this way, even when the coupling order of the voltage drop circuit 60 is changed, the output circuit OCb in the third embodiment can adjust the overdrive voltage Vov. As a result, the distance measuring device 1 according to the third embodiment can improve the characteristics of the light detector PD in the same manner as in the second embodiment.

[4] Fourth Embodiment

A distance measuring device 1 according to a fourth embodiment has a configuration for improving the characteristics of the light detector PD by an output stage 33 having a configuration different from that of the first to third embodiments. In the following, differences between the distance measuring device 1 according to the fourth embodiment and the distance measuring device 1 according to the first to third embodiments will be described.

[4-1] Configuration of Output Stage 33

Figure 32:
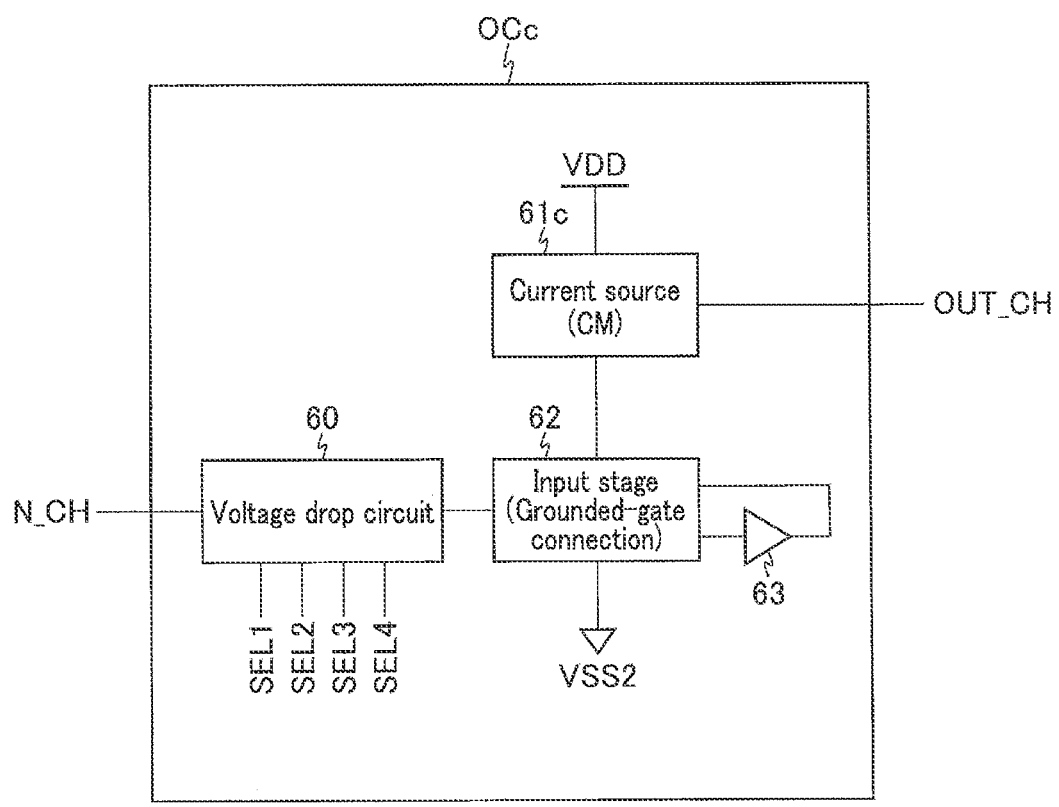
FIG. 32 depicts a block diagram showing an example of a configuration of an output circuit included in an output stage in a distance measuring device according to a fourth embodiment.

FIG. 32 depicts a block diagram showing an example of a configuration of an output circuit OCc included in the output stage 33 in the distance measuring device 1 according to the fourth embodiment. As shown in FIG. 32, the output circuit OCc has a configuration in which a voltage adjustment circuit 63 is added to the output circuit OCa of the second embodiment.

The voltage adjustment circuit 63 controls a gate voltage of a transistor included in the input stage 62. Thereby, the voltage adjustment circuit 63 can finely adjust the voltage of the node N_CH, that is, the overdrive voltage Vov, via the voltage drop circuit 60. A voltage width of the overdrive voltage Vov that can be adjusted by the voltage adjustment circuit 63 is, for example, 1.5 V or more at the maximum when the power supply voltage is 3.3 V.

(Configurations of Input Stage 62 and Voltage Adjustment Circuit 63)

FIG. 33 depicts a circuit diagram showing an example of circuit configurations of the current source 61c, the input stage 62, and the voltage adjustment circuit 63 included in the output circuit OCc in the distance measuring device 1 according to the fourth embodiment. As shown in FIG. 33, the configurations of the current source 61c and the input stage 62 are the same as those of the second embodiment. The voltage adjustment circuit 63 includes a regulation amplifier REG2.

The regulation amplifier REG2 stabilizes a voltage and an electric current input to the output circuit OCc, and finely adjusts a voltage of the node N40. Specifically, a voltage based on a control value DAC2 and the voltage of the node N40 is input to the gate of the N-type transistor NM40 included in the input stage 62 of the output circuit OCc. In other words, the control value DAC2 is input to a first input end of the regulation amplifier REG2, a second input end of the regulation amplifier REG2 is coupled to the node N40, and an output end of the regulation amplifier REG2 is coupled to the gate of the N-type transistor NM40. The control value DAC2 is, for example, generated by the controller 34. Hereinafter, the second input end of the regulation amplifier REG2 will also be referred to as an input node R_IN, and the output end of the regulation amplifier REG2 will also be referred to as an output node R_OUT.

(Configuration of Regulation Amplifier REG2)

Figure 34:
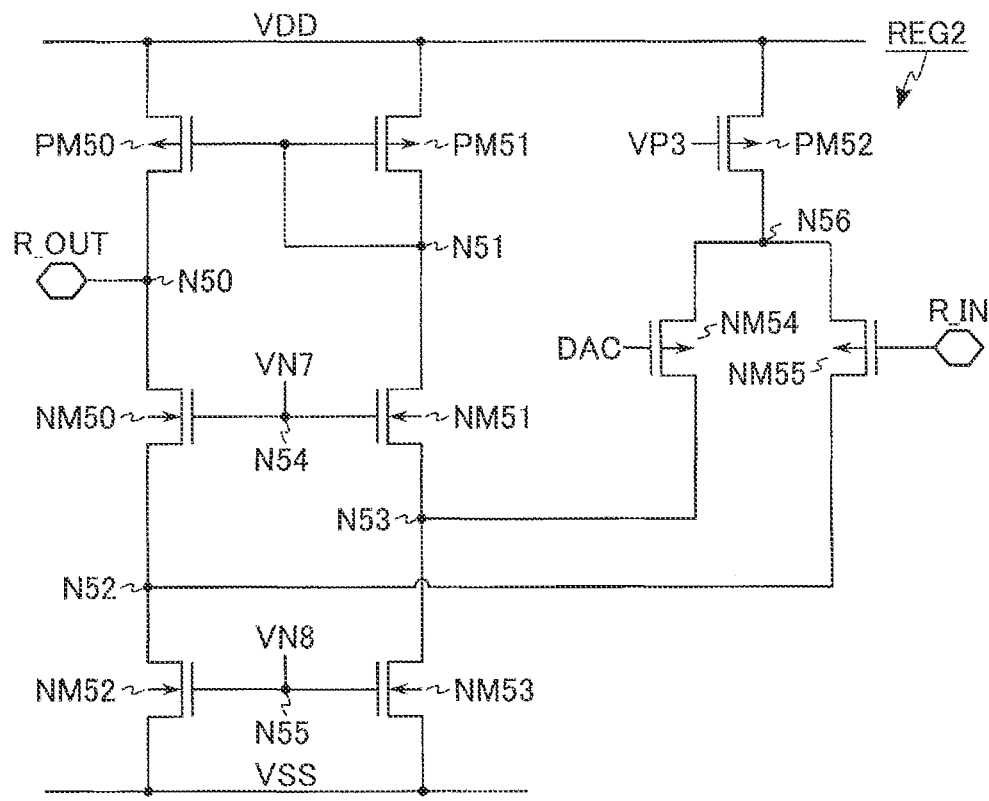
FIG. 34 depicts a circuit diagram showing an example of a circuit configuration of a regulation amplifier included in the voltage adjustment circuit included in the output circuit in the distance measuring device according to the fourth embodiment.

FIG. 34 depicts a circuit diagram showing an example of a circuit configuration of the regulation amplifier REG2 included in the voltage adjustment circuit 63 included in the output circuit OCc in the distance measuring device 1 according to the fourth embodiment. As shown in FIG. 34, the regulation amplifier REG2 includes, for example, P-type transistors PM50 to PM52, N-type transistors NM50 to NM55, and nodes N50 to N56.

The source and drain of the P-type transistor PM50 are coupled to the power supply node VDD and the node N50, respectively. The source and drain of the P-type transistor PM51 are coupled to the power supply node VDD and the node N51, respectively. The gate of each of the P-type transistors PM50 and PM51 is coupled to the node N51. The node N50 is coupled to the output node R_OUT.

The drain and source of the N-type transistor NM50 are coupled to the nodes N50 and N52, respectively. The drain and source of the N-type transistor NM51 are coupled to the nodes N51 and N53, respectively. The gate of each of the N-type transistors NM50 and NM51 is coupled to the node N54. A voltage VN7 is applied to the node N54. The voltage VN7 is, for example, a voltage controlled by the controller 34, and can be adjusted according to an operating environment of the distance measuring device 1.

The drain and source of the N-type transistor NM52 are coupled to the node N52 and the power supply node VSS, respectively. The drain and source of the N-type transistor NM53 are coupled to the node N53 and the power supply node VSS, respectively. The gate of each of the N-type transistors NM52 and NM53 is coupled to the node N55. A voltage VN8 is applied to the node N55. The voltage VN8 is, for example, a voltage controlled by the controller 34, and can be adjusted according to an operating environment of the distance measuring device 1.

The drain and source of the N-type transistor NM54 are coupled to the nodes N56 and N53, respectively. A control value DAC is input to the gate of the N-type transistor NM54. The control value DAC corresponds to the control value DAC2 shown in FIG. 33. The drain and source of the N-type transistor NM55 are coupled to the nodes N56 and N52, respectively. The gate of the N-type transistor NM55 is coupled to the input node R_IN. The input node R_IN corresponds to the second input end of the regulation amplifier REG2, and is coupled to the node N40 (not shown).

The source and drain of the P-type transistor PM52 are coupled to the power supply node VDD and the node N56, respectively. A voltage VP3 is applied to the gate of the P-type transistor PM52. The voltage VP3 is, for example, a voltage controlled by the controller 34, and can be adjusted according to an operating environment of the distance measuring device 1. The rest of the configuration of the distance measuring device 1 according to the fourth embodiment is the same as that of the second embodiment. The configuration of the regulation amplifier REG1 shown in FIG. 11 may be the same as that of the regulation amplifier REG2 shown in FIG. 34.

Figure 35:
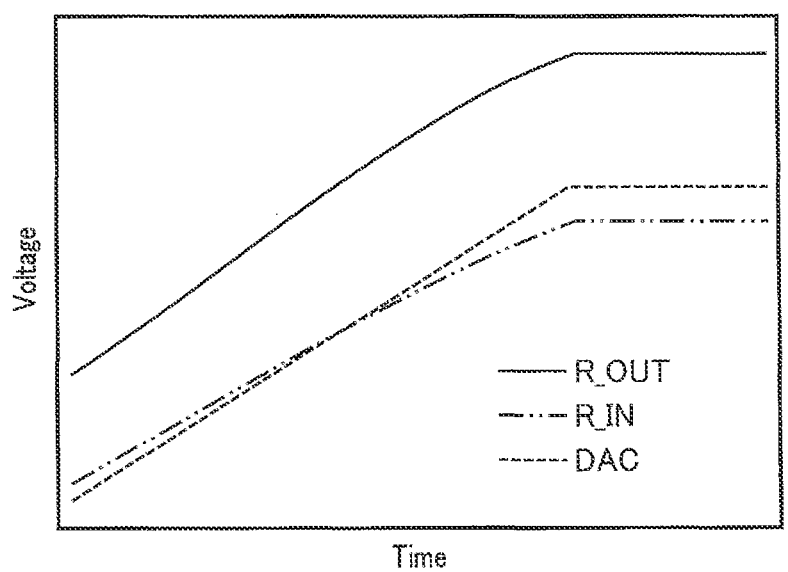
FIG. 35 depicts a waveform diagram showing an example of an output signal of the regulation amplifier in the distance measuring device according to the fourth embodiment.

FIG. 35 depicts a waveform diagram showing an example of an output signal of the regulation amplifier REG2 in the distance measuring device 1 according to the fourth embodiment. As shown in FIG. 35, in the regulation amplifier REG2, when a voltage of the control value DAC increases, a voltage of the output node R_OUT increases. Accordingly, a gate voltage of the N-type transistor NM40 coupled to the output node R_OUT also increases, and a resistance value of the N-type transistor NM40 decreases. As a result, a voltage of the input node R_IN also increases. When a voltage of the power supply node VDD is 3.3 V, the regulation amplifier REG2 can change the voltage of the input node R_IN by 1.5 V or more. Herein, the amplifier REG2 may be any differential amplifier. When another differential amplifier is used as the regulation amplifier REG2, an adjustment range per power supply voltage tends to be narrow.

[4-2] Advantageous Effect of Fourth Embodiment

In the distance measuring device 1 according to the fourth embodiment described above, the output circuit OCc includes the voltage adjustment circuit 63 (the regulation amplifier REG2). Then, in the distance measuring device 1 according to the fourth embodiment, the controller 34 causes the regulation amplifier REG2 to control the gate voltage of the N-type transistor NM40 included in the input stage 62. Thereby, the light detector PD according to the fourth embodiment can make an adjustment range of the voltage of the node N40 larger and finer than that of the second embodiment. In other words, by adjusting the output voltage of the regulation amplifier REG2 by the control value DAC2, the overdrive voltage Vov can be adjusted more finely than by switching of the selection signal SEL by the voltage drop circuit 60.

For example, the voltage change in overdrive voltage Vov described in the second embodiment is determined in units of a threshold voltage of a transistor or diode, for example, in units of 0.4 to 0.6 V. Thus, the light detector PD according to the second embodiment cannot change the overdrive voltage Vov by a smaller amount than the above. On the other hand, the output circuit OCc of the fourth embodiment can adjust the overdrive voltage Vov more finely than the output circuit OC of the first embodiment, and thus can set a more appropriate overdrive voltage Vov. As a result, the output circuit OCc of the fourth embodiment can improve the characteristics of the light detector PD more than the second embodiment.

[4-3] Modification of Fourth Embodiment

FIG. 36 depicts a circuit diagram showing an example of circuit configurations of the current source 61c, the input stage 62, and a voltage adjustment circuit 63a included in an output circuit OCc in a modification of the fourth embodiment. As shown in FIG. 36, the voltage adjustment circuit 63a in the modification of the fourth embodiment has a configuration in which an N-type transistor NM42 and a regulation amplifier REG3 are added to the voltage adjustment circuit 63 of the fourth embodiment.

A control value DAC3 is input to the drain of the N-type transistor NM42. The control value DAC3 is, for example, generated by the controller 10. The source of the N-type transistor NM42 is coupled to the power supply node VSS. The gate of the N-type transistor NM42 is coupled to the gate of the N-type transistor NM41. The regulation amplifier REG3 inputs a voltage based on the control values DAC2 and DAC3 to the gate of the N-type transistor NM41 included in the input stage 62 of the output circuit OCc. In other words, the control value DAC2 is input to a first input end of the regulation amplifier REG3, the control value DAC3 is input to a second input end of the regulation amplifier REG3, and an output end of the regulation amplifier REG3 is coupled to the gate of each of the N-type transistors NM41 and NM42. The control value DAC3 is, for example, generated by the controller 34.

Thereby, the voltage adjustment circuit 63a in the modification of the fourth embodiment can calibrate and finely adjust an adjustment range, and adjust the overdrive voltage Vov more appropriately than the voltage adjustment circuit 63 of the fourth embodiment does. A combination of the control values DAC2 and DAC3 is, for example, managed by the controller 34.

[5] Fifth Embodiment

A distance measuring device 1 according to a fifth embodiment has a configuration in which characteristics of the light detector PD are improved by an output stage 33 having a different configuration from those of the first to fourth embodiments. In the following, differences between the distance measuring device 1 according to the fifth embodiment and the distance measuring device 1 according to first to fourth embodiments will be described.

[5-1] Configuration of Output Stage 33

FIG. 37 depicts a block diagram showing an example of a configuration of an output circuit OCd included in the output stage 33 in the distance measuring device 1 according to the fifth embodiment. As shown in FIG. 37, the output circuit OCd includes the voltage drop circuit 60, a discharge circuit 65, and a node N60.

In the output circuit OCd, the output node VDOUT of the voltage drop circuit 60 is coupled to the node N60. The output channel OUT_CH and the discharge circuit 65 are coupled to the node N60. The discharge circuit 65 is coupled between the node N60 and the power supply node VSS2. The discharge circuit 65 can lower a voltage of the node N60 based on control of the controller 34. That is, the discharge circuit 65 can lower the voltage of the node N_CH, i.e., the overdrive voltage Vov, via the voltage drop circuit 60.

(Circuit Configuration of Discharge Circuit 65)

FIG. 38 depicts a circuit diagram showing an example of a circuit configuration of the discharge circuit 65 included in the output circuit OCd in the distance measuring device 1 according to the fifth embodiment. As shown in FIG. 38, the discharge circuit 65 includes an N-type transistor NM60.

The drain of the N-type transistor NM60 is coupled to the node N60. The source of the N-type transistor NM60 is grounded. A voltage VN9 is applied to the gate of the N-type transistor NM60. The voltage VN9 is, for example, generated by the controller 10. The voltage VN9 is a fixed intermediate potential between VDD and VSS, and is appropriately adjusted (calibrated) according to an operating environment. The controller 34 sets the voltage VN9 to a high voltage in order to reduce the output current of the output circuit OCd. That is, the magnitude of an output current of the output circuit OCd is adjusted according to the height of the voltage VN9.

[5-2] Advantageous Effect of Fifth Embodiment

As described above, in the distance measuring device 1 according to the fifth embodiment, the output circuit OCd includes the discharge circuit 65 capable of discharging output power of the output channel OUT_CH. As a result, the distance measuring device 1 according to the fifth embodiment can adjust the overdrive voltage Vov and properly adjust an amount of the output current of the output circuit OCd, thereby improving the characteristics of the light detector PD. In addition, the output circuit OCd does not have the current source 61 (current mirror circuit). Thus, in the output circuit OCd, an output current of an SiPM is output to the output channel OUT_CH. As a result, the distance measuring device 1 according to the fifth embodiment can better suppress a delay of a signal and deterioration of a band and operate in a more power-saving manner than the first embodiment.

[5-3] Modification of Fifth Embodiment

FIG. 39 depicts a circuit diagram showing an example of a circuit configuration of a discharge circuit 65a included in an output circuit OCd in a modification of the fifth embodiment. As shown in FIG. 39, the discharge circuit 65a has a configuration in which an N-type transistor NM61 is added to the discharge circuit 65.

The drain of the N-type transistor NM61 is coupled to the node N60. The source of the N-type transistor NM61 is grounded. A voltage VN10 is applied to the gate of the N-type transistor NM61. The voltage VN10 is, for example, generated by the controller 34. The voltage VN10 is a fixed intermediate potential between VDD and VSS, and is appropriately adjusted (calibrated) according to an operating environment. The controller 34 sets the voltage VN10 to a high voltage in order to reduce the output current of the output circuit OCd. That is, the magnitude of the output current of the output circuit OCd is adjusted according to the height of each of the voltages VN9 and VN10.

In addition, the controller 34 can adjust a current discharge amount of the node N60 by the discharge circuit 65 by selectively turning on the N-type transistors NM60 and NM61 included in the discharge circuit 65a. The number and type of transistors included in the discharge circuit 65 can be freely designed. It suffices that the discharge circuit 65 has a function of lowering the voltage of the node N60 by controlling an on/off of at least one transistor coupled between the node N60 and the power supply node VSS2.

[6] Sixth Embodiment

A distance measuring device 1 according to a sixth embodiment includes an output stage 33 according to a polarity of an avalanche photodiode APD, and improves characteristics of the light detector PD. In the following, differences between the distance measuring device 1 according to the sixth embodiment and the distance measuring device 1 according to the first to fifth embodiments will be described.

[6-1] Configuration of Output Stage 33

FIG. 40 depicts a block diagram showing an example of a configuration of an output circuit OCe included in the output stage 33 in the distance measuring device 1 according to the sixth embodiment. As shown in FIG. 40, the output circuit OCe has a configuration in which the current source 61 is replaced with a current source 66 with respect to the output circuit OC of the first embodiment.

The current source 66 includes a current mirror circuit (CM, inverted) that inverts a direction of an input electric current and outputs the electric current. The number of stages of current mirror circuits included in the current source 61 is designed according to a value of a gain required for the current source 61. The current source 66 is coupled to each of the power supply node VDD and the power supply node VSS2. The current source 66 is designed to be a structure according to structures of an avalanche photodiode APD and a quench resistor Rq (i.e., the structure of the light detector PD).

FIG. 41 depicts a block diagram showing an example of a structure of the light detector PD included in the distance measuring device 1 according to the sixth embodiment, showing a coupling relationship of an avalanche photodiode APD and a quench resistor Rq in the light detector PD, and a structure of the avalanche photodiode APD corresponding to that coupling relationship. FIGS. 41 (1) and (2) differ in structure of the avalanche photodiode APD. Hereinafter, the structures of the light detector PD shown in FIGS. 41 (1) and (2) will be referred to as avalanche photodiodes APD of a NonP structure and a PonN structure, respectively.

As shown in FIG. 41 (1), in the NonP structure, the quench resistor Rq is coupled to the cathode of the avalanche photodiode APD. Then, a P-type semiconductor layer PP (P+) and an N-type semiconductor layer NP (N+) which function as the avalanche photodiode APD are stacked in this order on a semiconductor substrate SUB (Si Sub). That is, in the NonP structure, the anode of the avalanche photodiode APD is provided on a back surface side of the semiconductor substrate SUB, and the cathode of the avalanche photodiode APD is provided on a front surface side of the semiconductor substrate SUB.

As shown in FIG. 41 (2), in the PonN structure, the quench resistor Rq is coupled to the anode of the avalanche photodiode APD. Then, an N-type semiconductor layer NP (N+) and a P-type semiconductor layer PP (P+) which function as the avalanche photodiode APD are stacked in this order on a semiconductor substrate SUB (Si Sub). That is, in the PonN structure, the cathode of the avalanche photodiode APD is provided on a back surface side of the semiconductor substrate SUB, and the anode of the avalanche photodiode APD is provided on a front surface side of the semiconductor substrate SUB.

As described above, a direction of the APD of the NonP structure is opposite to that of the APD of the PonN structure. Then, a reverse bias voltage is applied to both the APD of the NonP structure and the APD of the PonN structure. Thus, a direction of an electric current flowing through the APD of the NonP structure is opposite to that of an electric current flowing through the APD of the PonN structure.

Current Source 66a of First Configuration Example

FIG. 42 depicts a circuit diagram showing a circuit configuration of a current source 66a of a first configuration example included in the output circuit OCe in the distance measuring device 1 according to the sixth embodiment. FIG. 42 shows an example of the current source 66 used for a combination of the avalanche photodiode APD of the NonP structure and the measurement section 40 (TIA 41) for the PonN structure. As shown in FIG. 42, the current source 66a of the first configuration example includes P-type transistors PM60 and PM61 and nodes N60 and N61.

The P-type transistors PM60 and PM61 function as P-type current mirror circuits that amplify an electric current input to the output node VDOUT. The source and drain of the P-type transistor PM60 are coupled to the power supply node VDD and the node N60, respectively. The source and drain of the P-type transistor PM61 are coupled to the power supply node VDD and the node N61, respectively. The gate of each of the P-type transistors PM60 and PM61 is coupled to the node N60. The node N60 is coupled to the output node VDOUT. The node N61 is coupled to the output channel OUT_CH.

Thereby, the current source 66a outputs an electric current amplified and inverted by one P-type current mirror circuit (i.e., one stage of a current mirror circuit) to the output channel OUT_CH. When the current source 66a is used, the signal processing circuit 41 (TIA) of the measurement section 40 is designed for the PonN structure.

Current Source 66b of Second Configuration Example

FIG. 43 depicts a circuit diagram showing a circuit configuration of a current source 66b of a second configuration example included in the output circuit OCe in the distance measuring device 1 according to the sixth embodiment. FIG. 43 shows an example of the current source 66 used for a combination of the avalanche photodiode APD of the NonP structure and the measurement section 40 (TIA 41) for the PonN structure. As shown in FIG. 43, the current source 66b of the second configuration example has a configuration in which the node N61 and the output node OUT_CH are separated from each other, and N-type transistors NM60 and NM61, P-type transistors PM62 and PM63, and nodes N62 and N63 are added, with respect to the current source 66a of the first configuration example.

The N-type transistors NM60 and NM61 function as N-type current mirror circuits that amplify an electric current input to the node N61. The drain and source of the N-type transistor NM60 are coupled to the node N61 and the power supply node VSS, respectively. The drain and source of the N-type transistor NM61 are coupled to the node N62 and the power supply node VSS, respectively. The gate of each of the N-type transistors NM60 and NM61 is coupled to the node N61.

The P-type transistors PM62 and PM63 function as P-type current mirror circuits that amplify an electric current input to the node N62. The source and drain of the P-type transistor PM62 are coupled to the power supply node VDD and the node N62, respectively. The source and drain of the P-type transistor PM63 are coupled to the power supply node VDD and the node N63, respectively. The gate of each of the P-type transistors PM62 and PM63 is coupled to the node N62. The node N63 is coupled to the output channel OUT_CH. The rest of the configuration of the current source 66b is the same as that of the current source 66a.

Thereby, the current source 66b outputs an electric current amplified and inverted by three current mirror circuits (i.e., three stages of current mirror circuits), including two P-type current mirror circuits and one N-type current mirror circuit, to the output channel OUT_CH. When the current source 61b is used, the signal processing circuit 41 (TIA) of the measurement section 40 is designed for the PonN structure. The current source 66b of the second configuration example uses a three-stage current mirror circuit to increase the amplification capability compared to the current source 66a of the first configuration example.

Current Source 66c of Third Configuration Example

FIG. 44 depicts a circuit diagram showing a circuit configuration of a current source 66c of a third configuration example included in the output circuit OCe in the distance measuring device 1 according to the sixth embodiment. FIG. 44 shows an example of the current source 66 used for a combination of the avalanche photodiode APD for the PonN structure and the measurement section 40 (TIA 41) for the NonP structure. As shown in FIG. 44, the current source 66c of the third configuration example includes N-type transistors NM70 and NM71 and nodes N70 and N71.

The N-type transistors NM70 and NM71 function as N-type current mirror circuits that amplify an electric current input to the output node VDOUT. The drain and source of the N-type transistor NM70 are coupled to the node N70 and the power supply node VSS, respectively. The drain and source of the N-type transistor NM71 are coupled to the node N71 and the power supply node VSS, respectively. The gate of each of the N-type transistors NM70 and NM71 is coupled to the node N70. The node N70 is coupled to the output node VDOUT. The node N71 is coupled to the output channel OUT_CH.

Thereby, the current source 61c outputs an electric current amplified and inverted by one N-type current mirror circuit (i.e., one stage of a current mirror circuit) to the output channel OUT_CH. When the current source 61c is used, the signal processing circuit 41 (TIA) of the measurement section 40 is designed for the NonP structure.

Current Source 66d of Fourth Configuration Example

FIG. 45 depicts a circuit diagram showing a circuit configuration of a current source 66d of the fourth configuration example included in the output circuit OCe in the distance measuring device 1 according to the sixth embodiment. FIG. 45 shows an example of the current source 66 used for a combination of the avalanche photodiode APD for the PonN structure and the measurement section 40 (TIA 41) for the NonP structure. As shown in FIG. 45, the current source 66d of the fourth configuration example has a configuration in which the node N71 and the output node OUT_CH are separated from each other, and P-type transistors PM70 and PM71, N-type transistors NM72 and NM73, and nodes N72 and N73 are added, with respect to the current source 66c of the third configuration example.

The P-type transistors PM70 and PM71 function as P-type current mirror circuits that amplify an electric current input to the node N71. The source and drain of the P-type transistor PM70 are coupled to the power supply node VDD and the node N71, respectively. The source and drain of the P-type transistor PM71 are coupled to the power supply node VDD and the node N72, respectively. The gate of each of the P-type transistors PM70 and PM71 is coupled to the node N71.

The N-type transistors NM72 and NM73 function as N-type current mirror circuits that amplify an electric current input to the node N72. The drain and source of the N-type transistor NM72 are coupled to the node N72 and the power supply node VSS, respectively. The drain and source of the N-type transistor NM73 are coupled to the node N73 and the power supply node VSS, respectively. The gate of each of the N-type transistors NM72 and NM73 is coupled to the node N72. The node N73 is coupled to the output channel OUT_CH. The rest of the configuration of the current source 66d is the same as that of the current source 66c.

Thereby, the current source 66d outputs an electric current amplified and inverted by three current mirror circuits (i.e., three stages of current mirror circuits) including two N-type current mirror circuits and one P-type current mirror circuit to the output channel OUT_CH. When the current source 61d is used, the signal processing circuit 41 (TIA) of the measurement section 40 is designed for the NonP structure. The current source 66d of the fourth configuration example uses a three-stage current mirror circuit to increase the amplification capability compared to the current source 66c of the third configuration example.

Current Source 66e of Fifth Configuration Example

FIG. 46 depicts a circuit diagram showing a circuit configuration of a current source 66e of a fifth configuration example included in the output circuit OCe in the distance measuring device 1 according to the sixth embodiment. FIG. 46 shows an example of the current source 66 compatible with both the measurement section 40 (TIA 41) for the NonP structure and the measurement section 40 (TIA 41) for the PonN structure. As shown in FIG. 46, the current source 66e of the fifth configuration example has a configuration in which a P-type transistor PM33 is added to the current source 61a described in the first modification of the first embodiment.

The P-type transistor PM33 is coupled between the nodes N31 and N32. When the P-type transistor PM33 is turned on, a current path is formed between the nodes N31 and N32. The gate of the P-type transistor PM33 is coupled to the gate of each of the N-type transistors NM32 and NM33. A control signal CS is input to the gate of the P-type transistor PM33. The control signal CS is, for example, generated by the controller 34.

When the control signal CS is set to an "H" level, the N-type transistors NM32 and NM33 are turned on, and the P-type transistor PM33 is turned off. At this time, a current path is formed between the nodes N31 and N32, and a current path between the node N31 and the power supply node VSS is cut off. Accordingly, when the control signal CS is set to the "H" level, a direction of an electric current output to the output channel OUT_CH is adapted to the measurement section 40 (TIA 41) for the NonP structure.

When the control signal CS is set to an "L" level, the N-type transistors NM32 and NM33 are turned off, and the P-type transistor PM33 is turned on. At this time, an electric current flowing through the N-type transistors NM33 and NM31 which is generated based on an electric current flowing through the N-type transistors NM30 and NM32 flows to the node N32. Accordingly, when the control signal CS is set to the "L" level, a direction of an electric current output to the output channel OUT_CH is adapted to the measurement section 40 (TIA 41) for the PonN structure.

As described above, the current source 66e of the fifth configuration example can be selectively adapted to any one of the TIA 41 for the NonP structure and the TIA 41 for the PonN structure according to control of the controller 34.

[6-2] Advantageous Effect of Sixth Embodiment

As described above, the output circuit OC in the sixth embodiment can be designed according to the polarity of the avalanche photodiode APD. As a result, it is possible to select an appropriate current source 66 according to the polarity of the avalanche photodiode APD and the design of the signal processing circuit 41, and design the output circuit OC in accordance with the measurement IC, a range of use according to a customer's request, and the polarity (a direction of an electric current). In the sixth embodiment, a case in which the number of stages of current mirror circuits included in the current source 66 is one or three has been exemplified, but it suffices that the current source 66 includes at least odd numbers of stages of current mirror circuits. In addition, when the current source 66e of the fourth configuration example is used, the light detector PD can be compatible with the measurement ICs (the measurement sections 40) designed for both polarities of the NonP structure and the PonN structure by the control signal CS. As a result, options for the combination of the light detector PD and the measurement IC are expanded, so that the performance of the light detector PD can be optimized and various design man-hours can be reduced.

[7] Seventh Embodiment

A distance measuring device 1 according to a seventh embodiment relates to a control method of the voltage adjustment circuit 63 included in the output circuit OCc described in the fourth embodiment. In the following, differences between the distance measuring device 1 according to the seventh embodiment and the distance measuring device 1 according to the fourth embodiment will be described.

[7-1] Configuration of Distance Measuring Device 1

FIG. 47 depicts a schematic diagram showing an example of a configuration of the distance measuring device 1 according to the seventh embodiment. As shown in FIG. 47, in the seventh embodiment, a light receiver 30a includes a light detector PDa. The light detector PDa has a configuration in which a voltage adjustment circuit 35 and a storage part 36 are added to the light detector PD of the fourth embodiment. In the seventh embodiment, a measurement section 40a (measurement IC) has a configuration in which a compensating circuit 44, a voltage adjustment circuit 45, and a storage part 46 are added to the measurement section 40 of the fourth embodiment.

The voltage adjustment circuit 35 has a function of causing the output circuit OCc to compensate for an output value, and a function of causing the output circuit OCc to change the overdrive voltage Vov. The voltage adjustment circuit 35 may supply a compensation coefficient CV1 for compensating for an output value of the output circuit OCc, and a control value DAC2 for adjusting the overdrive voltage Vov to the output circuit OCc. The voltage adjustment circuit 35 may be regarded as a part of the controller 34 of the light detector PDa.

The storage part 36 stores an adjusting value table 100. The adjusting value table 100 shows relationships among an operating environment (e.g., a magnitude of ambient light) of the distance measuring device 1, a selection signal SEL of the voltage drop circuit 60, and the control value DAC2 input to the regulation amplifier REG2. The storage part 36 is, for example, used by the voltage adjustment circuit 35, and data stored in the storage part 36 is referred to by the voltage adjustment circuit 35.

For example, the voltage adjustment circuit 35 senses a voltage of the node N12. Then, the voltage adjustment circuit 35 controls the voltage adjustment circuit 63 within the output circuit OCc based on a sensing result. Specifically, based on the sensing result, the voltage adjustment circuit 35 determines a selection signal of the voltage drop circuit and a voltage of the control value DAC2 and adjusts the overdrive voltage Vov. A timing at which the voltage adjustment circuit 35 adjusts the overdrive voltage Vov is, for example, in accordance with a timing of a trigger signal TS1 output from the controller 10. The voltage adjustment circuit 35, when the voltage adjustment circuit 63a includes a plurality of regulation amplifiers REG2 and REG3 as in the modification of the fourth embodiment, may adjust each of the associated control values DAC2 and DAC3 to an appropriate preset value.

The signal processing circuit 41 of the measurement section 40a has basically the same configuration as that shown in FIG. 11 described in the first embodiment. The signal processing circuit 41 receives, by the node N12, a signal output from the output circuit OCc included in the output stage 33. Then, the signal processing circuit 41 processes the signal input to the node N12 and inputs the processed signal to the ADC 42. In addition, in the seventh embodiment, the regulation amplifier REG1 may change the voltage of the node N12 to a desired voltage based on control of the voltage adjustment circuit 45. As described above, the voltage of the node N12 changed by the regulation amplifier REG1 can be sensed by the voltage adjustment circuit 35 of the light detector PDa.

The voltage adjustment circuit 45 has a function of causing the compensating circuit 44 to compensate for an output value of the ADC 42, and a function of changing the control value DAC1 for the regulation amplifier REG1 of the signal processing circuit 41. Specifically, the voltage adjustment circuit 45 supplies a compensation coefficient CV2 for compensating for an output value of the compensating circuit 44 to the compensating circuit 44, and supplies the control value DAC1 for adjusting the gate voltage of the N-type transistor NM10 to the signal processing circuit 41. The voltage adjustment circuit 45 may be regarded as a controller of the measurement section 40a (measurement IC).

The storage part 46 stores adjusting value tables 100 and 200. The adjusting value table 200 shows a relationship among an operating environment (e.g., a magnitude of ambient light) of the distance measuring device 1, the control value DAC1 input to the regulation amplifier REG1, and the compensation coefficient CV2 input to the compensating circuit 44. The storage part 46 is, for example, used by the voltage adjustment circuit 45, and data stored in the storage part 46 is referred to by the voltage adjustment circuit 45.

For example, the voltage adjustment circuit 45 measures an intensity of ambient light based on an AD conversion result received from the ADC 42, i.e., an output result of the ADC 42. The intensity of ambient light is also used as a floor value in the averaging circuit (SAT) as described above. The voltage adjustment circuit 45 may obtain the compensated and averaged signal as the intensity of ambient light from the averaging circuit (SAT) instead of the AD conversion result. Then, the voltage adjustment circuit 45 determines the control value DAC1 of the regulation amplifier REG1 based on a measurement result of ambient light and the adjusting value table 100, and determines the voltage of the node N12. Further, the voltage adjustment circuit 45 determines the compensation coefficient CV2 to be supplied to the compensating circuit 44 based on the measurement result of ambient light and the adjusting value table 200. A timing at which the voltage adjustment circuit 45 adjusts the voltage of the node N12 is, for example, in accordance with a timing of a trigger signal TS2 output from the controller 10.

As described above, when the overdrive voltage Vov is adjusted in the output circuit OCc by the voltage adjustment circuit 35 of the light detector PDa, an output current from the light detector PDa changes. That output current is compensated for by the output circuit of the light detector PDa as described in the first modification of the first embodiment, and is further compensated for additionally in the measurement section 40a. Details of these operations will be described later.

(Configuration of Voltage Adjustment Circuit 35)

Figure 48:
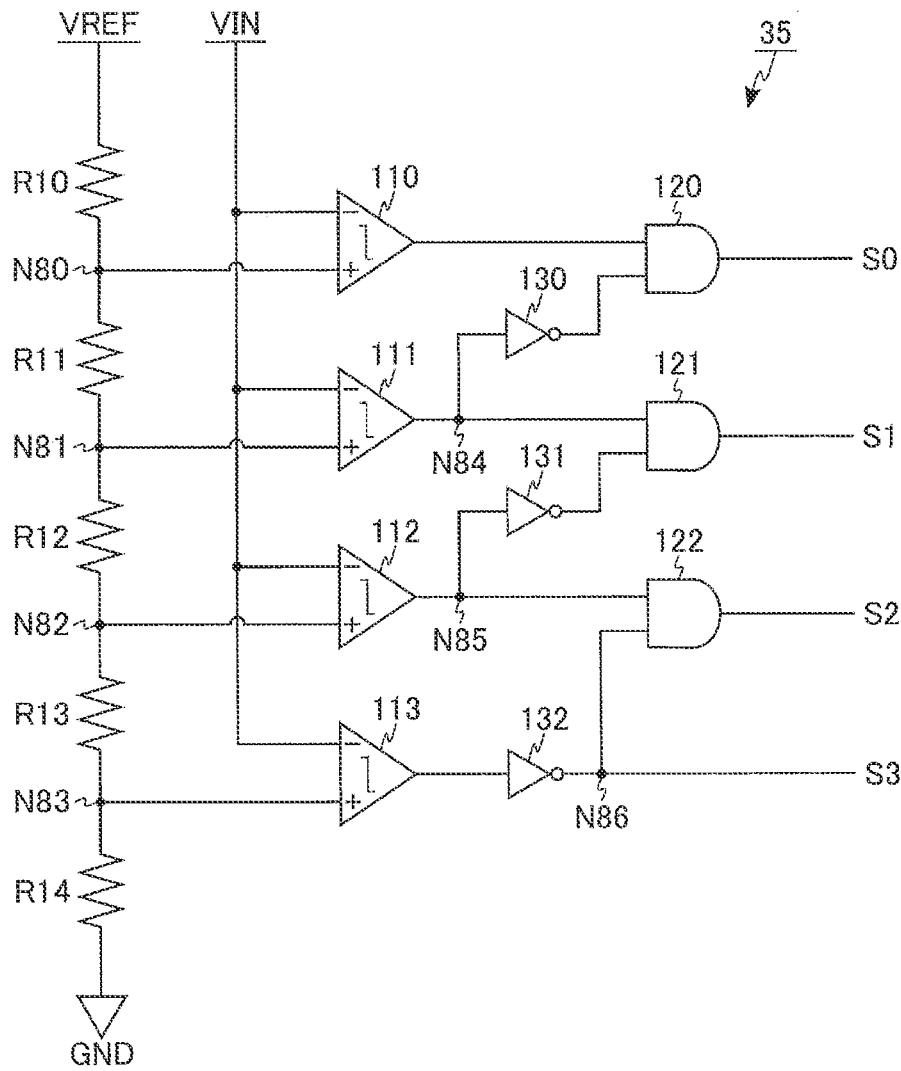
FIG. 48 depicts a circuit diagram showing an example of a circuit configuration of a voltage adjustment circuit included in a light detector included in the distance measuring device according to the seventh embodiment.

FIG. 48 depicts a circuit diagram showing an example of a circuit configuration of the voltage adjustment circuit 35 included in the light receiver 30 included in the distance measuring device 1 according to the seventh embodiment. As shown in FIG. 48, the voltage adjustment circuit 35 includes resistors R10 to R14, comparators 110 to 113, AND circuits 120 to 122, inverters 130 to 132, and nodes N80 to N86.

A reference voltage VREF is applied to one end of the resistor R10. The reference voltage VREF is, for example, set by the controller 10. The other end of the resistor R10 is coupled to the node N80. One end and the other end of the resistor R11 are coupled to the nodes N80 and N81, respectively. One end and the other end of the resistor R12 are coupled to the nodes N81 and N82, respectively. One end and the other end of the resistor R13 are coupled to the nodes N82 and N83, respectively. One end of the resistor R14 is coupled to the node N83. The other end of the resistor R14 is grounded (GND). A voltage of the node N80 is higher than that of the node N81. A voltage of the node N81 is higher than that of the node N82. A voltage of the node N82 is higher than that of the node N83.

An input voltage VIN is applied to a first input end (−) of each of the comparators 110, 111, 112, and 113. The input voltage VIN corresponds to the voltage of the node N12 shown in FIG. 47. The nodes N80 to N83 are coupled to second input ends (+) of the comparators 110, 111, 112, and 113, respectively. The comparator 110 outputs a signal of an "H" level when the voltage of the node N80 is higher than the input voltage VIN, and outputs a signal of an "L" level when the voltage of the node N80 is lower than the input voltage VIN. The comparator 111 outputs a signal of an "H" level when the voltage of the node N81 is higher than the input voltage VIN, and outputs a signal of an "L" level when the voltage of the node N81 is lower than the input voltage VIN. The comparator 112 outputs a signal of an "H" level when the voltage of the node N82 is higher than the input voltage VIN, and outputs a signal of an "L" level when the voltage of the node N82 is lower than the input voltage VIN. The comparator 113 outputs a signal of an "H" level when the voltage of the node N83 is higher than the input voltage VIN, and outputs a signal of an "L" level when the voltage of the node N83 is lower than the input voltage VIN.

An output end of the comparator 110 is coupled to a first input end of the AND circuit 120. An output of the comparator 111 is coupled to a first input end of the AND circuit 121 via the node N84. An input end of the inverter 130 is coupled to the node N84. An output end of the inverter 130 is coupled to a second input end of the AND circuit 120. An output end of the comparator 112 is coupled to a first input end of the AND circuit 122 via the node N85. An input end of the inverter 131 is coupled to the node N85. An output end of the inverter 131 is coupled to a second input end of the AND circuit 121. An output end of the comparator 113 is coupled to an input end of the inverter 132. An output end of the inverter 132 is coupled to a second input end of the AND circuit 122 via the node N86. The AND circuits 120, 121, and 122 output signals S0, S1, and S2, respectively. The inverter 132 outputs a signal S3.

In the above-described voltage adjustment circuit 35, a logic-level combination of the signals S0 to S3 output from the voltage adjustment circuit 35 changes according to the magnitude of the input voltage VIN. Thereby, the voltage adjustment circuit 35 can input a control signal according to a logic-level combination of the signals S0 to S3 to the SEL1 to SEL4 of the voltage drop circuit 60 within the output circuit OCc, or to the regulation amplifier REG. Such a voltage adjustment circuit 35 corresponds to a 2-bit flash-type AD converter from which an encoder portion is removed. The circuit configuration of the voltage adjustment circuit 35 can be appropriately changed according to a required performance.

Herein, an overall method of correcting an output value of the light detector PDa will be described. From the viewpoint of improving an S/N ratio, it is preferable to adjust an output current of the light detector PDa so that an analog circuit included in the measurement section 40a exhibits the best performance. Accordingly, for the output circuit OCc of the light detector PDa, the voltage adjustment circuit 35 determines an amplification factor so that the following formulae (1) and (2) are satisfied to compensate for an output value.

Maximum output current(direct current)≤input maximum current(specification)      (1)

Maximum output current(direct current)=Vov/quench resistor×number of SPAD×amplification factor      (2)

Since a current of the maximum output current (direct current) or more flows transiently, the voltage adjustment circuit 35 may set the amplification factor to a low value. By an amplification factor being set in this manner, the output signal of the light detector PDa is maximized, and an S/N ratio is improved. Here, the degree of compensation is roughly determined as a coefficient of compensation corresponding to ambient light so as to be proportional to the overdrive voltage Vov. For example, as shown in FIG. 50, the compensation coefficient can be stored in the adjusting value table 100 of the storage part 46, and is referred to by the voltage adjustment circuit 35. The contents of the storage part 46 are appropriately rewritten by the controller 10 based on an environmental parameter such as a temperature.

Figure 49:
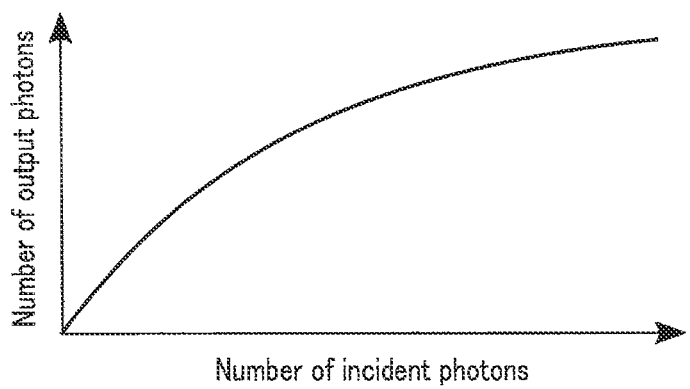
FIG. 49 depicts a waveform diagram showing a relationship between the number of incident photons and the number of output photons in an avalanche photodiode.

On the other hand, an electric current of a single SPAD changes basically in proportion to the overdrive voltage Vov as shown in FIG. 49. FIG. 49 shows a relationship between the number of incident photons and the number of output photons (the number of detected photons) in an SiPM. An output current of a pixel PX (SiPM) is generally the output current of the APD shown in FIG. 17 multiplied by the detection efficiency (PDE) shown in FIG. 16. However, as shown in FIG. 49, a relationship between the number of output photons and the number of incident photons is nonlinear in nature, based roughly on the formulae (1) and (2), due to the pile-up effect. In other words, a current characteristic of the avalanche photodiode APD is nonlinear.

Output current∝number of output photons×electric current per unit SPAD

Number of output photons=number of SPADs×{1−exp(−number of incident photons×PDE/number of SPADs)}

Compensation of an output value in the output circuit OCc can correspond to a change in electric current per unit SPAD proportional to the overdrive voltage Vov. On the other hand, the compensation of the output value in the output circuit OCc does not correspond to a nonlinear change in the number of output photons (including a nonlinear characteristic of the light detection efficiency PDE). Accordingly, in the seventh embodiment, the compensating circuit 44 and the voltage adjustment circuit 45 of the measurement section 40a perform a nonlinear compensation process to achieve an output basically proportional to an incident photon. Then, the SAT 43 performs an averaging process and peak detection based on this output, and calculates a distance to a target object TG. By the above-described compensation process, output levels among pixels PX are also homogenized.

The above description is a method assuming that the ADC 41 is used in the measurement section 40a, but a TDC may be used instead of the ADC. Also, when the TDC is used, a distance may be calculated in the same manner. In addition, when the TDC is used, a distance is measured based on a time of rising of a reflection signal (a signal based on the reflected light L2), not a peak of the reflection signal. Thus, an amplification factor in the output circuit OCc of the light detector PDa is preferably set so that ambient light does not exceed a threshold value of the TDC, instead of being set based on the above-described formulae.

(Configuration of Adjusting Value Table 100)

FIG. 50 depicts a schematic diagram showing an example of the adjusting value table 100 stored in the storage part 36 included in the light detector PD included in the distance measuring device 1 according to the seventh embodiment. As shown in FIG. 50, the adjusting value table 100 shows, for example, a relationship among an intensity of ambient light, a terminal voltage, and a voltage drop amount. In the present example, the intensity of ambient light is expressed by 64 stages from "0" to "63". The terminal voltage corresponds to the voltage of the node N12. In a case of the signal processing circuit 41 shown in FIG. 11, the voltage of the node N12 may be, for example, adjusted at 0.6 V±200 mV by the regulation amplifier REG1. In the present example, the voltage of the node N12 is adjusted to any one of 400 mV, 500 mV, 600 mV, and 700 mV according to the intensity of ambient light.

When the intensity of ambient light is "0" to "14", the terminal voltage is set to 400 mV, and the voltage drop is set to 0 stages. The voltage drop being "0 stages" corresponds to, for example, "no voltage drop". This corresponds to a case where the selection signal SEL1 input to the voltage drop circuit 60 is an "L" level.

When the intensity of ambient light is "15" to "24", the terminal voltage is set to 500 mV, and the voltage drop is set to 1 stage. The voltage drop being "1 stage" corresponds to, for example, "2.5 V drop". This corresponds to a case where the selection signal SEL2 input to the voltage drop circuit 60 is an "L" level.

When the intensity of ambient light is "25" to "46", the terminal voltage is set to 600 mV, and the voltage drop is set to 2 stages. The voltage drop being "2 stages" corresponds to, for example, "5 V drop". This corresponds to a case where the selection signal SEL3 input to the voltage drop circuit 60 is an "L" level.

When the intensity of ambient light is "47" to "63", the terminal voltage is set to 700 mV, and the voltage drop is set to 3 stages. In the present example, the intensity of ambient light "63" indicates the maximum measurable intensity of ambient light. The voltage drop being "3 stages" corresponds to, for example, "7.5 V drop". This corresponds to a case where the selection signal SEL4 input to the voltage drop circuit 60 is an "L" level.

In the above descriptions, a case in which the adjusting value table 100 is included in the storage part 36 of the light detector PD and the storage part 46 of the measurement section 40 (measurement IC) has been exemplified, but the present invention is not limited thereto. The adjusting value table 100 may be stored in the controller 10. It suffices that the contents of the adjusting value table 100 are stored in at least any one of the controller 10, the light detector PD, and the measurement section 40.

(Configuration of Adjusting Value Table 200)

FIG. 51 depicts a schematic diagram showing an example of the adjusting value table 200 stored in the storage part 46 included in the measurement section 40 included in the distance measuring device 1 according to the seventh embodiment. FIG. 51 shows a correspondence between values before and after compensation of an output of the ADC 42. When the value before compensation is an intermediate value that is not present in the adjusting value table 200, the voltage adjustment circuit 45 uses, for example, a digital value corresponding to the intermediate value as a compensation coefficient CV2 based on a function calculated by linear interpolation and rounding. In the present example, it is assumed that the value before compensation takes a value from "0" to "63". On the other hand, the corrected value does not have to be within the range of "0" to "63", and the number of digits is not limited.

[7-2] Operation of Distance Measuring Device 1

Figure 52:
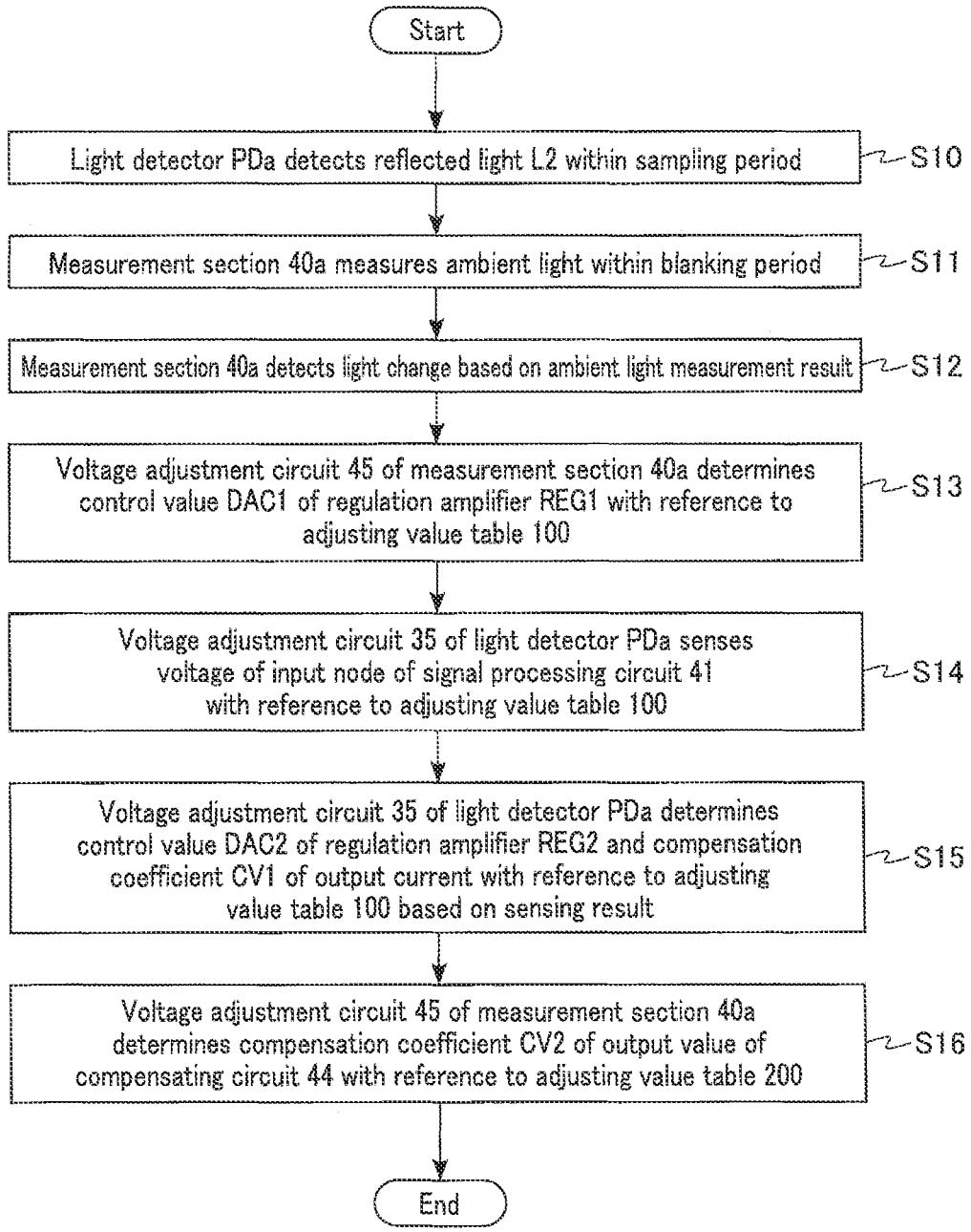
FIG. 52 depicts a flowchart showing an example of one cycle of processing at the time of ranging of the distance measuring device according to the seventh embodiment.

FIG. 52 depicts a flowchart showing an example of one cycle of processing at the time of ranging of the distance measuring device 1 according to the seventh embodiment. As shown in FIG. 52, the distance measuring device 1 may perform processes of steps S10 to S16 in one cycle of processing at the time of ranging.

In the process of step S10, the light detector PDa detects reflected light L2 within a sampling period. The sampling period is a measurement period set for each outgoing light L1 that the distance measuring device 1 uses for ranging. The measurement section 40 measures a distance between the distance measuring device 1 and the target object TG based on the reflected light L2 detected during the sampling period.

In the process of step S11, the measurement section 40a measures ambient light within a blanking period. The blanking period is a period set between consecutive sampling periods, and is not used for ranging. In the blanking period, a non-selected pixel PX may be set to an active state. As a measurement result of ambient light, for example, an accumulation value, or an average value, of optical signals detected in the blanking period is used. In a measurement result of ambient light, since a power of ambient light is usually significantly larger than that of the reflected light L2 during daylight in which pile-up can be a problem, an influence of the reflected light L2 may be ignored. Accordingly, a measurement result of an optical signal detected during the sampling period may be used, or measurement results of both the sampling period and the blanking period may be used.

In the process of step S12, the measurement section 40a detects a change in light based on the measurement result of ambient light. Specifically, the controller (e.g., the voltage adjustment circuit 45) of the measurement section 40a detects whether or not a measurement result of ambient light calculated in a previous blanking period changes from a measurement result of ambient light calculated most recently. When no change in light is detected, the processes of steps S13 to S15 to be described later may be omitted. As a determination criterion of a change in light, for example, whether or not a change amount of ambient light exceeds a predetermined value may be used. For example, when assuming that the intensity of ambient light is expressed by 64 stages from "0" to "63", the intensity of ambient light is classified into 4 stages according to the adjusting value table 100 shown in FIG. 50. When sensing that a classification result of the intensity of ambient light changes, the voltage adjustment circuit 45 of the measurement section 40a changes the compensation coefficient CV2 to be input to the compensating circuit 44.

In the process of step S13, the voltage adjustment circuit 45 of the measurement section 40a changes an input of a DAC, description of which is omitted, with reference to the adjusting value table 100, and determines the control value DAC1 of the regulation amplifier REG1. That is, the voltage adjustment circuit 45 changes the control value DAC1 to be supplied to the regulation amplifier REG1 by using the DAC corresponding to the measurement result of ambient light calculated in step S11 from the adjusting value table 100. The voltage of the input node (i.e., the node N12) of the signal processing circuit 41 then changes to a voltage according to the terminal voltage of the adjusting value table 100. In the column of the terminal voltage in FIG. 50, voltage values such as 400 mV are noted for clarity of description, but in reality, values of the DAC1 may be stored in this column, or this column may be omitted.

In the process of step S14, the voltage adjustment circuit 35 of the light detector PDa senses the voltage of the input node (i.e., the node N12) of the signal processing circuit 41. Sensing of a voltage by the voltage adjustment circuit 35 corresponds to processing of the flash-type AD converter described using FIG. 48. The processes of step S14 and the subsequent steps start based on a trigger signal to be described later, and a set voltage value, etc. will be maintained during the next measurement period.

In the process of step S15, the voltage adjustment circuit 35 of the light detector PDa determines the selection signal SEL of the voltage drop circuit 60 and the control value DAC2 of the regulation amplifier REG2 based on a sensing result. That is, the voltage adjustment circuit 35 changes the voltage of the control value DAC2 to a voltage associated with a digital value converted from the voltage value (analog value) of the node N12. Determination of the selection signal and the control value DAC2 with respect to the voltage value of the node N12 is based on the adjusting value table 100. Then, the output current of the output circuit OCc of the light detector PDa is compensated for based on the adjusting value table 100. That is, the compensation coefficient CV1 of the output current is determined.

In the process of step S16, the voltage adjustment circuit 45 of the measurement section 40a performs linear interpolation with reference to the adjusting value table 200 to compensate for the output value of the ADC 42. Specifically, the voltage adjustment circuit 45 determines the compensation coefficient CV2 of the output value of the compensation circuit 44, and the compensation circuit 44 compensates for the output value of the ADC 42. As a result, the output level of the ADC 42 is made uniform among the pixels PX, and the non-linearity of the output level is corrected.

Figure 53:
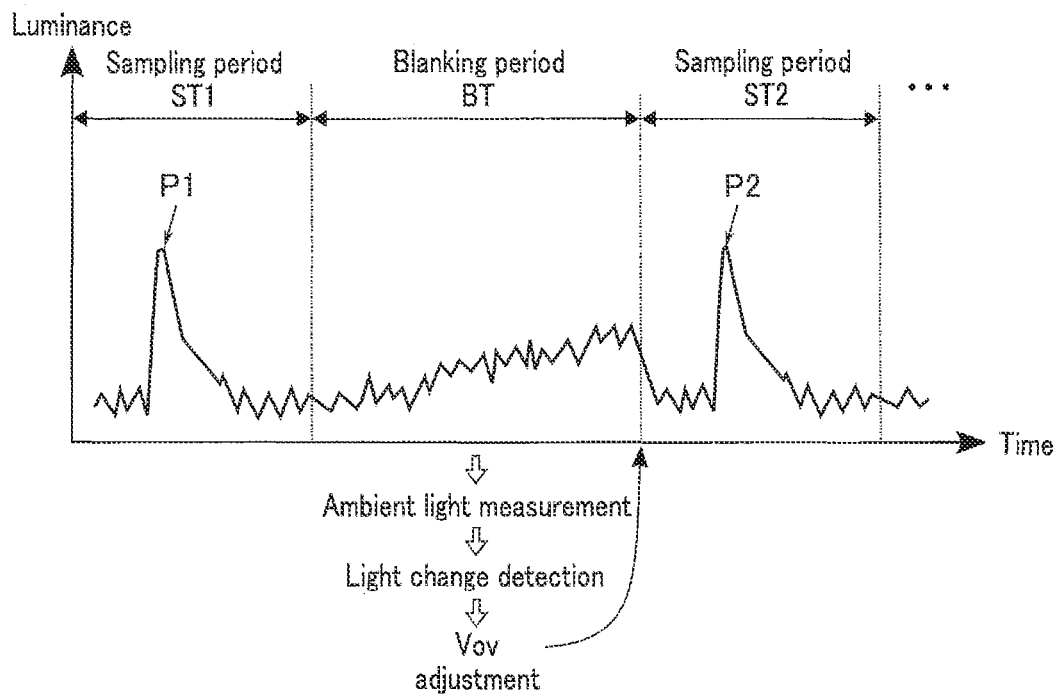
FIG. 53 depicts a waveform diagram schematically showing an example of an output signal of a signal processor included in the measurement section included in the distance measuring device according to the seventh embodiment.

FIG. 53 depicts a waveform diagram schematically showing an example of the output signal of the signal processing circuit 41 included in the measurement section 40a included in the distance measuring device 1 according to the seventh embodiment. FIG. 53 shows peaks based on reflected light L2 in two consecutive sampling periods ST1 and ST2. A blanking period BT is set between the sampling periods ST1 and ST2.

As shown in FIG. 53, first, a peak P1 is detected in the sampling period ST1, and a distance value based on the peak P1 is calculated. The ambient light is measured during the blanking period BT (step S11). Then, the light change is detected (step S12). Then, the controller 10 generates a trigger signal, and the voltage adjustment circuit 35 senses a terminal voltage based on a timing of the trigger signal, controls the output circuit OCc, and adjusts (changes) the overdrive voltage Vov (steps S13 to S15). Then, in the sampling period ST2, a noise level of the ambient light is lowered, and a range of the output in which the peak of the reflected light L2 can be detected is expanded. Then, in the sampling period ST2, the peak P2 is detected, and a distance value based on the peak P2 is calculated. As described above, the distance measuring device 1 according to the seventh embodiment can improve an S/N ratio of the peak P2 in the sampling period ST2.

[7-3] Advantageous Effect of Seventh Embodiment

As described above, the distance measuring device 1 according to the seventh embodiment has a means for the measurement section 40a to detect the output magnitude of the light detector PD (measurement of ambient light), a means for the measurement section 40a to determine a bias voltage based on the output magnitude, a means for the measurement section 40a to transmit the bias voltage setting to the light detector PD, and a means for the light receiver 30 to slightly change an electric potential of the output terminal of the light detector PD. The output signal line (output channel OUT_CH) of the light detector PD also serves as a signal line for the measurement section 40a to transmit the bias voltage setting to the light detector PD.

Figure 54:
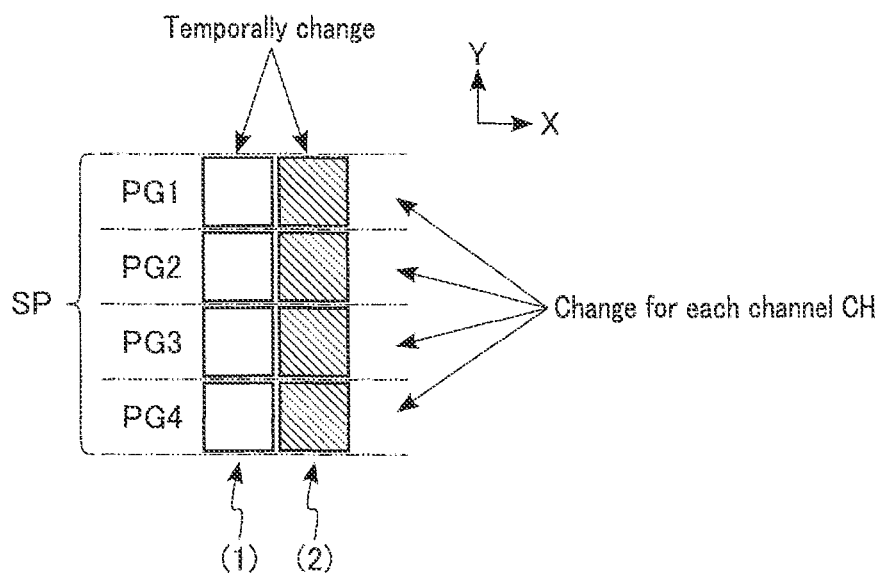
FIG. 54 depicts a schematic diagram showing an example of a changing method of an overdrive voltage in the distance measuring device according to the seventh embodiment.

FIG. 54 depicts a schematic diagram showing an example of a method of changing the overdrive voltage Vov in the distance measuring device 1 according to the seventh embodiment. FIG. 54 (1) and (2) show active areas set respectively corresponding to two consecutive outgoing lights L1. As shown in FIG. 54, in the distance measuring device 1 according to the seventh embodiment, the voltage adjustment circuit 35 can change and optimize the overdrive voltage Vov for each channel CH of the scanning part SP. Further, in the distance measuring device 1 according to the seventh embodiment, the state of the ambient light is measured for each blanking period, and the signal processing circuit 41 changes the node N12 to a desired voltage, whereby an optimal overdrive voltage Vov adjustment value can be transmitted to the voltage adjustment circuit 35.

That is, the distance measuring device 1 according to the seventh embodiment can change and optimize the overdrive voltage Vov for each reflected light L2, that is, temporally. The intensities of the reflected light of the laser and the ambient light incident on the light detector PD depend on the reflectance and the angle of the object TG, the intensity and the direction of the ambient light, etc., and vary greatly for each pixel PX. With a uniform overdrive voltage Vov setting, the specifications of the analog circuit of the measurement section 40 cannot be utilized, and the level of the output signal of the light detector PD may decrease and the S/N ratio may deteriorate. On the other hand, a pixel PX that piles up (a pixel PX with excessive sensitivity) may also occur. By the distance measuring device 1 according to the seventh embodiment, the overdrive voltage Vov is set optimally for each pixel PX (e.g., so that the range in which reflected light can be detected is maximized) and the output current is optimized for the analog circuit of the measurement section 40, whereby the S/N ratio can be improved. In other words, the distance measuring device 1 according to the seventh embodiment can realize an HDR function in pixel PX units.

As described above, the distance measuring device 1 according to the seventh embodiment can set an appropriate overdrive voltage Vov for each channel according to the magnitude of the ambient light, and can improve the characteristics of the light detector PD.

Further, in the distance measuring device 1 according to the seventh embodiment, the overdrive voltage Vov is adjusted for each pixel PX, so that the output current for the same light detection may differ between the pixels PX. On the other hand, when the measurement section 40a compensates for the output value (the magnitude of the output current), the output value is appropriately corrected and the difference between the pixels PX is eliminated. As a result, the output level between the pixels PX is uniformly maintained, so that the distance measuring device 1 according to the seventh embodiment can perform correct measurement. At the same time, the distance measuring device 1 according to the seventh embodiment can also correct the non-linearity based on pile-up. For example, when the technique of averaging by the SAT 43 is used, uniformity of the output level is a necessary condition, and high linearity is preferable. The distance measuring device 1 according to the seventh embodiment can satisfy the conditions for using the SAT 43 and can prevent erroneous ranging.

Further, since the number of output signal lines (output channel OUT_CH) of the light detector PDa is usually several tens as the resolution is increased, the difficulty of mounting on the board becomes high. It is in practice difficult to increase the number of signal lines significantly more than this. However, in the distance measuring device 1 according to the seventh embodiment, the output signal line (output channel OUT_CH) of the light detector PDa and the signal line for the measurement section 40a to transmit the bias voltage setting to the light detector PD are both used. Therefore, the distance measuring device 1 according to the seventh embodiment can reduce the number of interconnects required for controlling the control value DAC2 of the output circuit OCc, and can suppress the difficulty of board mounting from becoming high due to the increase in the number of signal lines.

The configuration and operation of the seventh embodiment may be combined with the modification of the fourth embodiment. As a result, the distance measuring device 1 can control the overdrive voltage Vov more finely. Further, the configuration and operation of the seventh embodiment may be combined with each of the first to third embodiments and the fifth to eighth embodiments. When the seventh embodiment and the first embodiment are combined, the voltage adjustment circuit 35 is formed to be able to select the selection signal SEL of the voltage drop circuit 60. When the seventh embodiment and the fifth embodiment are combined, the voltage adjustment circuit 35 is formed to be able to control the gate voltage VN9 of the N-type transistor NM included in the discharge circuit 65.

[7-4] Modification of Seventh Embodiment

In the seventh embodiment, the case in which the distance measuring device 1 uses the non-coaxial optical system shown in FIG. 3 and the two-dimensional sensor shown in FIGS. 5 to 8 is exemplified. Further, the two-dimensional sensor has a configuration in which an effective pixel PX is selected to be coupled to the output circuit OC. On the other hand, in the modification of the seventh embodiment, a coaxial optical system is used.

FIG. 55 depicts a schematic diagram showing an example of configurations of an emission section 20a and a light receiver 30b included in a distance measuring device 1a according to the modification of the seventh embodiment. As shown in FIG. 55, an optical system 24a of the emission section 20a includes, for example, a beam splitter BS. The light receiver 30b includes an optical system 31a and a light detector PDb. The light detector PDb includes a pixel array 32b, an output stage 33b, and a controller 34a.

The beam splitter BS is arranged between the light source 23 and the mirror 25. The outgoing light L1 emitted from the light source 23 passes through the beam splitter BS and is applied to the mirror 25. The reflected light L2 reflected from the scanning area SA is applied to the beam splitter BS through the mirror 25, and the beam splitter BS causes the reflected light L2 to enter the light receiver 30b.

The optical system 31a may include a plurality of lenses and optical elements. The optical system 31a guides the reflected light L2 incident from the beam splitter BS to the pixel array 32b. The pixel array 32b is a linear sensor (1D sensor) in which pixels PX are integrated on a one-dimensional array. The output stage 33b converts an electric signal transferred from the pixel array 32b into a digital signal, and outputs the digital signal corresponding to a light reception result to the measurement section 40. The controller 34 controls an overall operation of the light detector PDb based on control of the controller 10. In FIG. 55, a case in which the beam splitter BS is used is exemplified, but in the emission section 20, the outgoing light L1 and the reflected light L2 may be designed to hit different parts from each other on the mirror surface of the mirror 25 without using the beam splitter BS (a separation optical system). Alternatively, the distance measuring device 1 may adapt a rotation method in which an emission section and a light receiver are rotated in the same direction.

FIG. 56 depicts a plan view showing an example of a configuration of the light detector PDb included in the distance measuring device 1a according to the modification of the seventh embodiment. As shown in FIG. 56, the pixel array 32b includes, for example, pixels PX1 to PX4 arranged one-dimensionally. Each pixel PX is composed of a plurality of avalanche photodiodes APD (SPAD). An output of each pixel PX has a configuration in which the outputs of the plurality of avalanche photodiodes APDs are connected and output currents of the plurality of avalanche photodiodes APDs are added. The outputs (nodes N_CH1 to N_CH4) of the pixels PX1 to PX4 are coupled to output circuits OC1 to OC4 of the output stage 33b, respectively.

Although not shown in FIG. 56, outputs of respective SPAD rows of each pixel (e.g., PX1) may be connected and coupled to an output node (e.g., N_CH1) of the pixel via a switch transistor. When this switch transistor is a P-type MOS transistor, a corresponding SPAD row can be selected by applying a low voltage (an "L" level voltage) to the gate of the switch transistor, and the corresponding SPAD row can be unselected by applying a high voltage (an "H" level voltage) to the gate of the switch transistor. The distance measuring device 1a selects only a SPAD row that is actually irradiated with light while not selecting a SPAD row that is not irradiated with light, thereby reducing ambient light noise and improving an S/N ratio of the signal. Herein, each SPAD row may be regarded as a small pixel.

The distance measuring device 1a using the coaxial optical system can be designed so that the reflected light L2 is applied to the sensor surface of the linear sensor (pixel array 32b) even when the direction of a laser light is changed due to scanning of the laser light. Thus, in the distance measuring device 1a, it is not necessary to select a pixel PX that receives light, so that each pixel PX of the linear sensor is coupled to the output stage 33b. The rest of the configuration of the distance measuring device 1a according to the modification of the seventh embodiment is the same as that of the seventh embodiment.

The distance measuring device 1a according to the modification of the seventh embodiment described above can basically obtain the same effect as that of the seventh embodiment. In general, a linear sensor may be designed to have a larger number of SPADs per pixel PX than a two-dimensional sensor. As described above, when the output current of the linear sensor becomes large, it is preferable to use the discharge circuit 65 as shown in FIGS. 37 to 39.

[8] Eighth Embodiment

A distance measuring device 1 according to an eighth embodiment has a configuration different from that of the first embodiment, and selects pixels PX arranged in the row direction. In the following, differences between the distance measuring device 1 according to the eighth embodiment and the distance measuring device 1 according to the first embodiment will be described.

[8-1] Configuration of Light Receiver 30

FIG. 57 depicts a circuit diagram showing an example of a coupling relationship between the pixel array 32 of the light receiver 30 and an output stage 33c included in the distance measuring device 1 according to the eighth embodiment. As shown in FIG. 57, in the eighth embodiment, a channel bonded part CBb is omitted from between the pixel array 32 and the output stage 33c, and is provided after the output stage 33c. The output stage 33c of the eighth embodiment includes a plurality of output circuit sets OCS1 to OCS4 and nodes N_CH1a to N_CH4a. The channel bonded part CBb includes the nodes N_CH1a to N_CH4a.

The output circuit sets OCS1 to OCS4 of the output stage 33c are provided corresponding to the scanning parts SP1 to SP4 of the pixel array 32, respectively. Each of the output circuit sets OCS1 to OCS4 includes output circuits OC1 to OC4.

Each output circuit OC of each output circuit set OCS is coupled to an output node OUT of a pixel group PG of an associated scanning part SP. Specifically, the output nodes SP1_OUT1 to SP1_OUT4 of the scanning part SP1 are coupled to the output circuits OC1 to OC4 of the output circuit set OCS1, respectively. The output nodes SP2_OUT1 to SP2_OUT4 of the scanning part SP2 are coupled to the output circuits OC1 to OC4 of the output circuit set OCS2, respectively. The output nodes SP3_OUT1 to SP3_OUT4 of the scanning part SP3 are coupled to the output circuits OC1 to OC4 of the output circuit set OCS3, respectively. The output nodes SP4_OUT1 to SP4_OUT4 of the scanning part SP4 are coupled to the output circuits OC1 to OC4 of the output circuit set OCS4, respectively.

The output circuit OC1 of each of the output circuit sets OCS1 to OCS4 adjusts a signal level of a signal output from the associated pixel group PG and outputs the signal to the node N_CH1a. The output circuit OC2 of each of the output circuit sets OCS1 to OCS4 adjusts a signal level of a signal output from the associated pixel group PG and outputs the signal to the node N_CH2a. The output circuit OC3 of each of the output circuit sets OCS1 to OCS4 adjusts a signal level of a signal output from the associated pixel group PG and outputs the signal to the node N_CH3a. The output circuit OC4 of each of the output circuit sets OCS1 to OCS4 adjusts a signal level of a signal output from the associated pixel group PG and outputs the signal to the node N_CH4a. The nodes N_CH1a to N_CH4a are coupled to the output channels OUT_CH1 to OUT_CH4, respectively.

As described above, in the eighth embodiment, the output stage 33c includes the plurality of output circuits OC respectively corresponding to the plurality of pixel groups PG included in the pixel array 32. Then, the channel bonded part CBb provided after the output stage 33c couples the signals output from the plurality of scanning parts SP for each channel. In other words, in the eighth embodiment, the signal coupling for each channel is performed after the signal processing by the output circuit OC. Thereby, the light receiver 30 in the eighth embodiment can have the same number of output terminals as in the first embodiment.

(Configurations of APD Units 51A and 51B and Selection Circuit 52a)

FIG. 58 depicts a circuit diagram showing an example of circuit configurations of the APD units 51A and 51B and a selection circuit 52a included in a pixel PX included in the pixel array 32 in the distance measuring device 1 according to the eighth embodiment. As shown in FIG. 58, the pixel PX of the eighth embodiment includes the selection circuit 52a which is different from the pixel PX of the first embodiment.

The selection circuit 52a has a configuration in which the P-type transistor PM1 is omitted from the selection circuit 52 of the first embodiment. In the selection circuit 52a, the drain of the P-type transistor PM0 is coupled to the output node OUT. Thus, the selection circuit 52a has only a configuration (P-type transistor PM0) capable of electrically coupling and decoupling an avalanche photodiode APD and the output node OUT based on a column selection signal.

(Configuration of Output Circuit OC)

FIG. 59 depicts a block diagram showing an example of a configuration of an output circuit OCf included in the output stage 33c in the distance measuring device 1 according to the eighth embodiment. An output circuit OCf(m) is associated with the row selection line RSL(m) (m is an integer of 0 or more). As shown in FIG. 59, the output circuit OCf(m) of the eighth embodiment includes a voltage drop circuit 60a and the current source 61. Then, the row selection line RSL(m) is coupled to the voltage drop circuit 60a of the output circuit OC(m).

The voltage drop circuit 60a puts that output circuit OC into an active state or an inactive state based on a signal input to the row selection line RSL. The output circuit OC in the active state processes a signal input from the pixel array 32, and outputs the signal to the output channel OUT_CH. The output circuit OC in the inactive state cuts off the signal by using the voltage drop circuit 60a, and suppresses the output of the signal to the output channel OUT_CH. Specifically, the controller 34 operates the voltage drop circuit 60 of the non-selected output circuit OCf so as to drop the voltage to the lowest potential.

Alternatively, the voltage drop circuit 60a may further include a P-type transistor coupled between the output node VDOUT and the node N27, and the row selection line RSL(m) may be coupled to the gate of that P-type transistor. Even in such a case, the controller 34 can electrically cut off the connection between the node N_CH and the output node VDOUT by controlling that P-type transistor to be in an OFF state, and cut off the signal of the output circuit OC. In this case, the row selection line RSL(m) is assumed to be used by a negative logic. The rest of the configuration of the distance measuring device 1 according to the eighth embodiment is the same as that of the first embodiment.

[8-2] Advantageous Effect of Eighth Embodiment

As described above, the distance measuring device 1 according to the eighth embodiment includes an equal number of output circuits OCf to that of rows of the pixels PX arranged in a matrix. Then, the row selection line RSL is coupled for each output circuit OCf, and the controller 10 selects a row using the output circuit OC provided for each pixel group PG.

As a result, the measurement section 40 can receive an output of each channel for each scanning part SP as in the first embodiment. Unlike the first embodiment, the light detector PD according to the eighth embodiment does not have a channel bonded part CB between the pixel array 32 and the output stage 33, so that a parasitic capacitance is reduced as compared with the first embodiment, and signal bluntness due to that parasitic capacitance and band deterioration can be alleviated.

Further, the pixel PX in the eighth embodiment has a smaller number of transistors than in the first embodiment.

Thus, the light detector PD according to the eighth embodiment can make the size of the pixel PX smaller than that of the pixel PX of the first embodiment, and reduce a region (insensible region) having no light sensitivity in the pixel array 32. Therefore, in the light detector PD according to the eighth embodiment, the sensitivity may be improved. The configuration described in the eighth embodiment may be combined with any one of the first to eighth embodiments.

[9] Others

The controller 10 may set the overdrive voltage Vov to zero when a laser beam (outgoing light L1) is emitted, and immediately after that, change the overdrive voltage Vov to a proper value (a value optimized for ranging). In this case, a stray light (a part of the laser light which passes through some path in the distance measuring device 1 and is detected by the light detector) generated when the laser light is emitted can be removed from the output of the light detector PD. That is, the distance measuring device 1 can suppress erroneous detection of reflected light L2 due to the stray light, and improve reliability of a light detection result.

The distance measuring device 1 may perform a plurality of measurements by changing the overdrive voltage Vov. The distance measuring device 1 can expand the dynamic range by integrating (averaging) a plurality of measurement results. The distance measuring device 1 can expand the dynamic range without degrading the resolution, in particular, by performing the averaging by the SAT 43 described in the first embodiment. The measurement method in which the dynamic range is expanded in this way may be realized by changing the amount of light of the laser light (outgoing light L1). On the other hand, when the overdrive voltage Vov is changed by the output circuit OC, it is further possible to set an optimal overdrive voltage Vov for each pixel PX.

Each of the power supply nodes VDD, VSS, and VSS2 used in the distance measuring device 1 does not necessarily have to have the same electric potential. The VDD used in the light detector PD and the VDD used in the measurement section 40 may be different, and the VSS used in the light detector PD and the VSS used in the measurement section 40 may be different. Further, the voltage of each of the power supply nodes VDD, VSS and VSS2 may be changed for each circuit used. For example, by setting an appropriate VSS for each circuit, operational stability of the circuit used in the distance measuring device 1 can be improved.

In the above embodiments, a case in which the controller 10 reports the emission time T1 of the outgoing light L1 to the measurement section 40 is exemplified, but the configuration is not limited thereto. The emission time T1 may be set based on a time at which the outgoing light L1 is dispersed within the emission section 20 and the dispersed outgoing light L1 is detected by a sensor provided in the light receiver 30. In this case, the emission time T1 is reported from the light receiver 30 to the measurement section 40.

In the above-described embodiments, a case in which the overdrive voltage Vov of the 2D_SiPM is adjusted is exemplified, but the configuration is not limited thereto. The configuration for adjusting the overdrive voltage Vov described in the above embodiments may be used for the 1D_SiPM. In such a case as well, an effective dynamic range can be expanded and the characteristics of the light detector can be improved.

Each of the current sources 61a and 61b, which can make the output current of the light detector PD variable as described in the first modification and the second modification of the first embodiment, does not necessarily have to be combined with a configuration for adjusting the overdrive voltage Vov. That is, the voltage drop circuit 60 may be omitted from the output circuit OC, and only the current sources 61a and 61b may be respectively used. Further, the configuration of each of the current sources 61a and 61b may be combined with any one of the second to eighth embodiments.

The category of each configuration of the distance measuring device 1 may be other categories. The measurement section 40 may be other categories as long as it can realize the operations described in the above embodiments. The CPU included in the controller 10 may be other circuits. For example, in place of the CPU, a micro processing unit (MPU), etc. may be used. In addition, each of the processing described in each embodiment may be realized by dedicated hardware. Processing executed by software and processing executed by hardware may be mixed, or either one of them may exist. The controllers 10 and 34 and the voltage adjustment circuits 35 and 45 may be referred to as control circuits. The measurement section 40 may be referred to as a measurement circuit. In each embodiment, in the flowchart used for describing the operations, the order of processes may be interchanged to the extent possible, and other processes may be added.

In the present specification, the "active area" may be referred to as a light-receiving area. The outgoing light L1 emitted by the light source 23 into which a pulse signal is input based on control of the controller 10 may be referred to as a pulse signal. An "H" level voltage is a voltage at which an N-type transistor enters an ON state when that voltage is applied to its gate, and a P-type transistor enters an OFF state when that voltage is applied to its gate. An "L" level voltage is a voltage at which an N-type transistor enters an OFF state when that voltage is applied to its gate, and a P-type transistor enters an ON state when that voltage is applied to its gate. Each of the "L" level and the "H" level may be expressed as a logic level. "Two-dimensionally arranged avalanche photodiodes APD" may include at least a plurality of avalanche photodiodes arranged in the column direction and a plurality of avalanche photodiodes arranged in the row direction. A "selected pixel PX" corresponds to a pixel PX in an active state.

In the present specification, the term "couple" refers to electrical coupling, and does not exclude, for example, intervention of another element. An "upper surface" corresponds to a surface on a side where a circuit element is formed in a semiconductor substrate SUB, and corresponds to a surface on a side far from the semiconductor substrate SUB in other configurations. An "ON state" refers to a state in which the gate of a relevant transistor has a voltage equal to or greater than a threshold voltage of that transistor being applied. An "OFF state" refers to a state in which the gate of a relevant transistor has a voltage below a threshold voltage of that transistor being applied, and does not exclude, for example, a state in which a minute electric current such as a leakage current of the transistor flows. A "current path of a transistor" corresponds to a channel of the transistor. Each of "one end and the other end of a current path of a transistor" and "one end and the other end of a transistor" corresponds to the drain or source of the transistor. A "pixel PX" may be referred to as a sensor circuit. An "avalanche photodiode APD" may be referred to as a sensor. A "diode DI" may be referred to as a rectifying diode.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A light detector comprising:
   a plurality of first pixels each including an avalanche photodiode;
   a plurality of first selection circuits respectively coupled to the first pixels, the first selection circuits being configured to output a signal output from a first pixel selected from the first pixels to a first node; and
   a first output circuit coupled to the first node, the first output circuit being configured to apply a first operating voltage to the avalanche photodiode included in the selected first pixel via a first selection circuit of the first selection circuits that is coupled to the selected first pixel, output an electric current based on the signal output from the selected first pixel to a second node, and change the first operating voltage.

2. The light detector of claim 1, wherein
   the first output circuit includes a current source configured to change an amplification factor, the current source being coupled between the first node and the second node and being configured to output an electric current amplified based on the electric current output from the selected first pixel to the second node.

3. The light detector of claim 1, wherein
   the first output circuit includes a voltage drop circuit coupled to the first node, and
   the voltage drop circuit changes a drop amount of a voltage of the first node based on a selection signal.

4. The light detector of claim 3, wherein
   the first output circuit includes a current source coupled between an output of the voltage drop circuit and the second node, the current source being configured to output an electric current amplified based on an electric current output from the voltage drop circuit to the second node.

5. The light detector of claim 3, wherein
   the first output circuit includes an input stage and a current source, the input stage being coupled to an output of the voltage drop circuit and including a N-type transistor, the output of the voltage drop circuit being coupled to a source of the N-type transistor, a drain of the N-type transistor being coupled to the current source, and the current source being coupled between the input stage and the second node and being configured to output an electric current amplified based on an electric current input from the input stage to the second node.

6. The light detector of claim 5, wherein
   the first output circuit further includes an amplifier configured to change a gate voltage of the N-type transistor included in the input stage based on a voltage of the output of the voltage drop circuit.

7. The light detector of claim 3, wherein
   the first output circuit includes an input stage and a current source, the input stage being coupled between the first node and the voltage drop circuit and including a N-type transistor, an output of the voltage drop circuit being coupled to a source of the N-type transistor, a drain of the N-type transistor being coupled to the current source, and the current source being coupled between the input stage and the second node and being configured to output an electric current amplified based on an electric current input from the input stage to the second node.

8. The light detector of claim 3, further comprising a voltage adjustment circuit configured to cause the first output circuit to adjust the first operating voltage based on a voltage of the second node.

9. The light detector of claim 3, wherein
the first output circuit further includes a transistor coupled between the second node and a low voltage node.

10. The light detector of claim 3, wherein
the first output circuit includes a current source coupled between an output of the voltage drop circuit and the second node, the current source being configured to output an electric current obtained by amplifying and inverting an electric current output from the voltage drop circuit to the second node.

11. The light detector of claim 1, further comprising:
a plurality of second pixels provided in a row different from the first pixels, each of the second pixels including an avalanche photodiode;
a plurality of second selection circuits respectively coupled to the second pixels, the second selection circuits being configured to output a signal output from a second pixel selected from the second pixels to the first node;
a first row selection line coupled to the first selection circuits; and
a second row selection line coupled to the second selection circuits.

12. The light detector of claim 1, further comprising:
a plurality of second pixels provided in a row different from the first pixels, each of the second pixels including an avalanche photodiode;
a plurality of second selection circuits respectively coupled to the second pixels, the second selection circuits being configured to output a signal output from a second pixel selected from the second pixels to a third node;
a second output circuit coupled to the third node, the second output circuit being configured to apply a second operating voltage to the avalanche photodiode included in the selected second pixel via a second selection circuit of the second selection circuits that is coupled to the selected second pixel, output an electric current based on the signal output from the selected second pixel to the second node, and change the second operating voltage;
a first row selection line coupled to the first output circuit; and
a second row selection line coupled to the second output circuit.

13. A distance measuring device comprising:
a light detector including a plurality of a pixels including an avalanche photodiode, the light detector being configured to apply a first operating voltage to the avalanche photodiode, and change the first operating voltage;
a light emitter including a light source configured to emit an optical signal;
a measurement section configured to detect reflected light of the optical signal based on a signal input to the second node, the measurement section being configured to calculate a distance value using a first time and a second time, the first time being a time at which the light source emits the optical signal, and the second time being a time at which the measurement section detects the reflected light; and
a controller configured to cause the light source to intermittently emit the optical signal, cause the light emitter to perform scanning using the optical signal, set a light-receiving area in which at least one first pixel is selected from the first pixels for each intermittently emitted optical signal, and cause the first output circuit to change the first operating voltage based on a magnitude of an output of the light detector.

14. The distance measuring device of claim 13, wherein
the intermittently emitted optical signal includes a first optical signal and a second optical signal emitted subsequently to the first optical signal, and
the controller sets a first period associated with the first optical signal and a second period associated with the second optical signal, and applies setting of the first operating voltage based on the magnitude of the output of the light detector in the first period to the first output circuit in the second period.

15. The distance measuring device of claim 14, wherein
the controller is configured to detect a magnitude of an output of the optical signal based on a result of temporally accumulating the magnitude of the output of the light detector.

16. The distance measuring device of claim 14, wherein
the light detector further comprises a voltage adjustment circuit configured to cause the first output circuit to change a magnitude of the first operating voltage based on a voltage of the second node, and the measurement section is configured to change the voltage of the second node.

17. The distance measuring device of claim 16, wherein
the voltage adjustment circuit is configured to cause the first output circuit to change the magnitude of the first operating voltage based on a trigger signal,
the first period includes a sampling period for detecting the first optical signal and a blanking period after the sampling period, and
the controller is configured to change the voltage of the second node based on a magnitude of an output of the optical signal in the blanking period, and supply the trigger signal to the voltage adjustment circuit.

* * * * *